(12) United States Patent
Dean et al.

(10) Patent No.: US 9,026,419 B2
(45) Date of Patent: *May 5, 2015

(54) COMPUTER-IMPLEMENTED SYSTEMS AND METHODS FOR CONTROLLING SAND PRODUCTION IN A GEOMECHANICAL RESERVOIR SYSTEM

(71) Applicant: Chevron U.S.A. Inc., San Ramon, CA (US)

(72) Inventors: Ricky Howard Dean, Plano, TX (US); Joseph Henry Schmidt, Galveston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,732

(22) Filed: Aug. 22, 2013

(65) Prior Publication Data

US 2014/0122035 A1    May 1, 2014

Related U.S. Application Data

(63) Continuation of application No. 12/561,886, filed on Sep. 17, 2009, now Pat. No. 8,548,783.

(51) Int. Cl.
*G06G 7/48*    (2006.01)
*G01V 99/00*    (2009.01)
*E21B 43/00*    (2006.01)

(52) U.S. Cl.
CPC .............. *G01V 99/005* (2013.01); *E21B 43/00* (2013.01)

(58) Field of Classification Search
CPC ...................................................... E21B 49/088
USPC ........................................................ 703/6, 7, 10
See application file for complete search history.

(56) References Cited

U.S. PATENT DOCUMENTS

| 7,672,825 B2 | 3/2010 | Brouwer et al. |
| 2005/0234690 A1 | 10/2005 | Mainguy et al. |
| 2008/0288226 A1 | 11/2008 | Gurpinar et al. |
| 2009/0125280 A1 | 5/2009 | Soliman et al. |

FOREIGN PATENT DOCUMENTS

CN    1973110 A    5/2007

OTHER PUBLICATIONS

Wang et al. "Coupled Reservoir-Geomechanics Model With Sand Erosion for Sand Rate and Enhanced Production Prediction", SPE73738, Feb. 2002.*
Yi "Numerical and Analytical Modeling of Sanding Onset Prediction" Aug. 2003.*

(Continued)

*Primary Examiner* — Saif Alhija

(57) ABSTRACT

Systems and methods are provided for use in predicting sand production in a geomechanical reservoir system. Computation of the sand production predictions can include solving a system of partial differential equations that model the geomechanical reservoir system. Systems and methods also are provided for use in operating a geomechanical reservoir system based on the sand production prediction for controlling sand production in the geomechanical reservoir system.

20 Claims, 34 Drawing Sheets

(56) References Cited

OTHER PUBLICATIONS

Wang et al., "Coupled Reservoir-Geomechanics Model With Sand Erosion for Sand Rate and Enhanced Production Prediction," SPE 73738-MS, International Symposium and Exhibition on Formation Damage Control, Feb. 20-21, 2002, Lafayette, Louisiana.

Zuluaga et al., "The Use of a Fully Coupled Geomechanics-Reservoir Simulator to Evaluate the Feasibility of a Cavity Completion," SPE 109588-MS, SPE Annual Technical Conference and Exhibition, Nov. 11-14, 2007, Anaheim, California, U.S.A.

Xianjie Yi, "Numerical and Analytical Modeling of Sanding Onset Prediction," Dissertation submitted to the Office of Graduate Studies of Texas A&M University, Aug. 2003.

PCT Search Report and Written Opinion of the International Searching Authority, PCT/US2010/049315, Jun. 30, 2011.

Chinese First Office Action, issued on Feb. 8, 2014 during the prosecution of Chinese Application No. 201080047410.1.

* cited by examiner

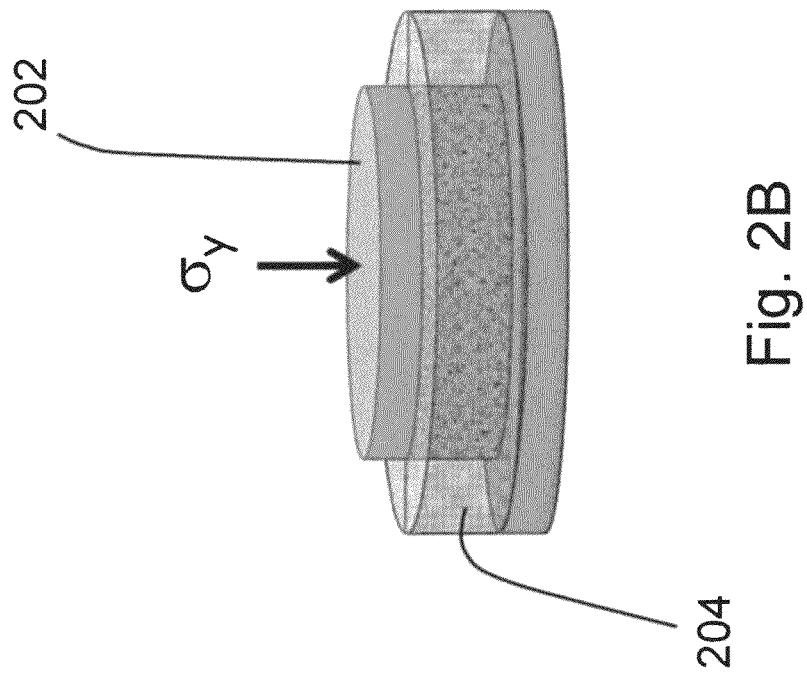
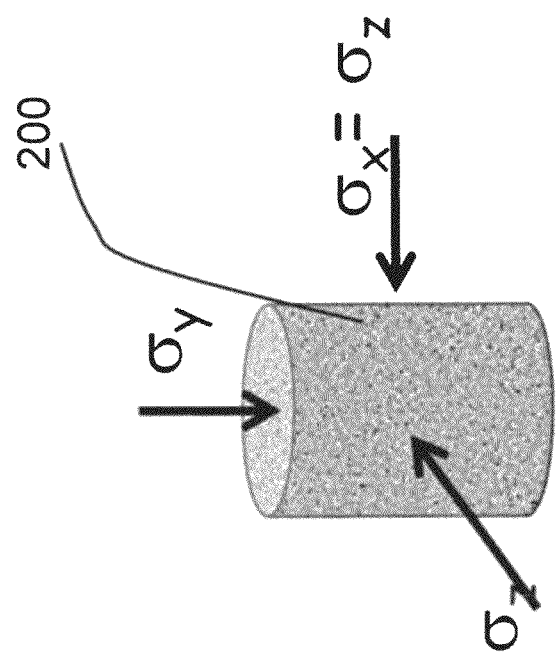
Fig. 2B
Fig. 2A

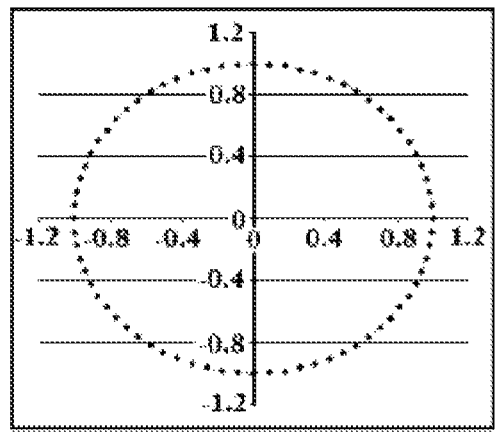
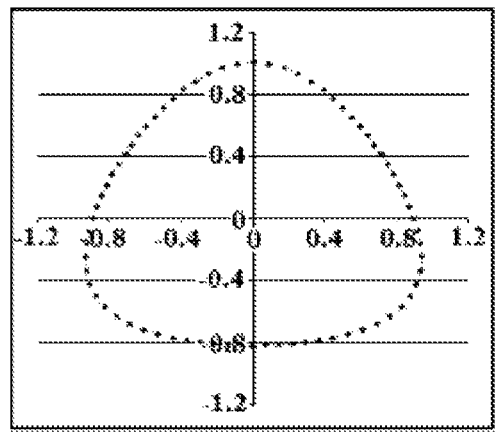
Fig. 12E  Fig. 12F
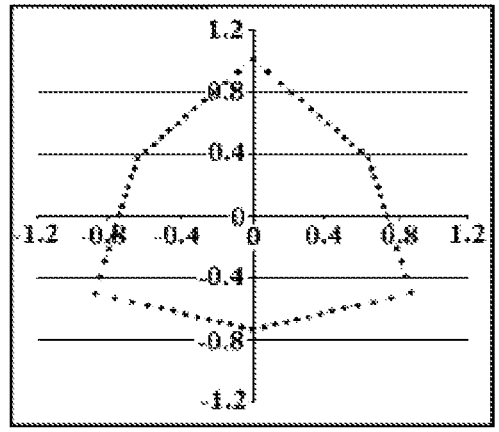
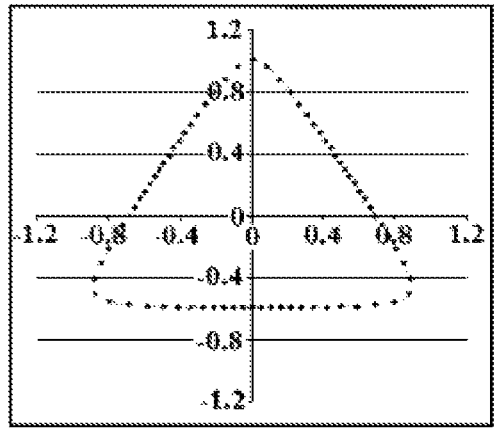
Fig. 12G  Fig. 12H

COMPUTER-IMPLEMENTED SYSTEMS AND METHODS FOR CONTROLLING SAND PRODUCTION IN A GEOMECHANICAL RESERVOIR SYSTEM

CROSS-REFERENCE TO RELATED APPLICATION

This application is a continuation of U.S. application Ser. No. 12/561,886, filed Sep. 17, 2009, the entire contents of which are incorporated herein by reference.

1. TECHNICAL FIELD

This document relates to computer-implemented systems and methods for use in predicting sand production in a geomechanical reservoir system. This document also relates to systems and methods for use in controlling sand production in a geomechanical reservoir system based on the prediction.

2. BACKGROUND

Production in a reservoir system is generally the phase that occurs after development of the reservoir, during which reservoir fluids, such as hydrocarbons (oil or gas), are drained from the reservoir. Sanding is an occurrence in which formation solid particles are produced with reservoir fluids. The generic term used to describe small particles of the formation (the rock around a wellbore) which may be produced with the reservoir fluid is "sand." The term "fines" has been used in some literature. Reservoir formation material generally comprises a rock type having sufficient porosity and permeability to store and transmit reservoir fluids, such as oil or water. Since sedimentary rocks are porous and form under temperature conditions at which fossil remnants (from which hydrocarbons are derived) can be preserved, they are the most common type of reservoir rocks (rather than igneous or metamorphic rocks). Examples of sedimentary rocks include, but are not limited to, conglomerates, sandstones, siltstones, shales, limestone, dolostone, halite (salt), salts, gypsum, and calcium sulfate anhydrite. Sedimentary rocks can include a wide variety of minerals, including but not limited to, quartz, feldspar, calcite, dolomite, and clay group minerals.

Sand production is the migration of the formation sand caused by the flow of reservoir fluids (such as oil) during production. Sand production can result from shear failure or tensile failure within the reservoir formation material. Shear failure can occur when the borehole pressure is significantly reduced (such as later in the life of a well), which increases stress near the wellbore, leading to formation failure. Tensile failure can occur when the porosity and permeability of the reservoir formation material near the wellbore are significantly damaged or when flow rates are extremely high. Under either tensile failure condition, the flowing fluid can exert significant drag forces on individual grains in the formation, which, if excessive, can cause the cementation between individual grains to fail, resulting in tensile failure and sand production.

In many instances, sand production can be undesirable since it can restrict productivity, erode completion components, impede wellbore access, interfere with the operation of downhole equipment, and present significant disposal difficulties. Sand production increases the diameter of the perforation cavity or the borehole, reducing the support around the casing. As a result, perforations collapse, the cavity becomes larger, and eventually production from the wellbore could cease. If sand production is severe, remedial action may be required to control or prevent sand production altogether, such a gravel packing or sand consolidation. In extreme cases, massive sanding can occur, in which the sand production increases uncontrollably, eventually completely eroding the reservoir material forming the foundation of the well.

Conventionally, measures have been put into place early in a reservoir development project to prevent sand production altogether, to the extent possible. For example, unconsolidated formations with multiple producing zones may be completed cased hole. The cased hole completion procedure involves constructing a barrier system around the borehole of the reservoir to prevent or retard the onset or extent of sanding, including cementing steel pipes into the wellbore and using meshes, such as an expandable sand screen technology. Such measures, however, may have a negative impact on well productivity. That is, productivity performance of the cased hole well can be much lower than that of an open hole well. Also, such measures increase the cost of a reservoir development project, since they require resources, time, and labor for implementation.

The allowance of some amount of sand production can aid in increasing well productivity. Therefore, a method for use in predicting sand production from a geomechanical reservoir system would be useful, in that it would allow determination of if and when sand production would occur, and to what extent, early on a well development project. Using these predictions, a reservoir can be constructed and operated such that a limited amount of sand is produced, a cavity generated in the reservoir is substantially sustained, and well productivity is increased.

3. SUMMARY

As disclosed herein, computer-implemented systems and methods are provided for use in predicting sand production from a geomechanical reservoir system. The methods and systems comprise receiving data indicative of gradual sanding and massive sanding of material within the geomechanical reservoir system; computing, on a computer system, a value of a critical plastic strain based on a fit of a geomechanical model comprising a hardening model to the received massive sanding data; computing, on a computer system, a value of at least one parameter of a production function based on a fit of a geomechanical model comprising a production function to the received gradual sanding data and using the value of the critical plastic strain and at least one value of one or more hardening parameters; wherein the at least one value of the one or more hardening parameters is computed based on a fit of the hardening model to data indicative of plastic deformation of material within the geomechanical reservoir system; wherein the hardening model models plastic deformation behavior of the material within the geomechanical reservoir system; and wherein the production function predicts sand production from the geomechanical reservoir system. At least one value of the one or more hardening parameters, the value of the critical plastic strain, or the value of at least one parameter of the production function may be output to a user interface device, a monitor, a computer readable storage medium, a local computer, or a computer that is part of a network.

Computer-implemented systems and methods also are provided for use in predicting sand production from a geomechanical reservoir system, comprising: receiving data indicative of plastic deformation, gradual sanding and massive sanding of material within the geomechanical reservoir system; computing, on a computer system, a value of one or more hardening parameters based on a fit of a hardening model to the received plastic deformation data; wherein the hardening model models plastic deformation behavior of the material within the geomechanical reservoir system; computing, on a computer system, a value of a critical plastic strain based on a fit of a geomechanical model comprising the hardening model to the received massive sanding data; computing, on a computer system, a value of at least one parameter of a production function based on a fit of a geomechanical model comprising the production function to the received gradual sanding data and using a value of at least one value of the hardening parameters and the value of the critical plastic strain; wherein the production function predicts sand production from the geomechanical reservoir system. At least one value of the one or more hardening parameters, the value of the critical plastic strain, or the value of at least one parameter of the production function may be output to a user interface device, a monitor, a computer readable storage medium, a local computer, or a computer that is part of a network.

In one aspect of the foregoing methods and systems, the production function is a function $f(x)$, where $f(x)=0$ when $x=0$, and $f(x)=1$ when $x=1$; and where x is a function of the critical plastic strain. In another aspect of the foregoing methods and systems, the value of at least one parameter of the production function is a value of an exponent of the production function. The sand production function may be given by the expression:

$$f(x) = \left(\frac{\varepsilon^p}{\varepsilon_{lim}^p}\right)^m$$

where $x=\epsilon^p/\epsilon_{lim}^p$, where $\epsilon^p$ is a plastic strain invariant, wherein $\epsilon_{lim}^p$ is the critical plastic strain; and where m the value of the exponent.

The hardening model may be a modified Bigoni-Piccolroaz model. The plastic deformation data may be obtained from a triaxial test. The gradual sanding and massive sanding may be obtained from a hollow cylinder test. The fit of the hardening model to the received plastic deformation data may be obtained by a regression.

In an aspect of the foregoing methods and systems, the fit of the geomechanical model comprising the hardening model to the received massive sanding data is obtained by solving a system of partial differential equations that model the geomechanical reservoir system; where the system of partial differential equations comprises a reservoir flow model and the geomechanical model comprising the hardening model; where the system of partial differential equations is coupled through a fully-expanded Jacobian; and where the solving of the system of partial differential equations includes solving simultaneously in a single time step the fully-expanded Jacobian based upon the received massive sanding data.

In another aspect of the foregoing methods and systems, the fit of the geomechanical model comprising the production function to the received gradual sanding data is obtained by solving a system of partial differential equations that model the geomechanical reservoir system; where the system of partial differential equations comprises a reservoir flow model and the geomechanical model comprising the hardening model; where the system of partial differential equations is coupled through a fully-expanded Jacobian; and where the solving of the system of partial differential equations includes solving simultaneously in a single time step the fully-expanded Jacobian based upon the received gradual sanding data.

Computer-implemented systems and methods also are provided for use in predicting sand production from a geomechanical reservoir system, comprising: receiving data indicative of physical or chemical properties associated with material within the geomechanical reservoir system; generating sand production predictions by solving a system of partial differential equations that model the geomechanical reservoir system; wherein the system of partial differential equations comprises a reservoir flow model and a geomechanical model of the geomechanical reservoir system; wherein the geomechanical model comprises a hardening model; wherein a sand production criterion is applied to the geomechanical model; wherein the system of partial differential are coupled through a fully-expanded Jacobian; wherein the solving of the system of partial differential equations includes solving simultaneously in a single time step the fully-expanded Jacobian based upon the received physical properties data; and wherein the generating is implemented on a computer system. The generated sand production predictions may be output to a user interface device, a monitor, a computer readable storage medium, a local computer, or a computer that is part of a network. The sand production criterion may be a critical value of a total strain, a critical value of a plastic strain invariant, or a maximum effective stress.

In addition, computer-implemented systems and methods also are provided for use in predicting sand production in a geomechanical reservoir system, comprising: receiving data indicative of physical or chemical properties associated with material within the geomechanical reservoir system; defining a grid comprising a plurality of grid cells; generating sand production predictions by solving a system of partial differential equations that model the geomechanical reservoir system; wherein the system of partial differential equations comprises a reservoir flow model and a geomechanical model of the geomechanical reservoir system; wherein the geomechanical model comprises a hardening model; wherein a sand production criterion is applied to the geomechanical model; wherein the system of partial differential equations are coupled through a fully-expanded Jacobian; wherein the solving of the system of partial differential equations includes solving simultaneously in a single time step the fully-expanded Jacobian based upon the received physical properties data; wherein the reservoir model and the geomechanical model are computed on the grid; and wherein the generating is implemented on a computer system. The generated sand production predictions may be output to a user interface device, a monitor, a computer readable storage medium, a local computer, or a computer that is part of a network. The sand production criterion may be a critical value of a total strain, a critical value of a plastic strain invariant, or a maximum effective stress.

An aspect of the present disclosure provides a computer system for performing the steps of any of the methods and systems disclosed herein, including the foregoing systems and methods. The computer system comprises one or more processor units; and one or more memory units connected to the one or more processor units, the one or more memory units containing one or more modules which comprise one or more programs which cause the one or more processor units to execute steps comprising performing the steps of any of the systems and methods disclosed herein, including the foregoing systems and methods. In the foregoing embodiments, the one or more memory units may contain one or more modules which comprise one or more programs which cause the one or more processor units to execute steps comprising outputting to a display, a user interface device, a tangible computer readable data storage product, or a tangible random access memory, a result of the systems and methods. For example, as is applicable to the method being executed, the result of the system or method which is output can be at least one value of the one or more hardening parameters, the value of the critical plastic strain, the value of at least one parameter of the production function, or the generated sand production predictions.

Another aspect of the present disclosure provides a computer-readable medium storing a computer program executable by a computer for performing the steps of any of the systems and methods disclosed herein, including the foregoing systems and methods. A computer program product is provided for use in conjunction with a computer having one or more memory units and one or more processor units, the computer program product comprising a computer readable storage medium having a computer program mechanism encoded thereon, wherein the computer program mechanism can be loaded into the one or more memory units of the computer and cause the one or more processor units of the computer to execute steps comprising performing the steps of any of the systems and methods disclosed herein, including the foregoing systems and methods. In the foregoing embodiments, the computer program mechanism may be loaded into the one or more memory units of said computer and cause the one or more processor units of the computer to execute steps comprising outputting to a display, a user interface device, a tangible computer readable data storage product, or a tangible random access memory, a result of the system or method. For example, as is applicable to the method being executed, the result of the system or method which is output can be at least one value of the one or more hardening parameters, the value of the critical plastic strain, the value of at least one parameter of the production function, or the generated sand production predictions.

Systems and methods also are provided for sand production from a geomechanical reservoir system, comprising operating the geomechanical reservoir system in accordance with a result of any of the methods and systems disclosed herein, including the foregoing systems and methods.

Systems and methods also are provided for operating a geomechanical reservoir system to control sand production from the geomechanical reservoir system. The systems and methods comprise computing a value of at least one operating parameter based on a fit of a geomechanical model comprising a production function to data indicative of physical or chemical properties associated with materials within the reservoir system; wherein the production function predicts sand production from the geomechanical reservoir system; and wherein the at least one value of the operating parameter indicates a condition for stabilized sand production from the geomechanical reservoir system; and operating the geomechanical reservoir system in accordance with the value of the at least one operating parameter.

4. BRIEF DESCRIPTION OF THE DRAWINGS

FIG. 2A depicts stress components ($\sigma_x$, $\sigma_y$, $\sigma_x$) for deviatoric loading of a sample 200 in a triaxial test (in this example, $\sigma_x = \sigma_z$).

FIG. 2B depicts the stress component ($\sigma_y$) for an oedometer test, in which a sample 202 is confined radially in a confining ring 204, and is loaded only in the y-direction ($\sigma_y$).

Figure 5A:
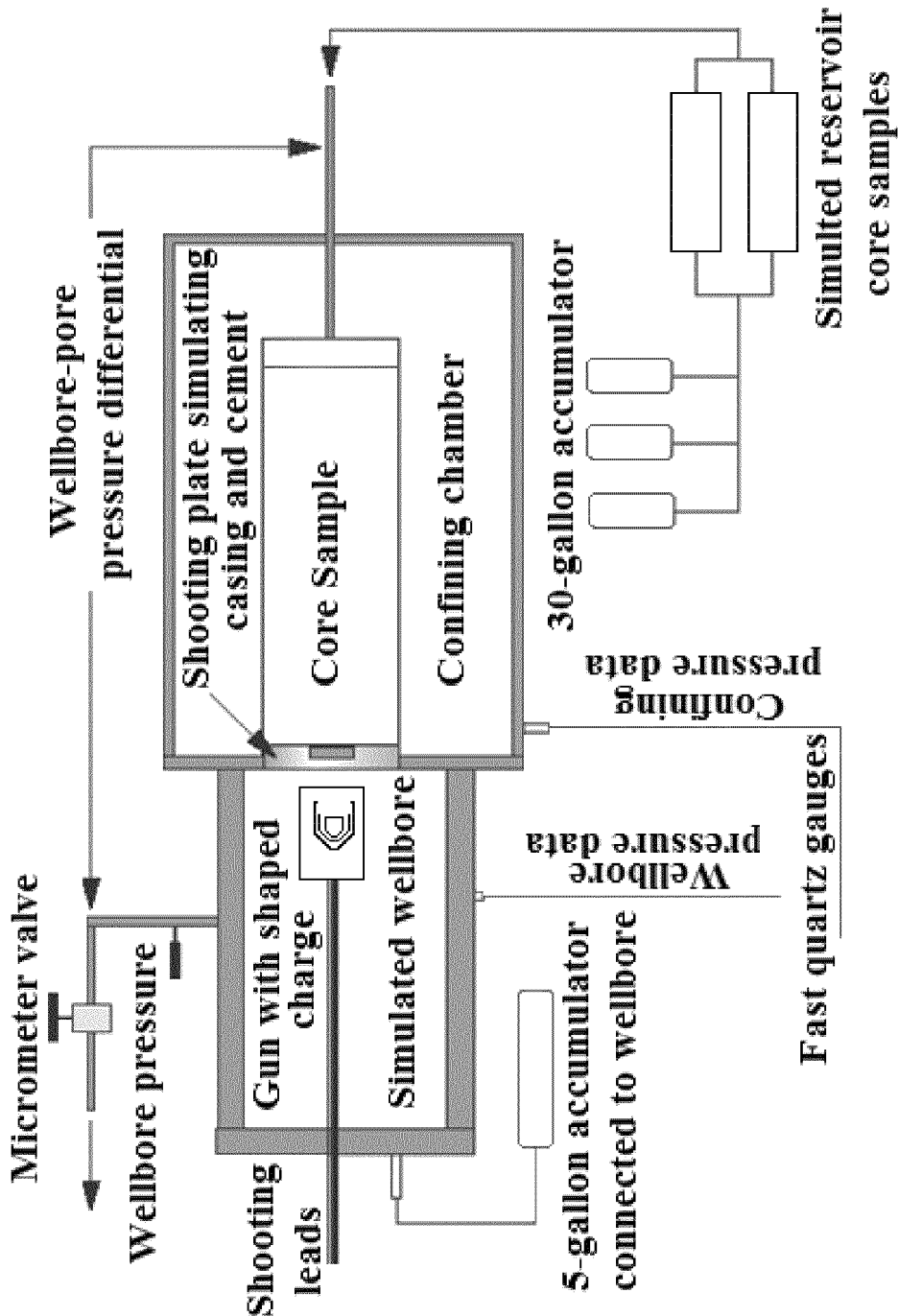
Figure 5B:
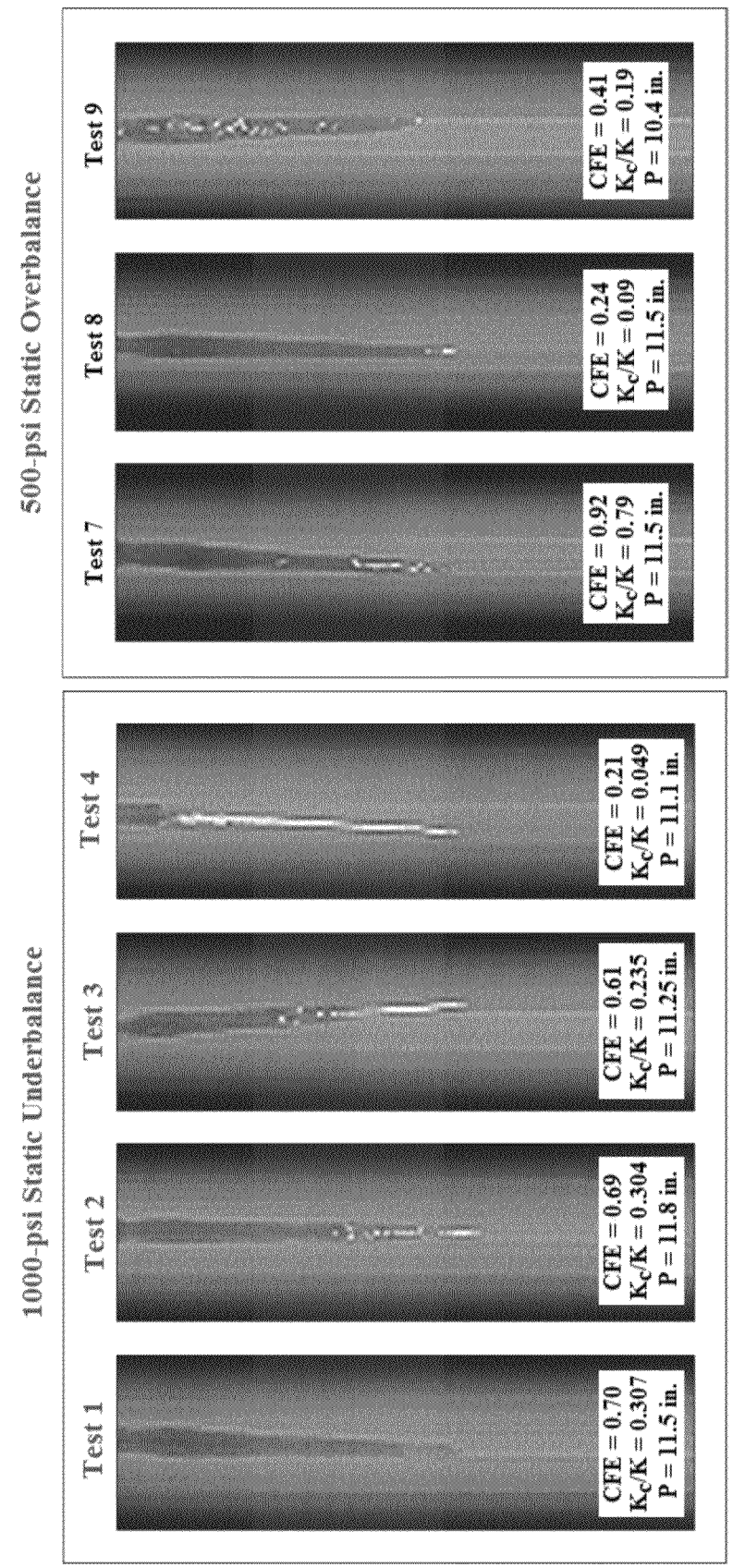
Figure 6:
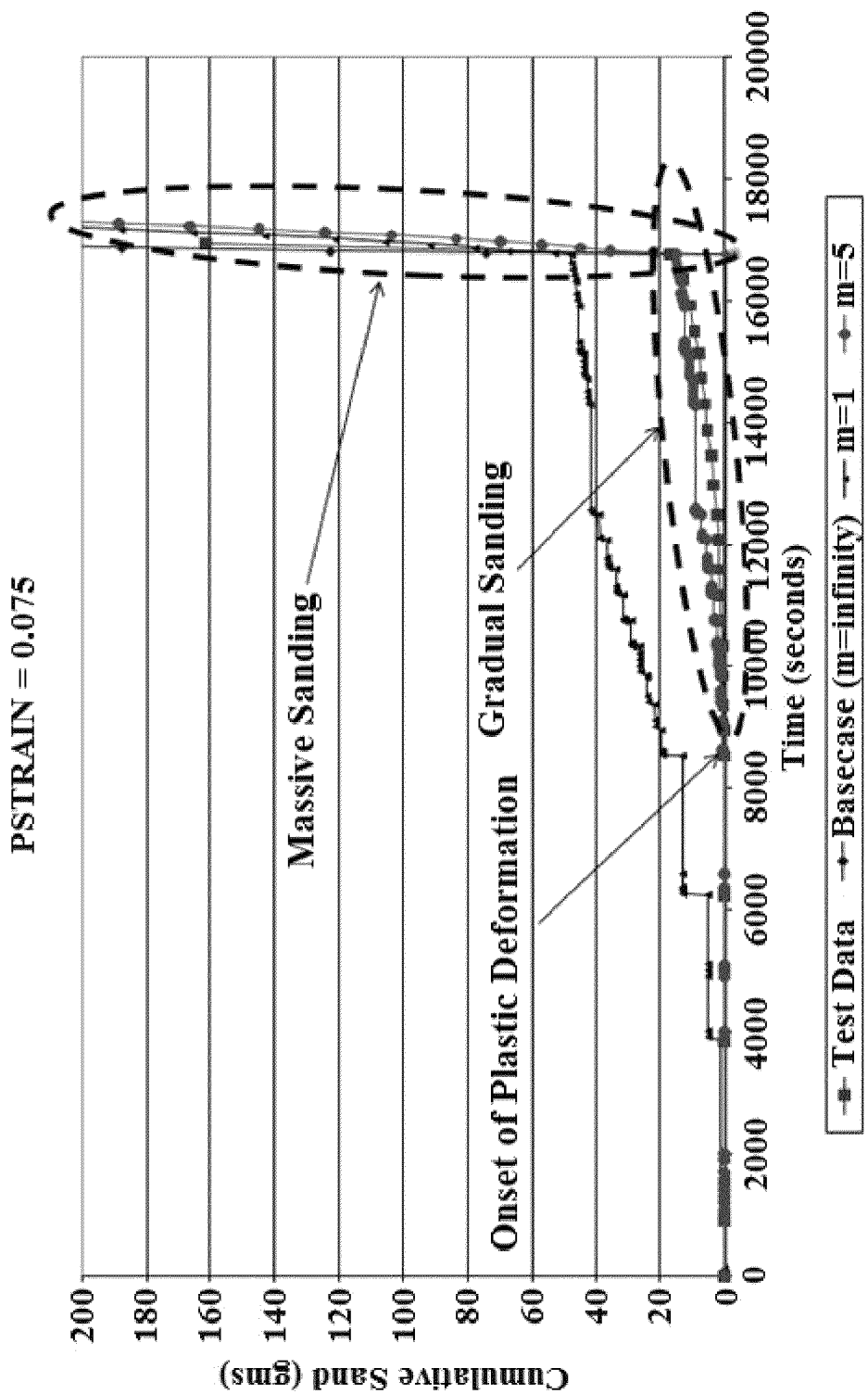

FIG. 5A shows an example schematic of a perforation test.
FIG. 5B shows core samples from a perforation test.
FIG. 6 shows the results of a perforation test, plotted as sand production (in cubic centimeters (cc)) versus time (seconds) and fits to the results using different values of the exponent (m). The cylindrical core sample was perforated with a hemispherical end.

Figure 7:
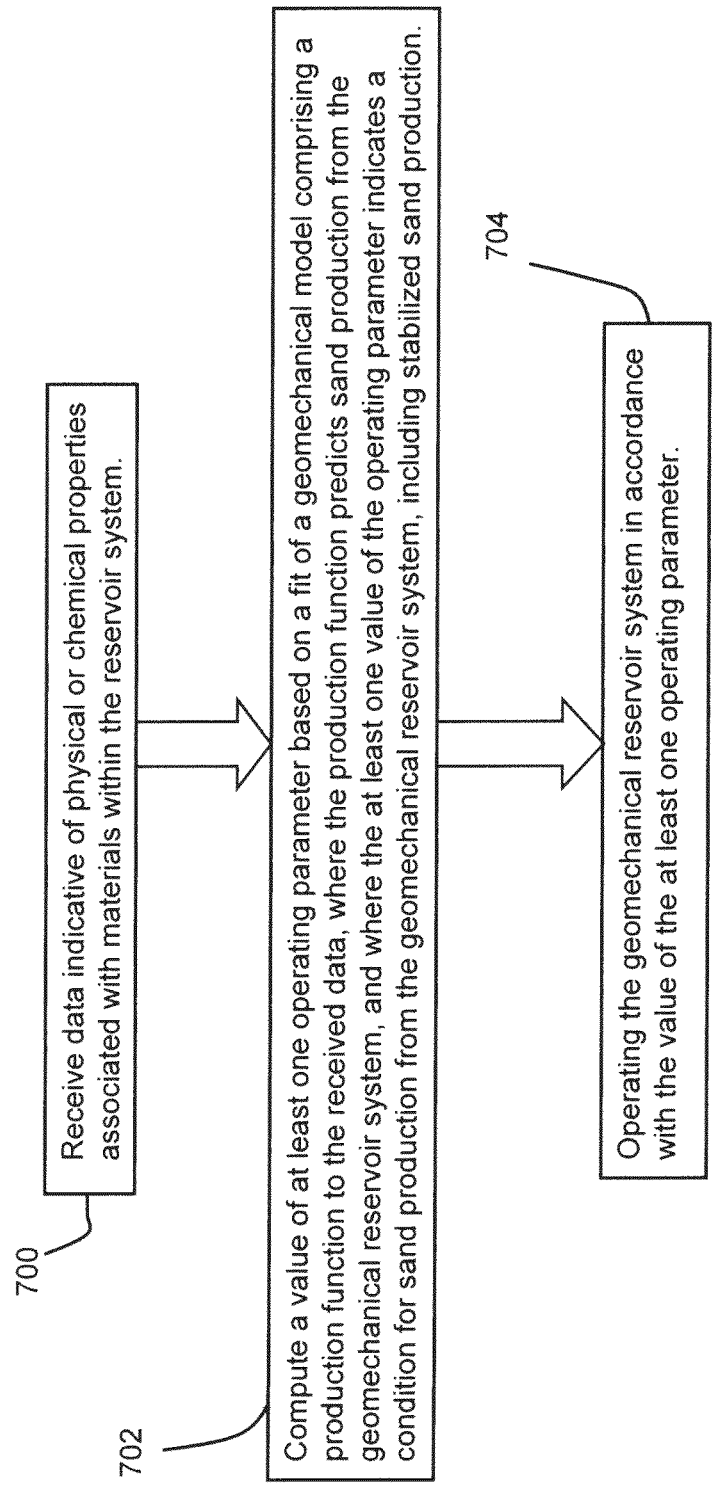

FIG. 7 is a flow chart of a method for use in operating a geomechanical reservoir system based on a result of a sand production prediction.

Figure 8:
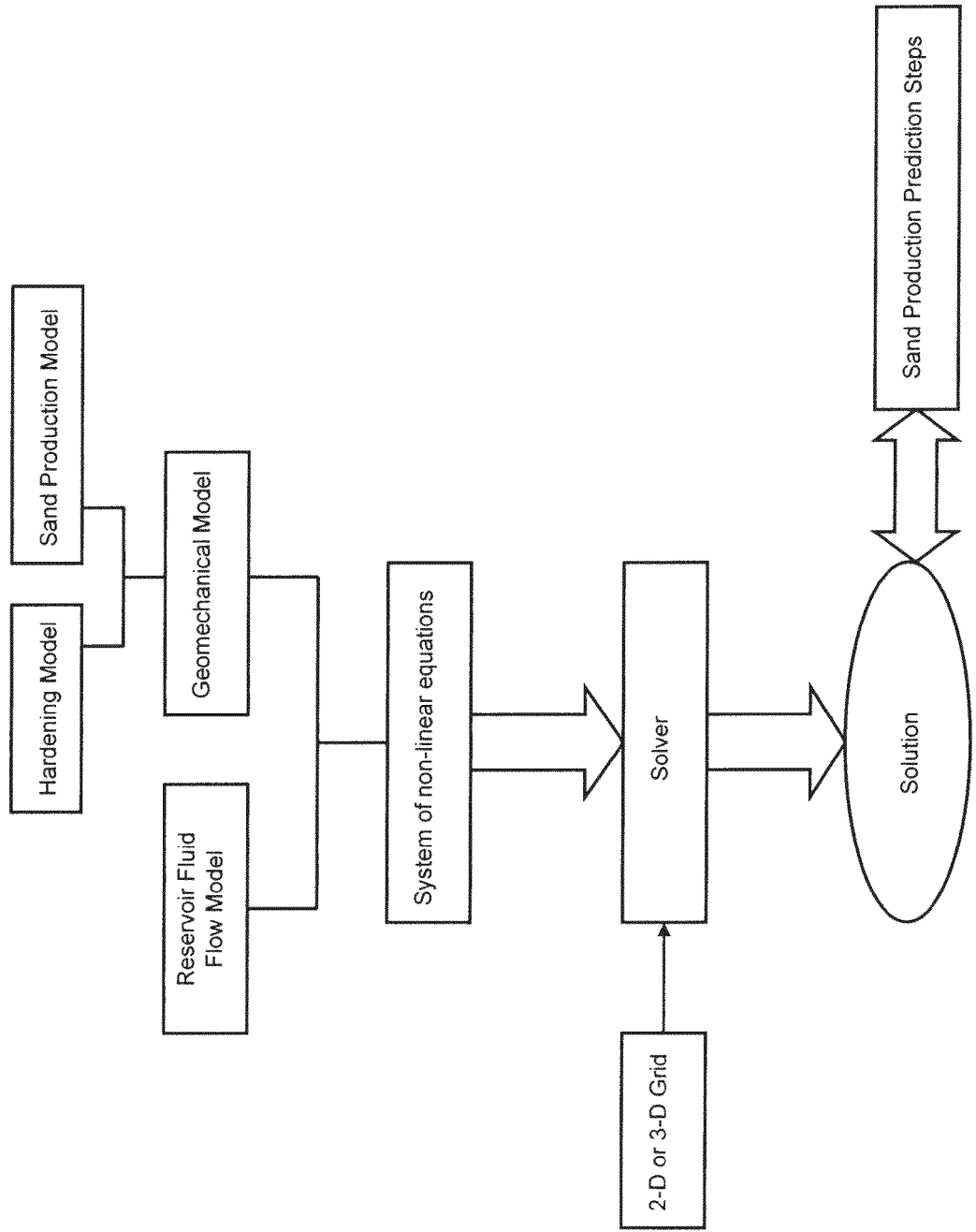

FIG. 8 is a block diagram of an example approach for use in modeling sand production from a geomechanical reservoir system, including a reservoir model and a geomechanical model.

Figure 9:
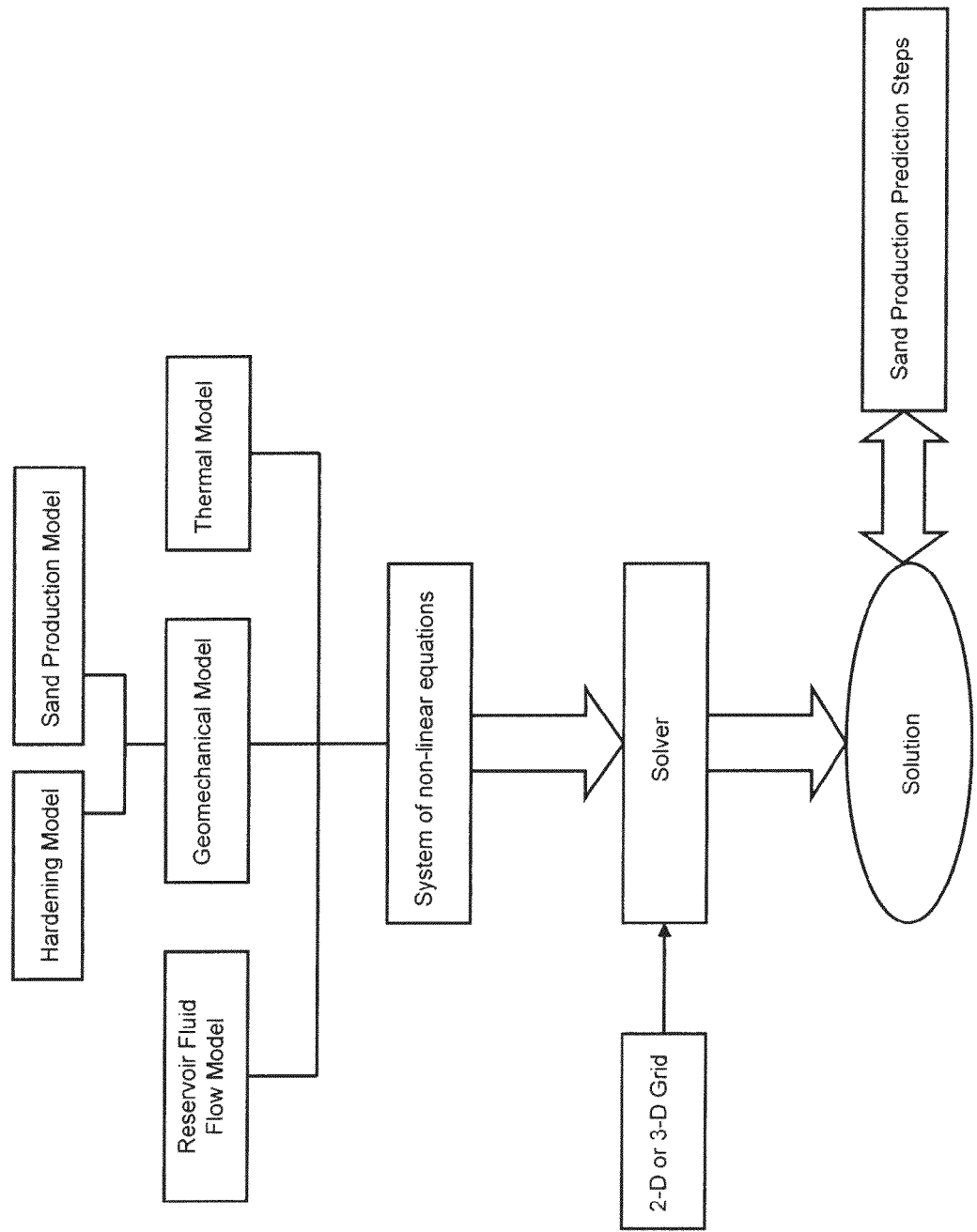

FIG. 9 is a block diagram of an example approach for use in modeling sand production from a geomechanical reservoir system, including a reservoir model, a geomechanical model, and a thermal model.

Figure 10B:
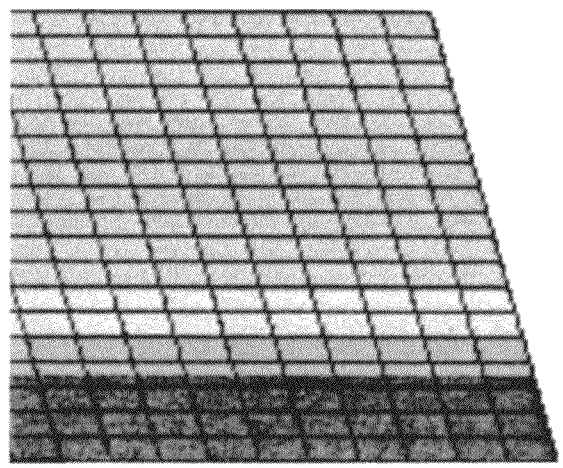
Figure 10A:
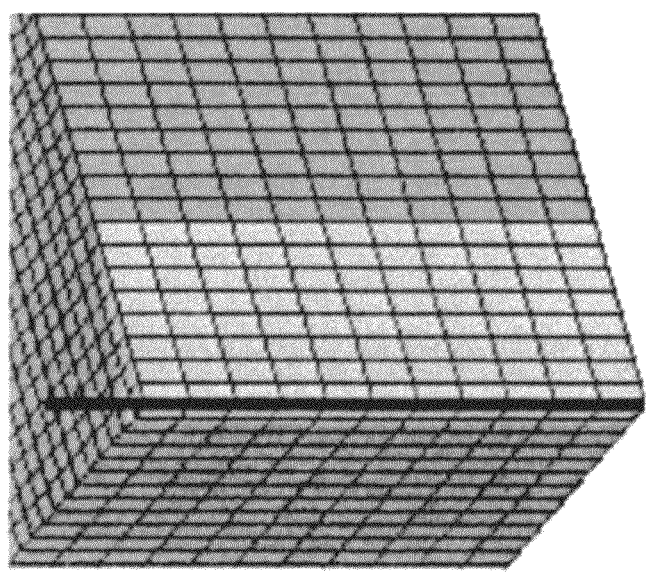

FIG. 10A illustrates an example of a three-dimensional grid for use in computation of the models.

FIG. 10B illustrates an example of a two-dimensional grid for use in computation of the models.

Figure 11B:
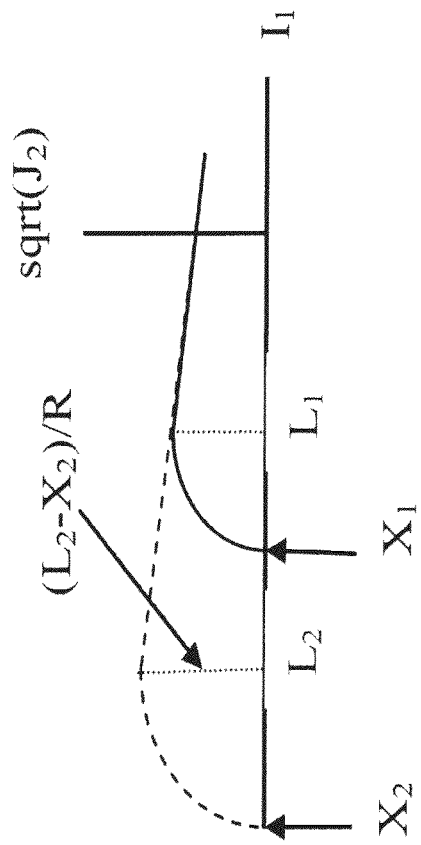
Figure 11A:
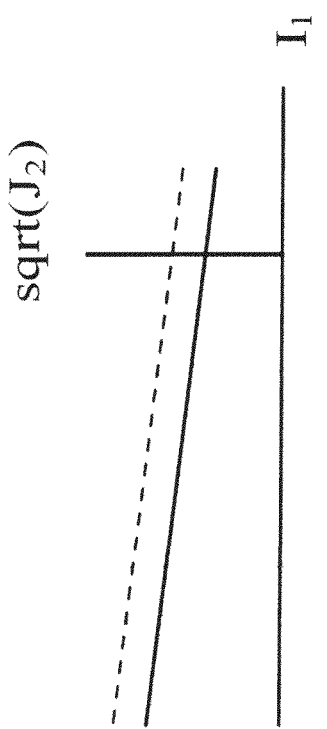
Figure 12A:
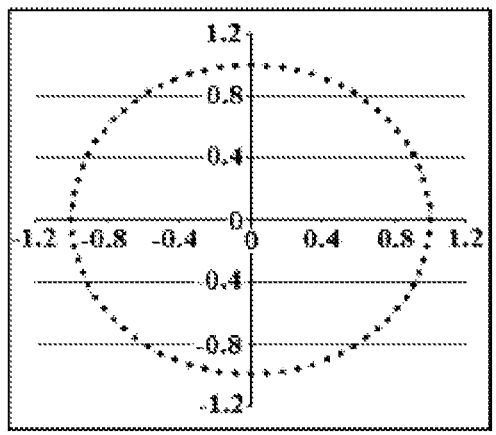
Figure 12B:
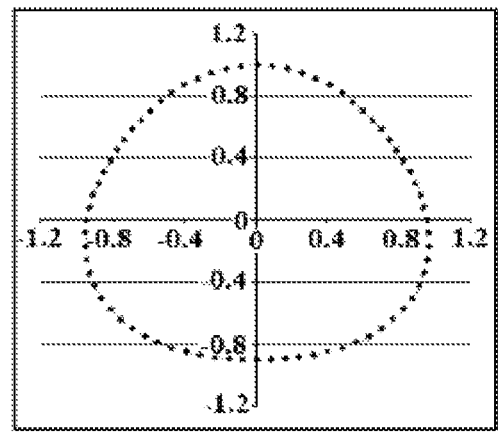
Figure 12C:
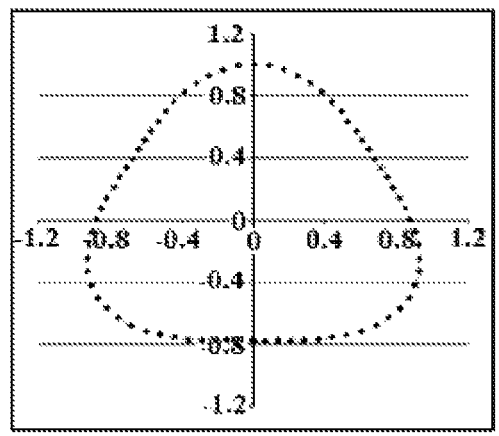
Figure 12D:
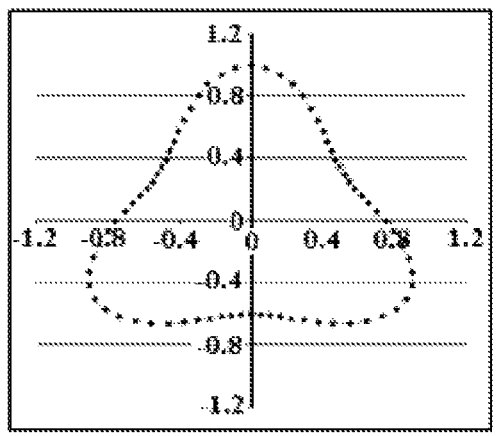

FIG. 11A shows a plot of the movement of the yield surface in a Drucker-Prager hardening model with shear hardening.

FIG. 11B shows a plot of the movement of the yield surface in a Drucker-Prager hardening model with cap hardening.

FIGS. 12A-D show plots of the yield surfaces in the octahedral (deviatoric) plane for the modified Drucker-Prager model for four different values of the deviation (K).

FIGS. 12E-H show plots of the yield surfaces in the octahedral (deviatoric) plane for the modified Bigoni-Piccolroaz model for four different combinations of values of beta ($\beta$) and the deviation ($\gamma$).

Figure 13:
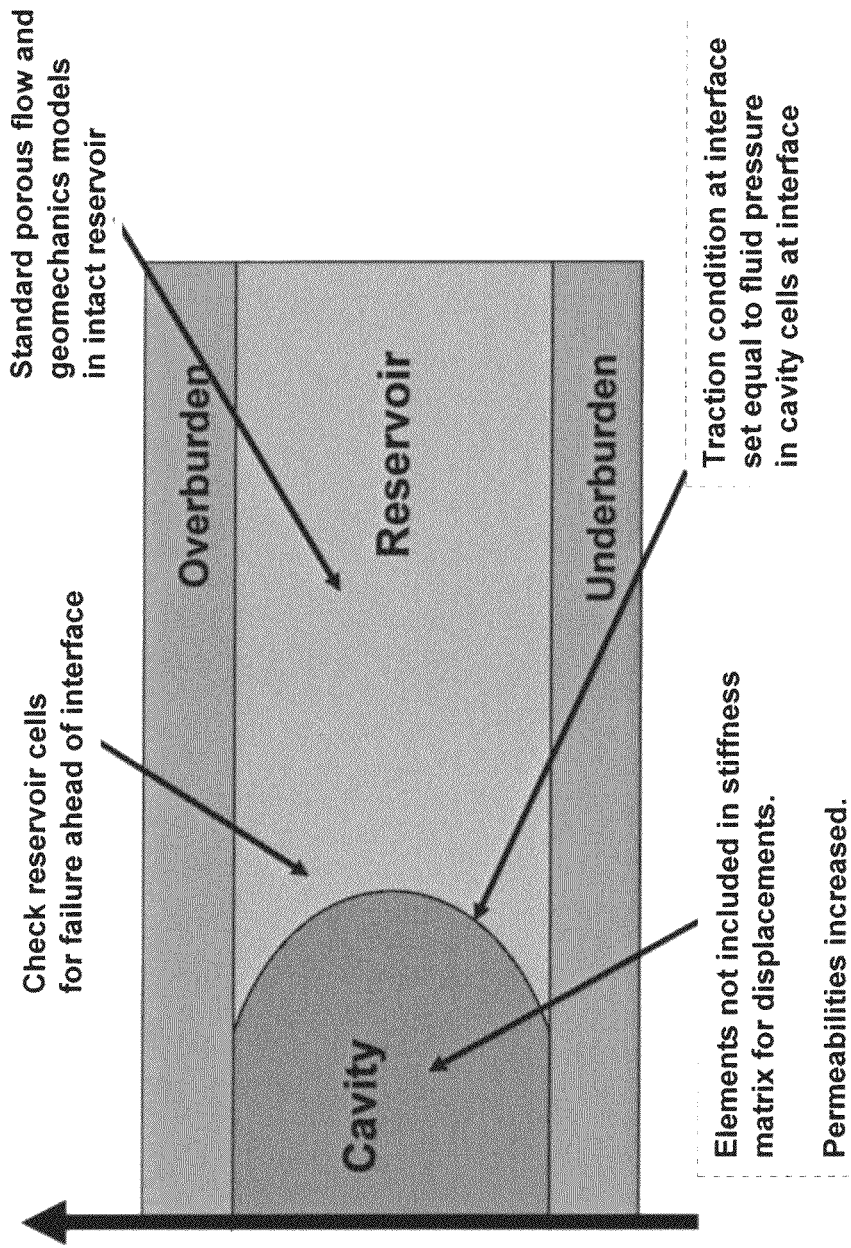

FIG. 13 illustrates an example computation of sand production using the models.

Figure 14:
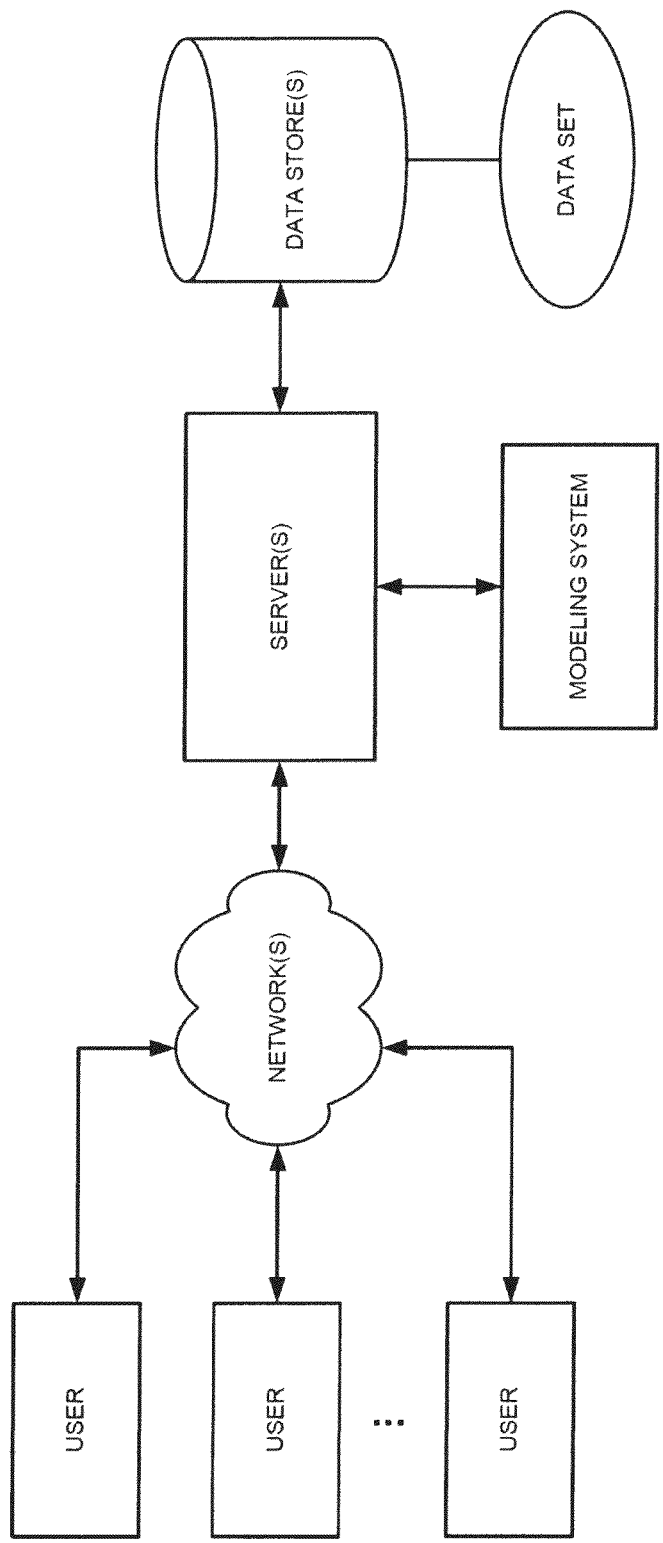

FIG. 14 illustrates an example computer system for implementing the sand production prediction methods disclosed herein.

Figure 3:
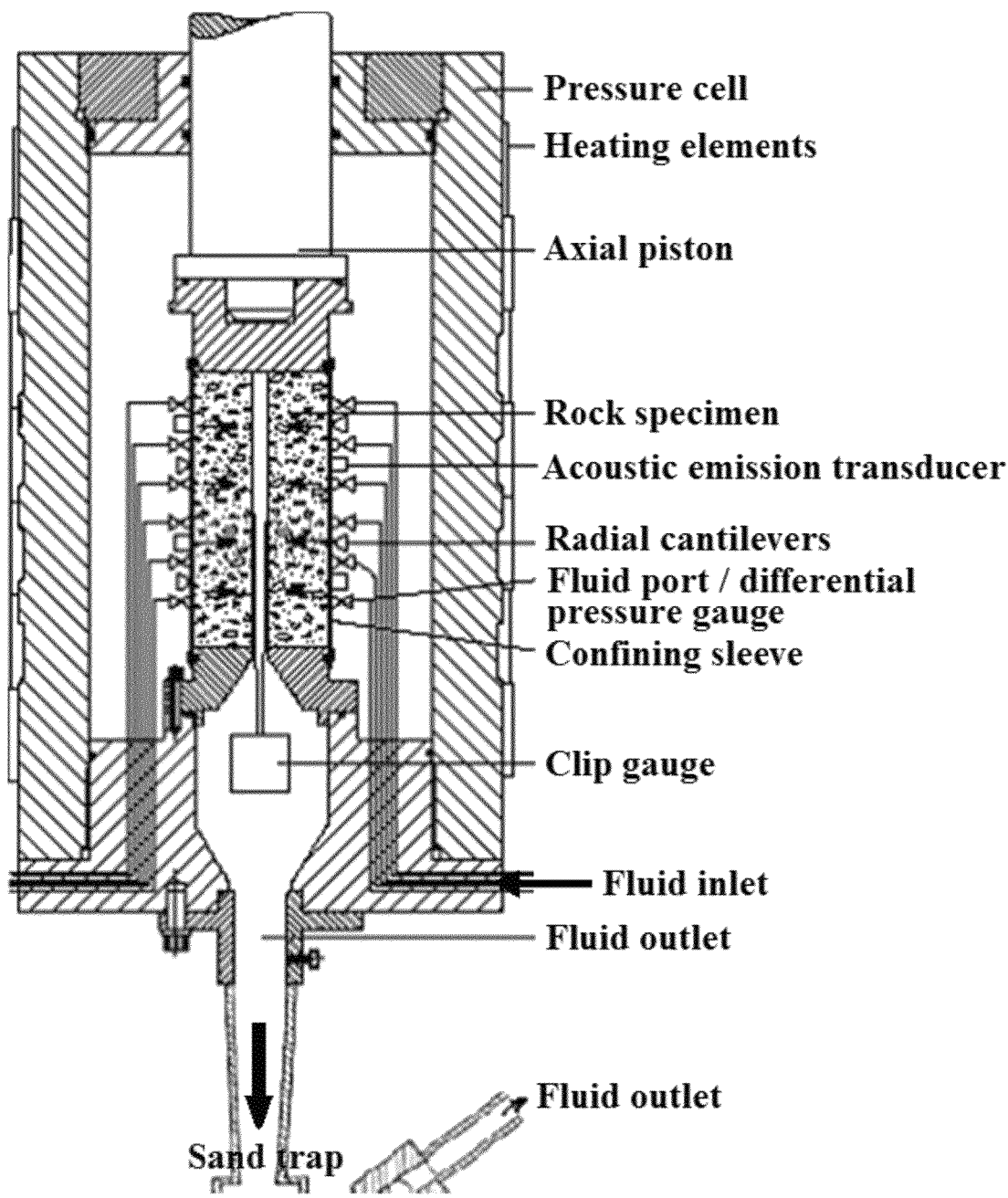
FIG. 3 depicts an example schematic of a hollow cylinder test.
Figures 15A, 15B:
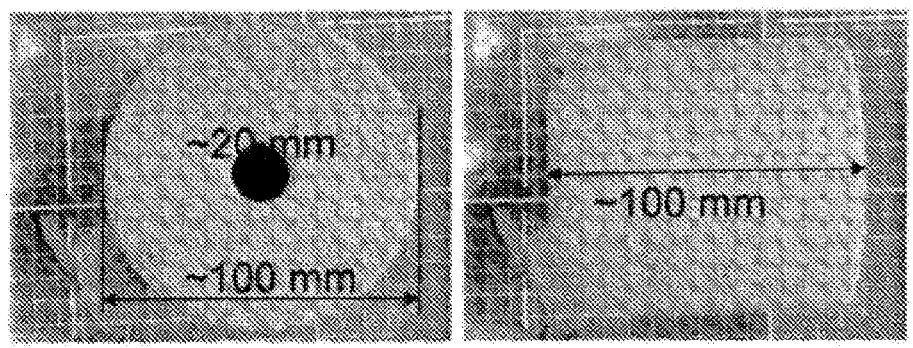

FIGS. 15A and 15B show core samples, including the dimensions of the sample, used for a brine test (using a hollow cylinder test setup such as illustrated in FIG. 3).

Figure 16A:
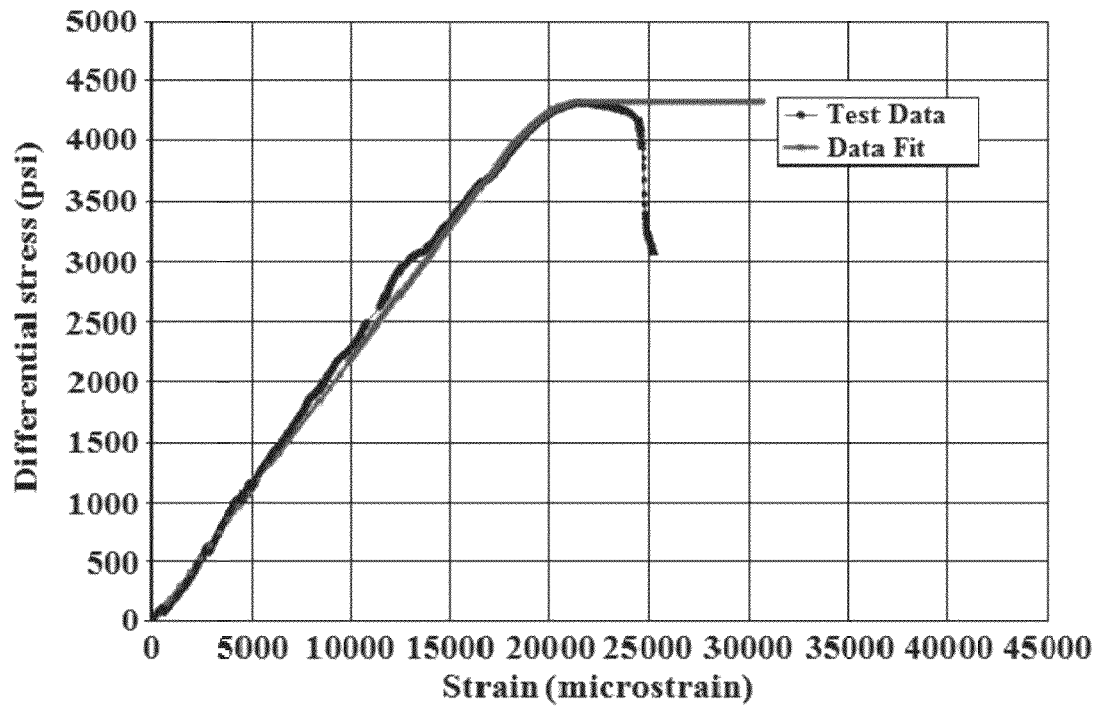

FIG. 16A shows plots of the triaxial test data (black) and the numerical results (data fit) from the simulation (grey) for the brine saturated core samples.

Figure 16B:
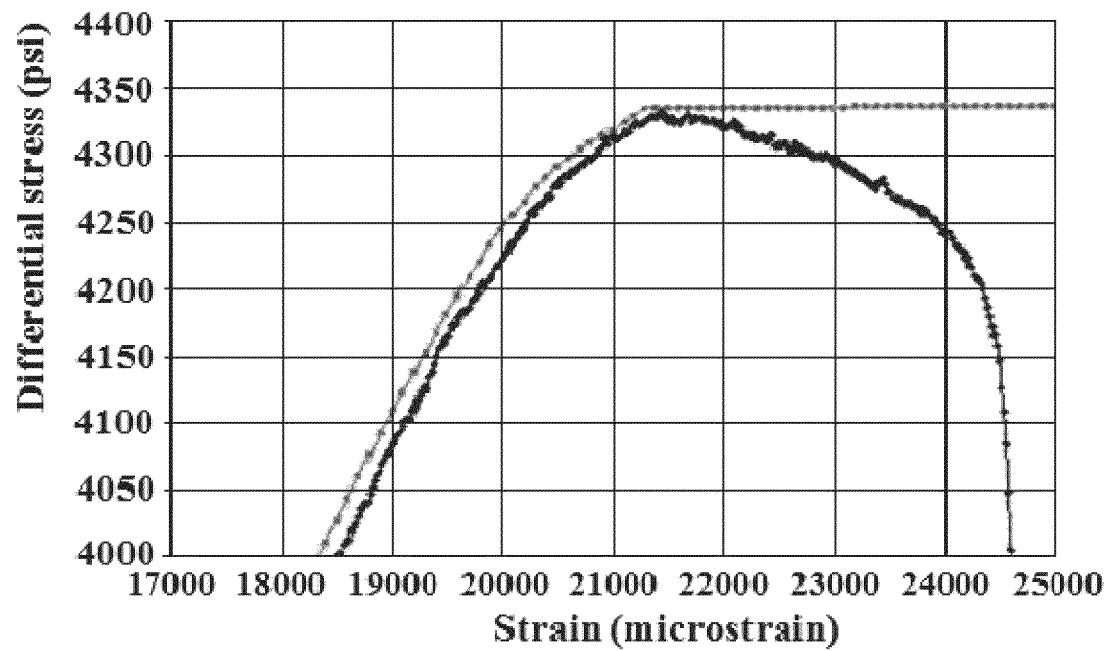

FIG. 16B shows a close-up of a portion of the plot shown in FIG. 16A where the core sample material becomes almost perfectly plastic.

Figure 17:
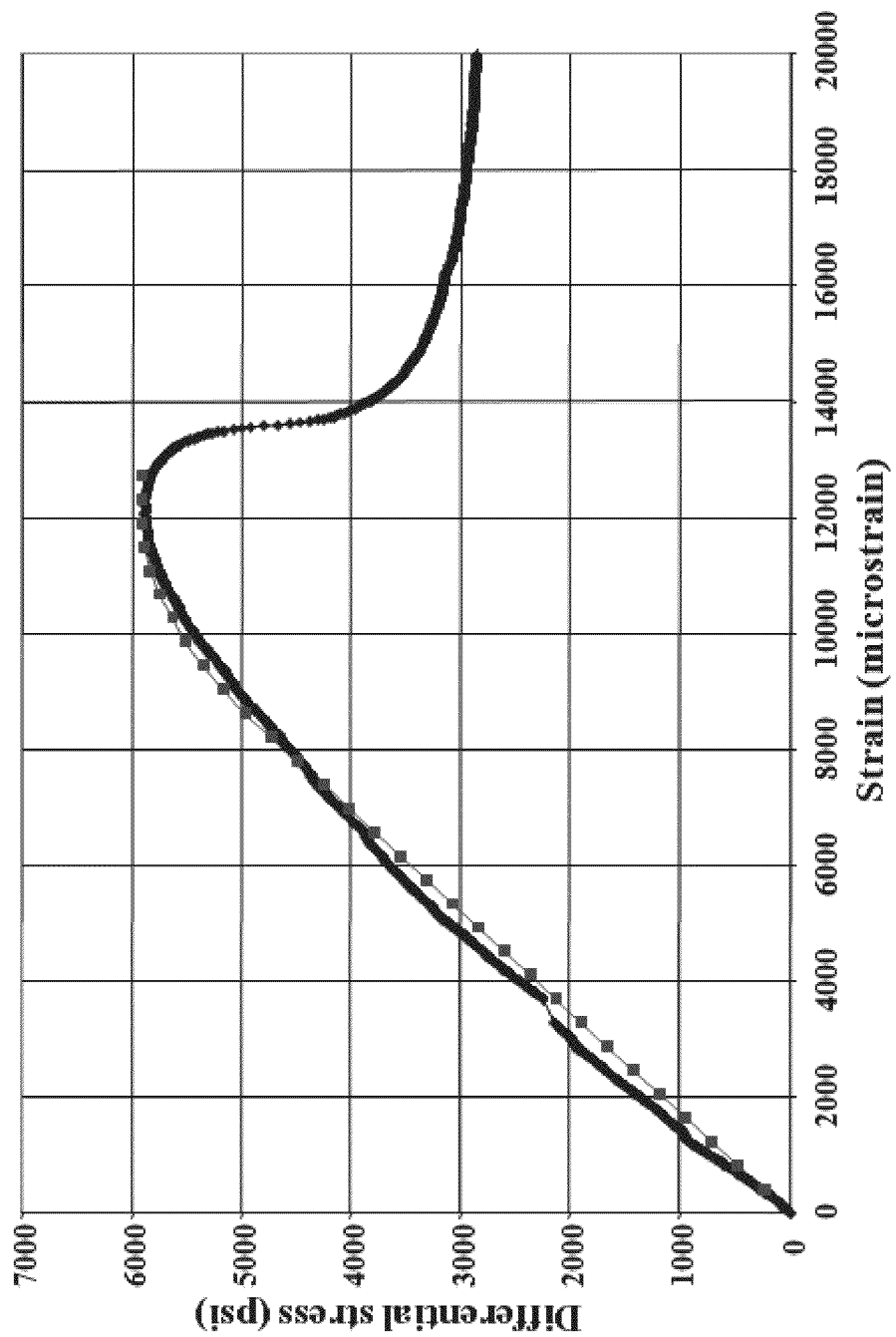

FIG. 17 shows plots of the triaxial test results (black) and the numerical results from the simulation (grey) for the kerosene saturated samples.

Figure 18:
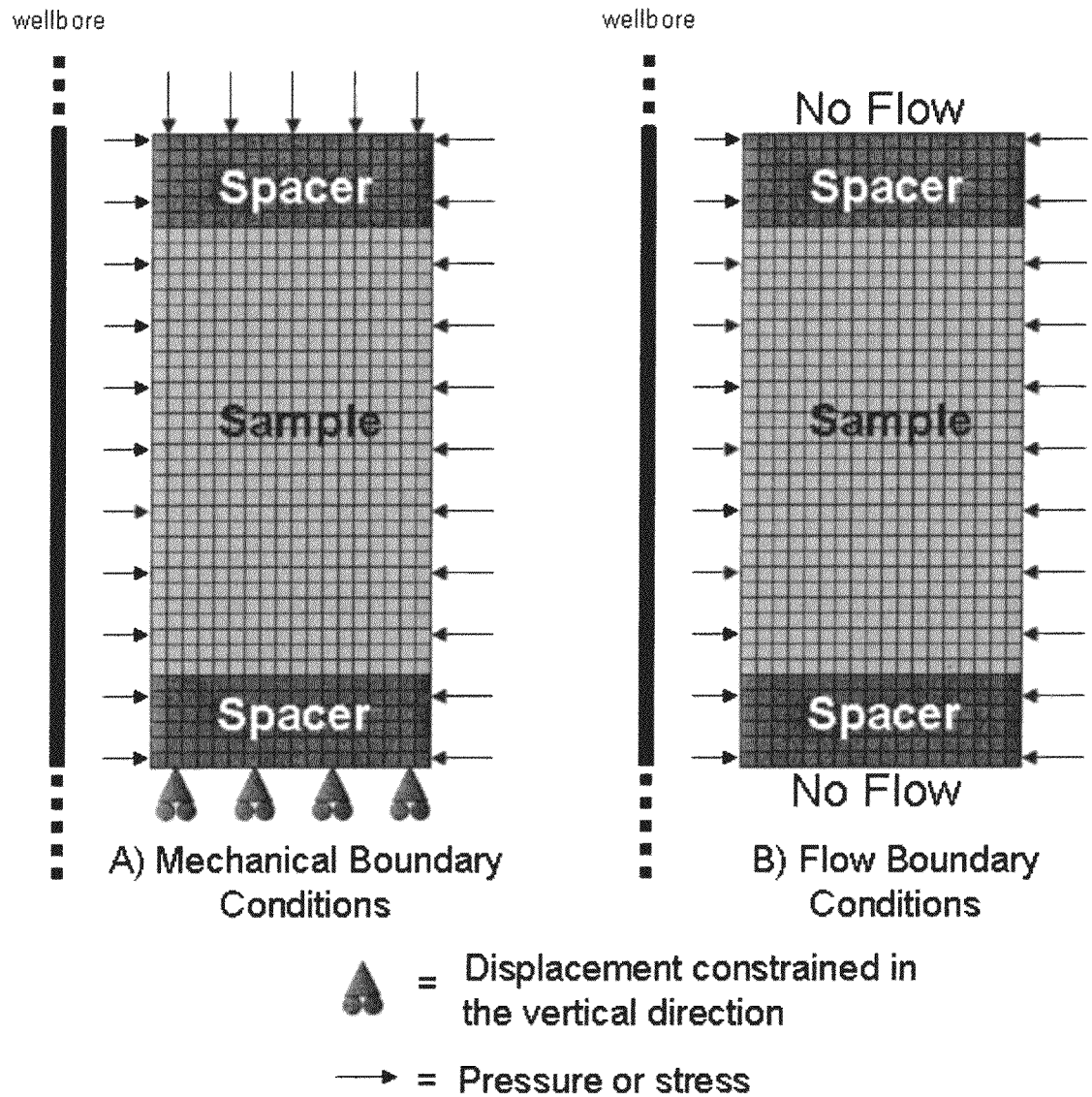

FIG. 18 illustrates the boundary conditions applied to the simulations of the core samples to simulate the loading in a hollow cylinder test, where (A) shows the mechanical boundary conditions and (B) shows the flow boundary conditions, applied to the samples in the simulation.

Figure 19:
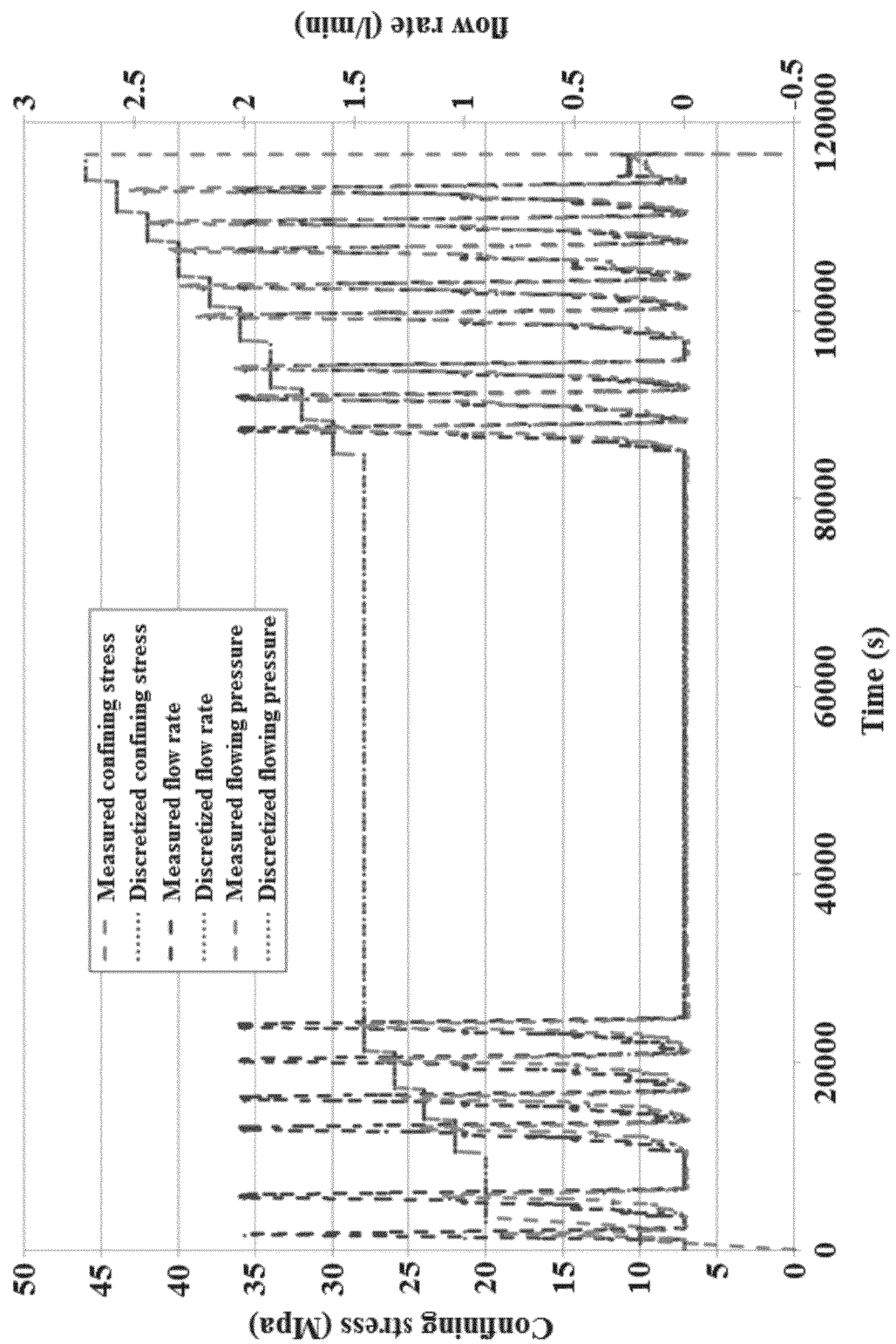

FIG. 19 shows the measured and discretized confining stress, flow rate and flowing pressure vs. time for the brine saturated sample.

Figure 20:
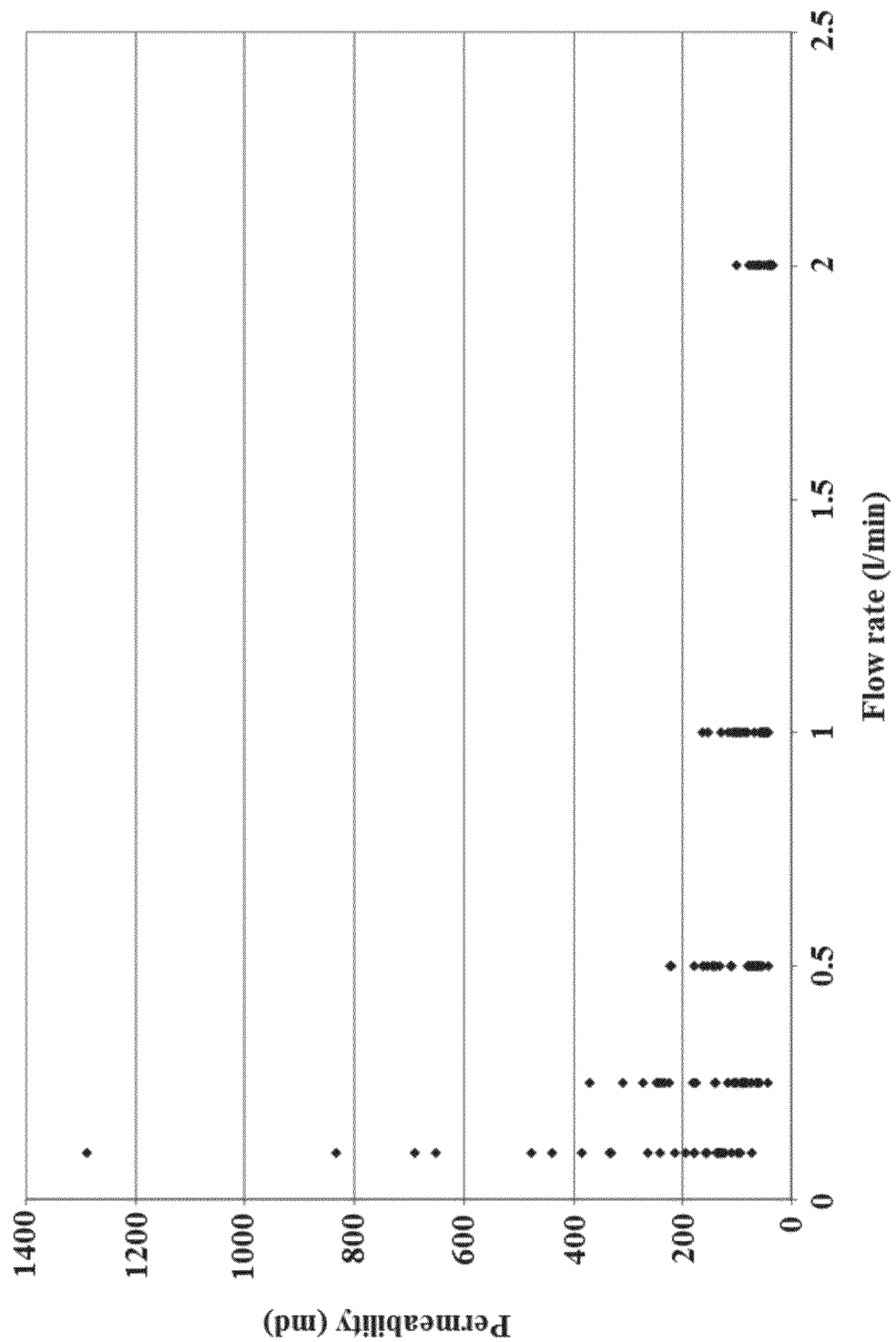

FIG. 20 shows a plot of the calculated permeability as a function of flow rate.

Figure 21:
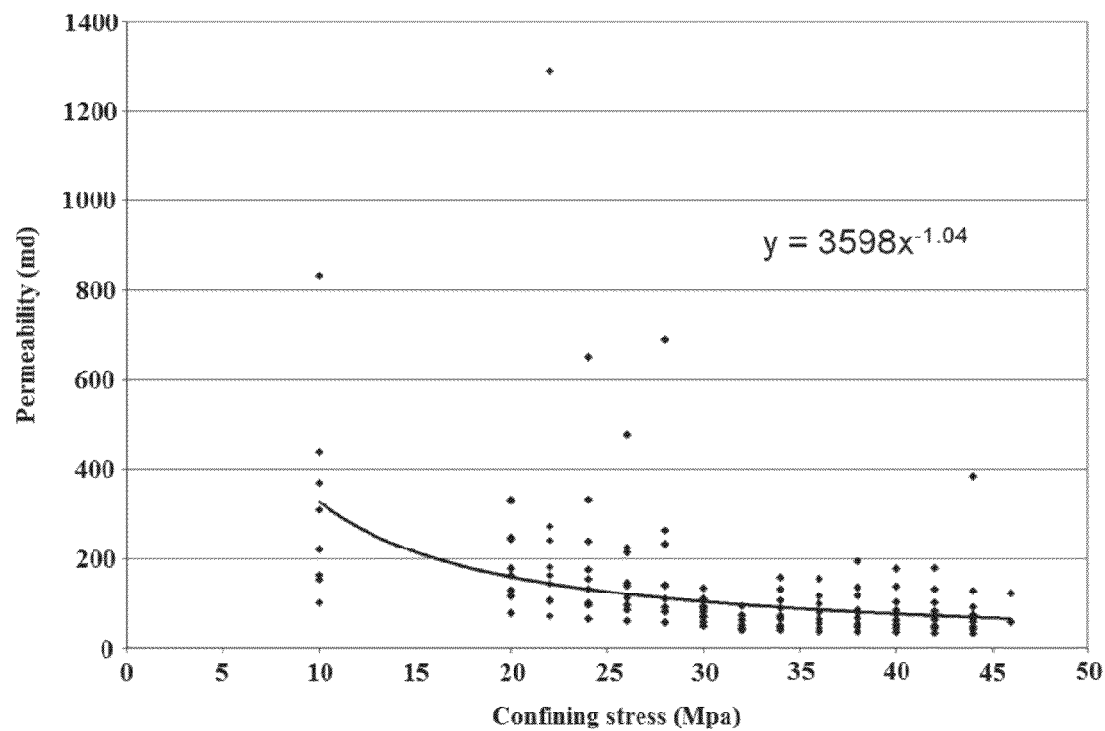

FIG. 21 shows a plot of the calculated permeability as a function of confining stress.

Figure 22:
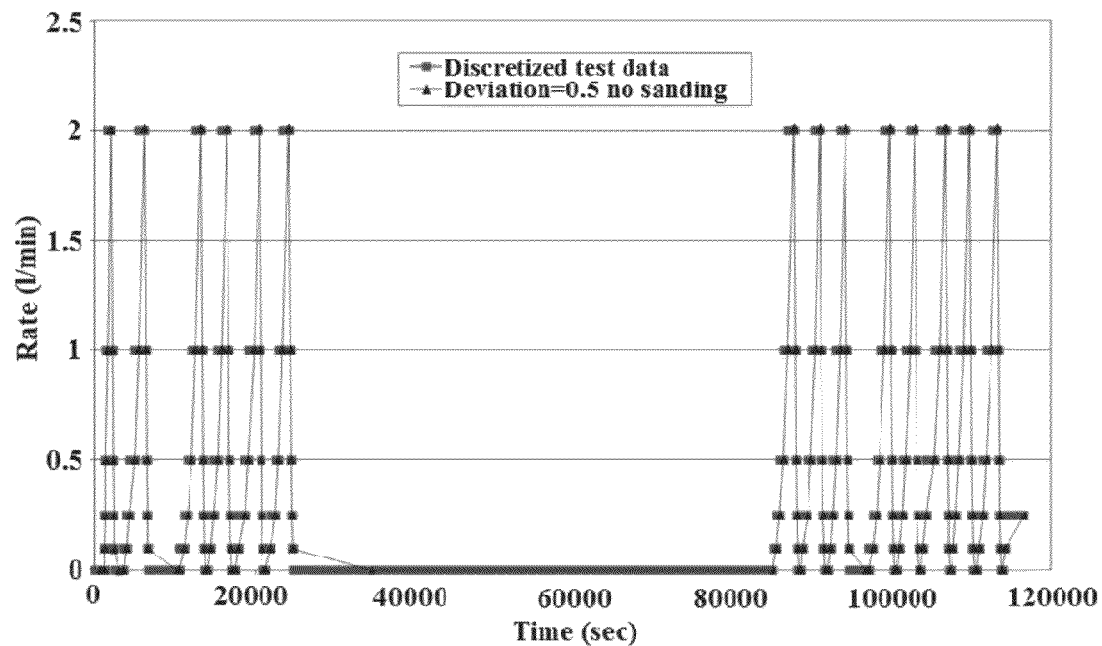

FIG. 22 shows a graph showing the match of the discretized and modeled flow rates as a function of time.

Figures 23A, 23B:
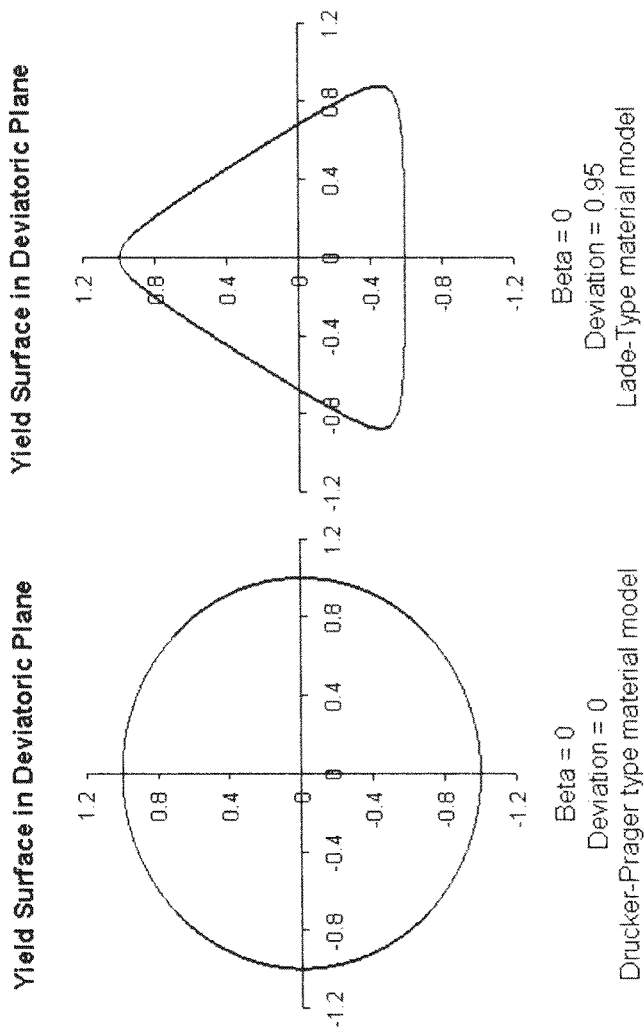

FIG. 23A shows the shape of the yield surface in the deviatoric plane for a Drucker-Prager-Type material model (beta=0 and deviation=0).

FIG. 23B shows the shape of the yield surface in the deviatoric plane for a Lade-Type material model (beta=0 and deviation=0.95).

Figure 24:
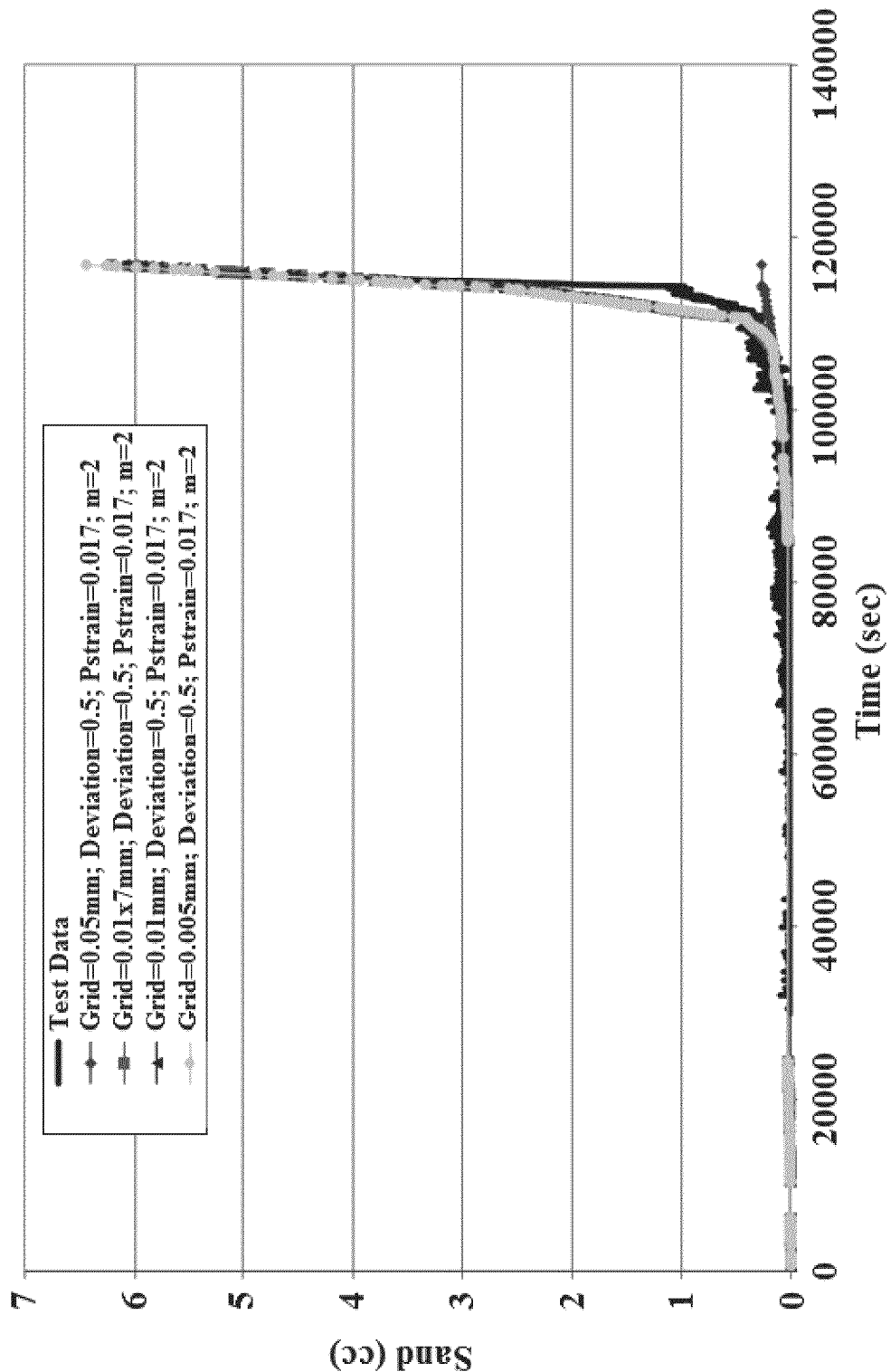

FIG. 24 shows a plot of sand production volume (cc) vs. time (sec) from a measurement of a core sample (black line) and different fits of a model to the results using grid sizes of 0.05 mm, 0.01 mm, and 0.005 mm. A grid size of 0.01 mm was small enough to capture the model details and eliminate grid dependencies. The material constants used were: deviation=0.5, beta=0, critical strain value=0.017, and the exponent=2.

Figure 25:
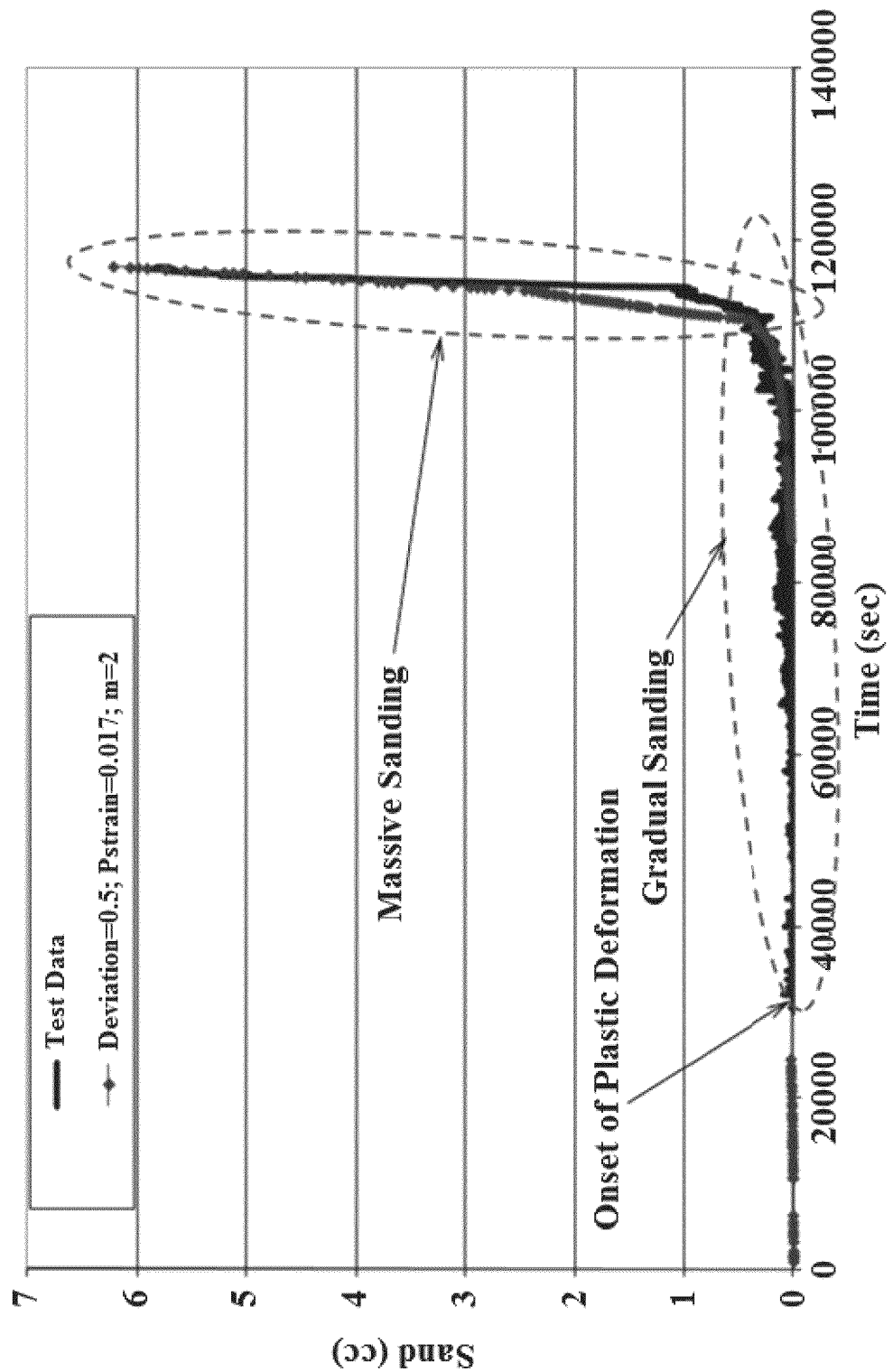

FIG. 25 shows a plot of sand production volume (cc) vs. time (sec) from a measurement of a core sample (black line) and a fit to the results using material constants of deviation=0.5, beta=0, critical strain value=0.017, and the exponent=2. The data was fit for both the massive sanding and the gradual sanding portions of the curve.

Figure 26:
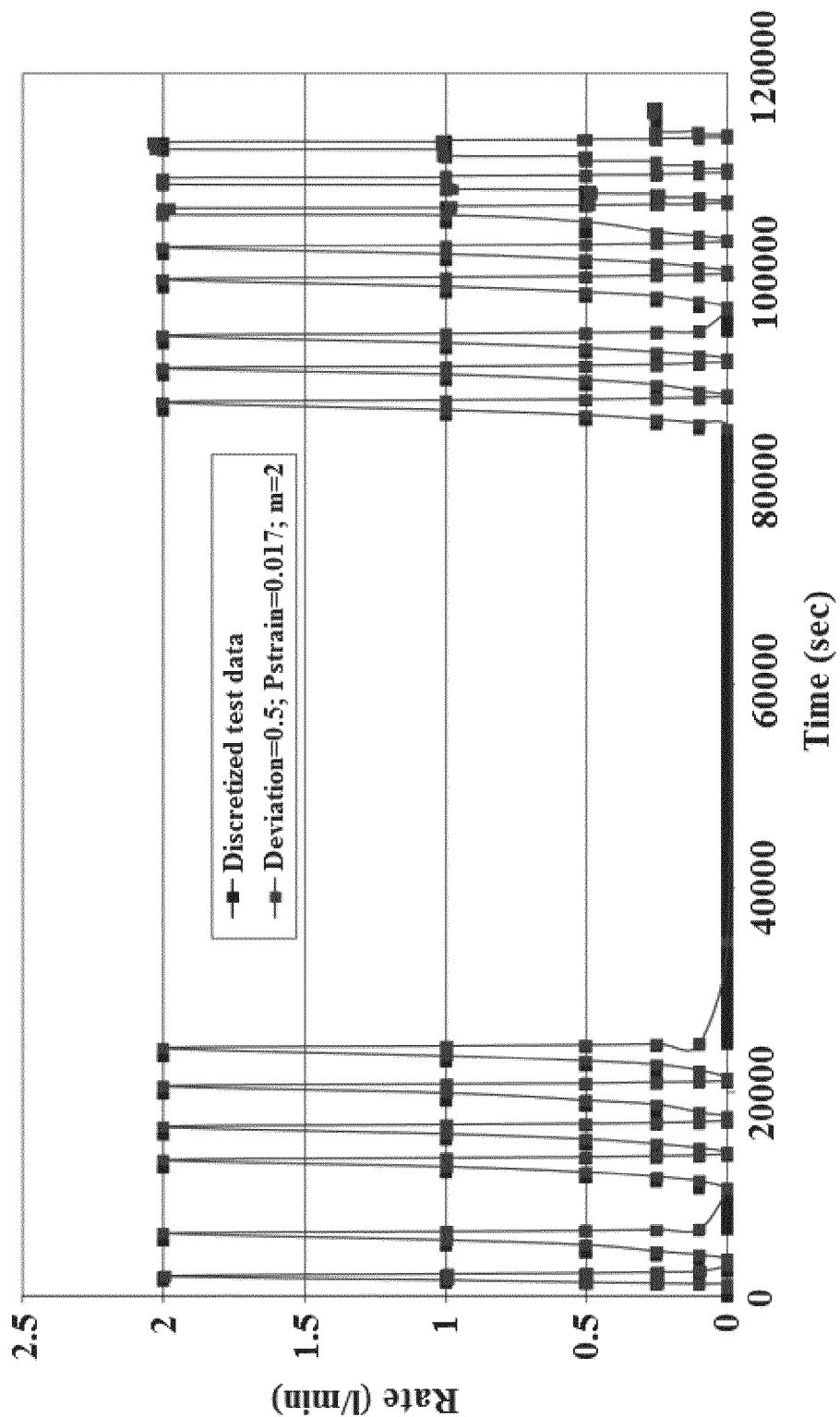

FIG. 26 shows a plot of the discretized measured water volume (liters (l)/min) vs. time (sec) from measurement of a core sample (black line) and a fit to the results using material constants of deviation=0.5, beta=0, critical strain value=0.017, and the exponent=2.

Figure 27:
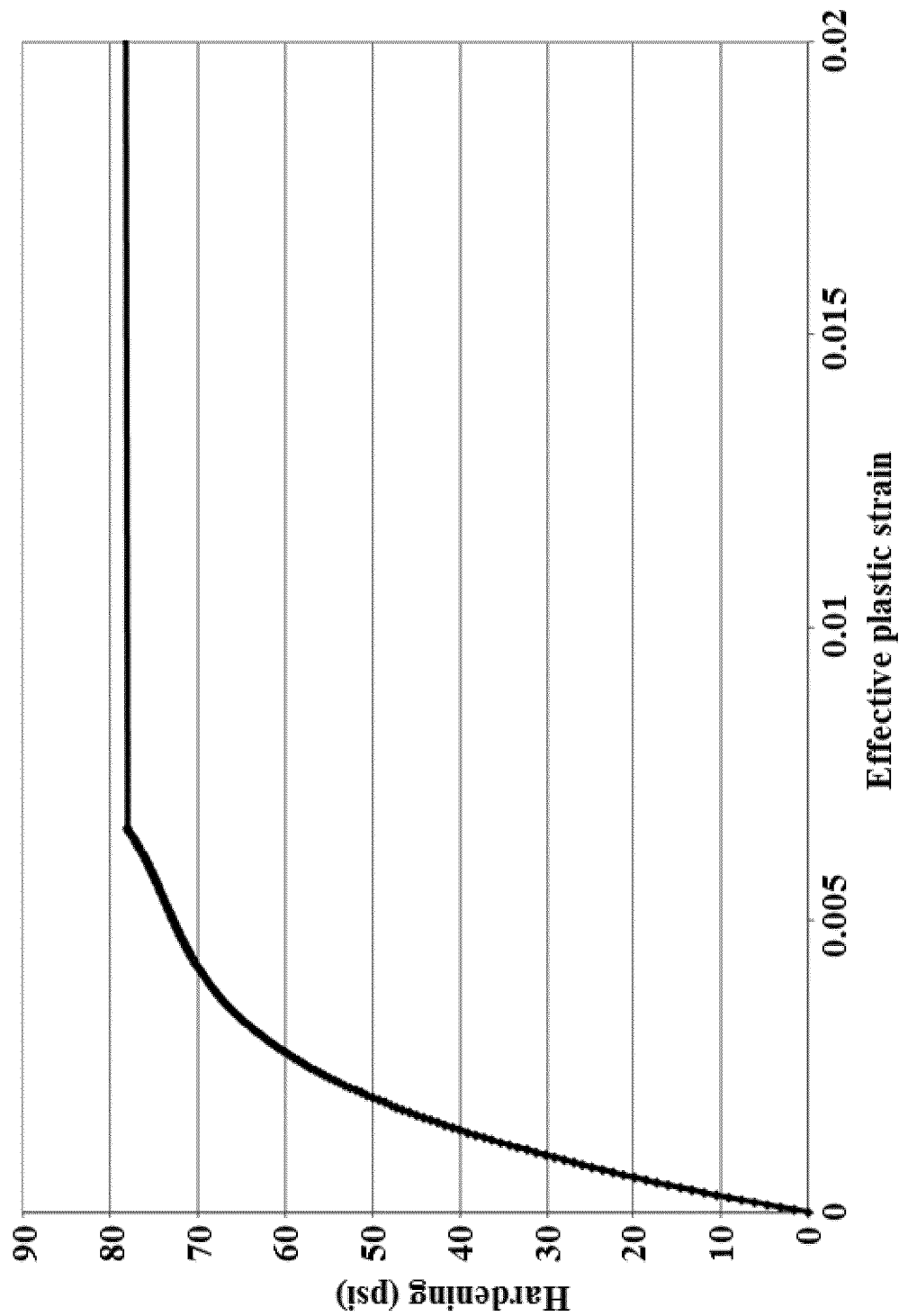

FIG. 27 shows a plot of effective plastic strain vs. hardening (psi) for the brine test.

Figure 28:
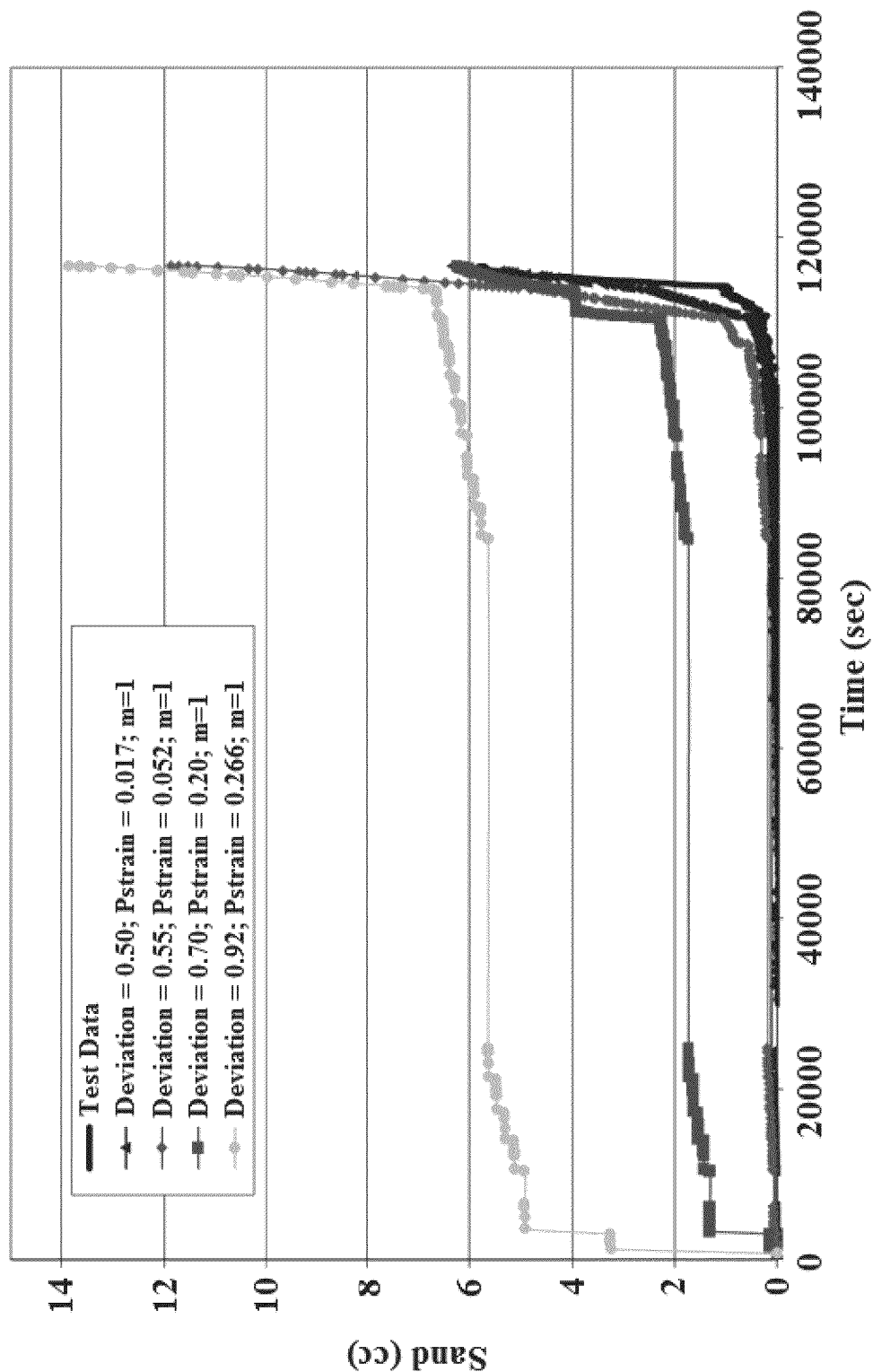

FIG. 28 shows a plot of sand production volume (cc) vs. time (sec) from measurement of the core samples (black line) and different fits to the results where the deviation and the critical strain limit are varied as indicated, and beta and the exponent are kept constant at 0 and 1, respectively.

Figure 29:
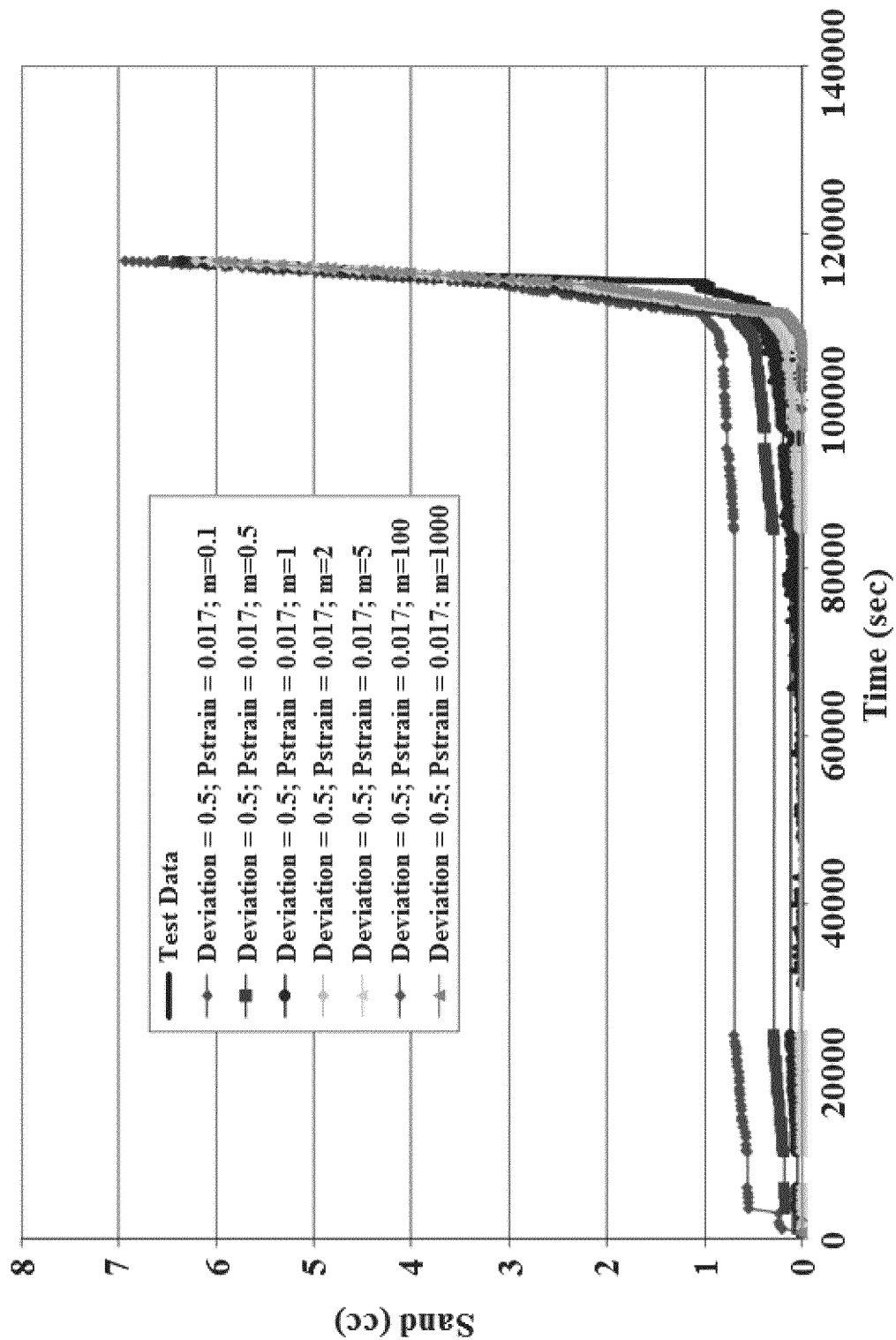

FIG. 29 shows a plot of sand production volume (cc) vs. time (sec) from measurement of the core samples (black line) and different fits to the results where the deviation=0.5, beta=0, and the critical strain value=0.017, and the exponent (m) value is varied as indicated.

Figure 30:
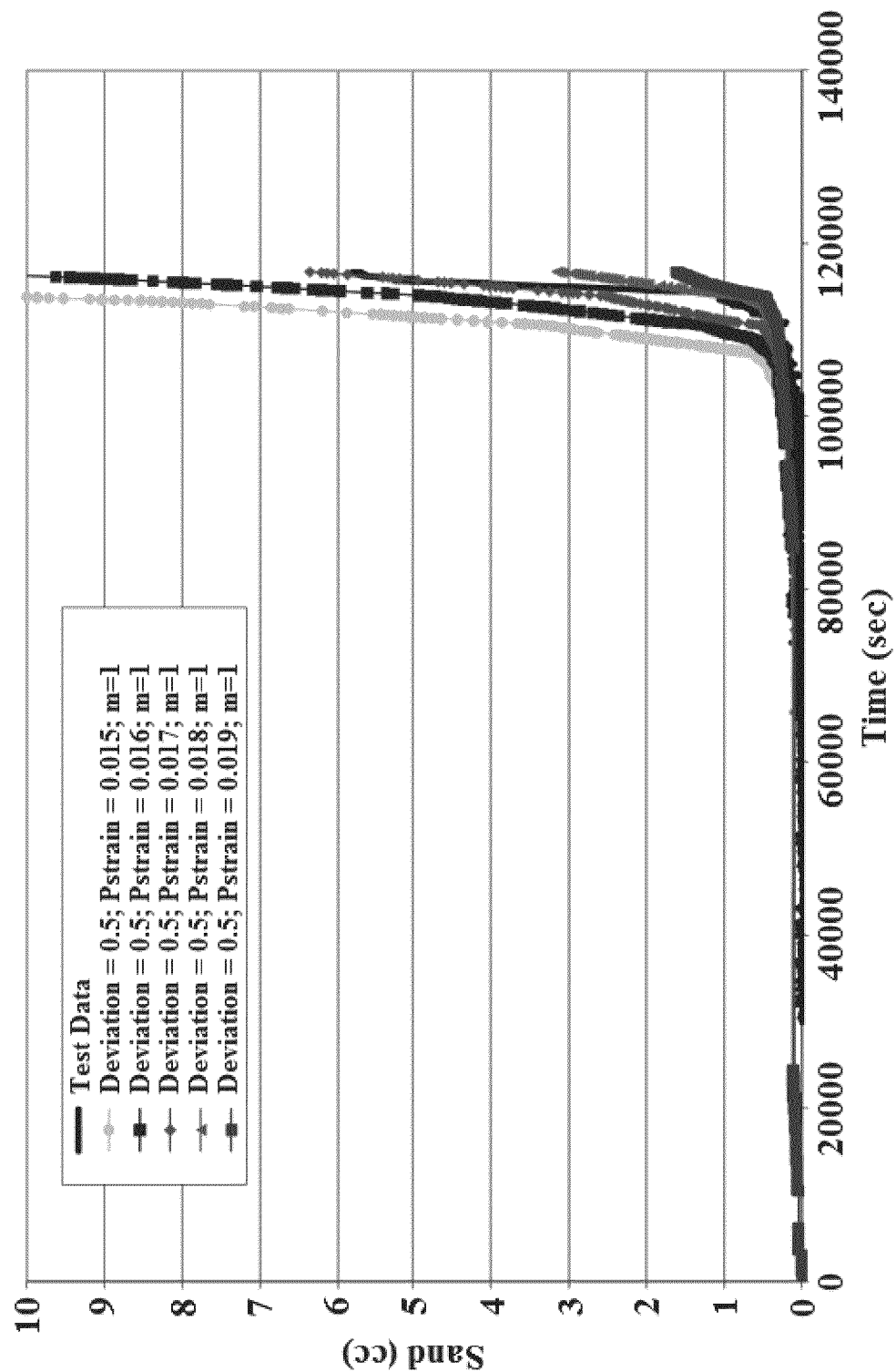

FIG. 30 shows a plot of sand production volume (cc) vs. time (sec) from measurement of the core samples (black line) and different fits to the results where the deviation=0.5, beta=0, and the exponent=1, and the critical strain limit is varied.

Figure 31:
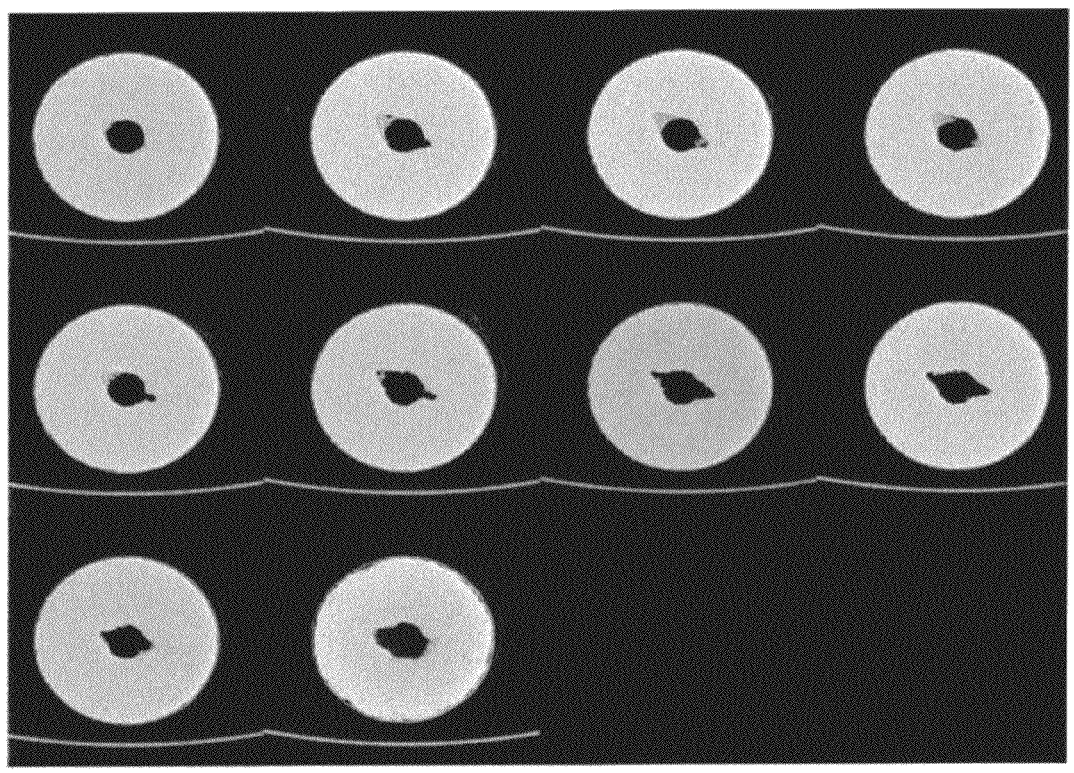
Figure 32:
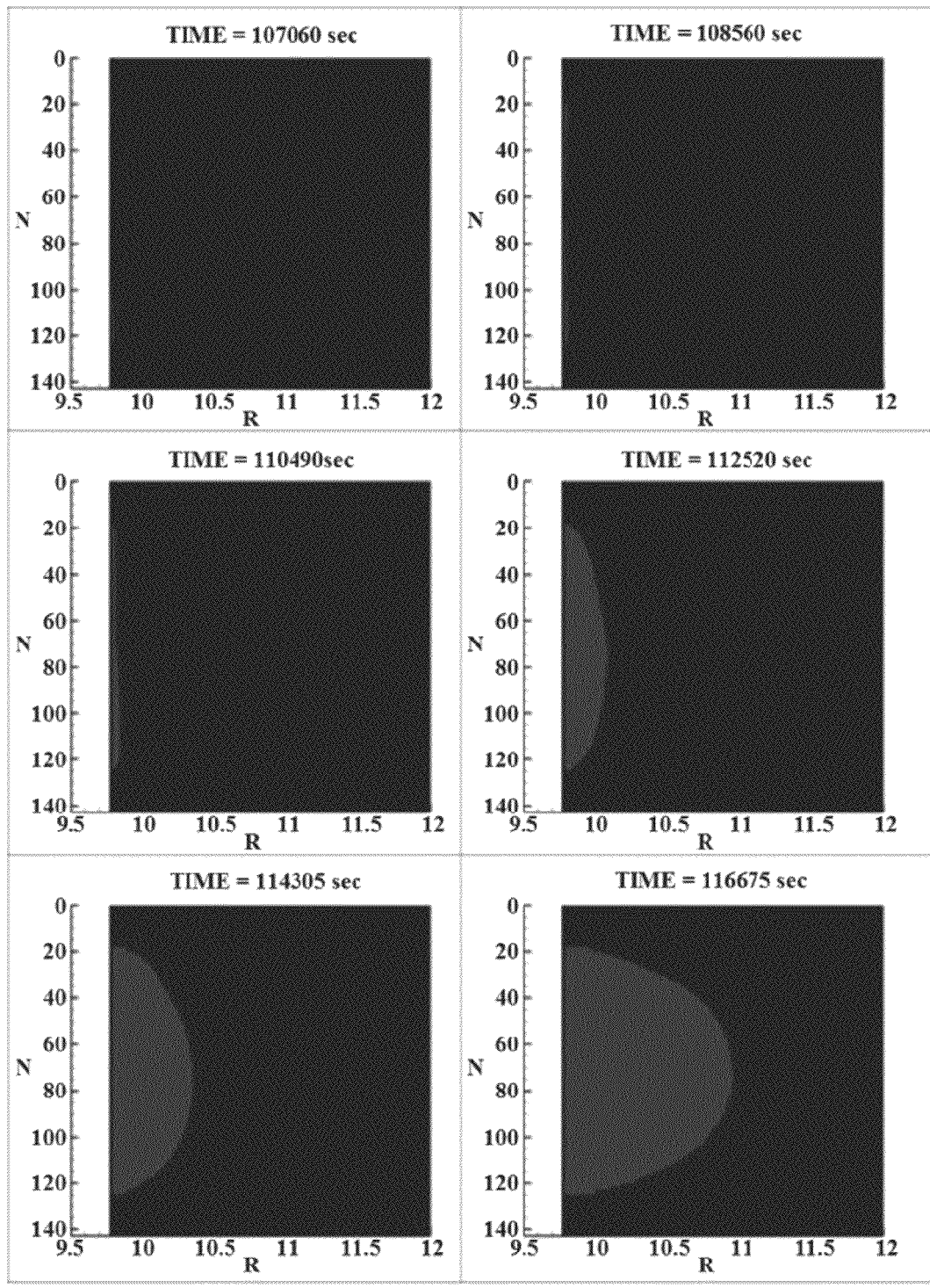

FIG. 31 shows horizontal slices taken from the top to the bottom of a core sample, showing cavity progression. The slices were taken at the end of a sand production test. It was FIG. 32 shows numerical simulations of the cavity progression over time. Each plot is a axially-symmetric vertical slice, where the grey areas show the location and extent of the cavity and the black areas show intact rock (or spacer). Material constants used in the simulation were: deviation=0.5, beta=0, critical plastic strain value=0.017, and the exponent=2.

Figures 33A, 33B:
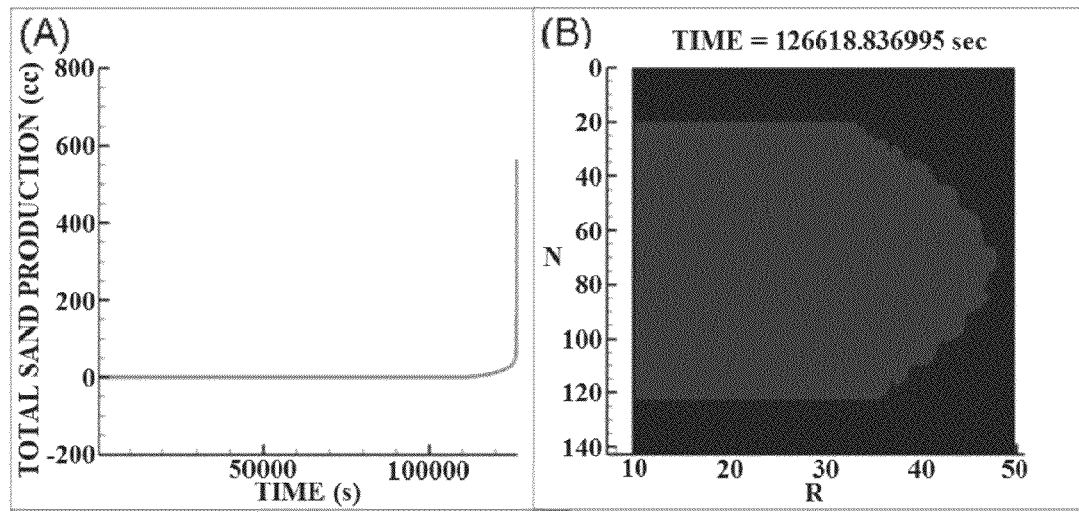

FIG. 33A shows a plot of sand production (cc) vs. time (sec), computed using material constants of deviation=0.5, beta=0, critical strain value=0.017, and the exponent=2.

FIG. 33B shows a numerical simulation of cavity size, computed for a constant confining stress of 46 MPa and a constant pressure differential of 0.1643398 MPa from 116675 seconds onwards, and using material constants of deviation=0.5, beta=0, critical strain value=0.017, and the exponent=2. The grey area indicates the location of the cavity and the black region indicates intact rock (or spacer).

Figure 34:
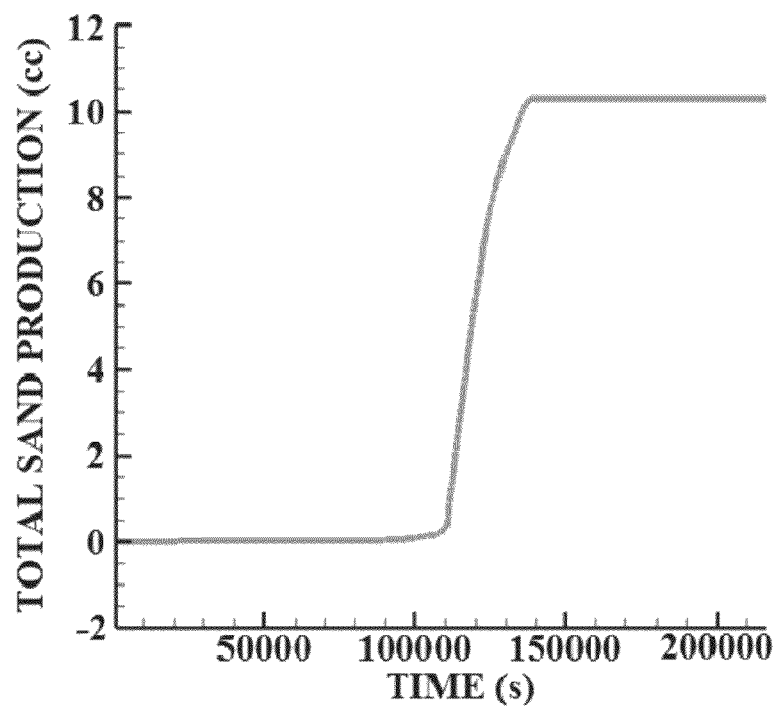

FIG. 34 shows a numerical simulation of sand production (cc) vs. time (sec), computed for the a constant confining stress of 44 MPa and a constant pressure differential of 1.255317 MPa from 113230 seconds onwards, and using material constants of deviation=0.5, beta=0, critical strain value=0.017, and the exponent=2.

5. DETAILED DESCRIPTION

Systems and methods are provided for use in predicting sand production from a geomechanical reservoir system. The systems and methods use measured reservoir properties to generate such sand production predictions, which are useful in that they would allow determining, early in the reservoir development project, if and when sand production could occur and at what rate.

Such sand production predictions can be used to determine, early in a reservoir development project, the type of completion techniques which may be implemented to drastically reduce sand production throughout the life of a well, or to allow a certain amount of gradual sanding (a gradual temporal evolution of the sand production), but which does not lead to massive sanding. For example, decisions can be made as to the designs of the barrier system to be used around the borehole of the reservoir, such as but not limited to sand screen technology or gravel packs. Decisions can be made as to whether an unconsolidated formation with multiple producing zones should be completed cased hole. Such sand production predictions could help to reduce the costs associated with well completion, since the decision can be made, depending on the allowable degree of sand production, to install less sand production mitigation equipment than would be used in the absence of the sand production predictions. The sand production predictions also can be used to make decisions on how to operate the reservoir, such as but not limited to the drawdown pressure, production rate, minimum bottomhole pressure, temperature of the production zone, and fluid flow pressure in the wellbore, to achieve the desired amount of sand production. In addition, the sand production predictions can be used to make a decision as to the point in the lifetime of a well at which to use techniques and to install equipments to mitigate sand production.

The sand production prediction systems and methods disclosed herein are physically based and can be used to predict the phenomena of onset of sanding, gradual sanding, and massive sanding. The sand production prediction systems and methods are deterministic, i.e., they are based on physical principles and not merely correlations. For example, physically based sanding criteria are applied to the computations to determine whether sanding occurs, in what amount, and at what rate.

Operating a reservoir according to the results of the sand production predictions can lead to a substantial savings by reducing the completion costs. The results from the sand production predictions can be used for sanding management. Sanding management can be used, for example, to make decisions concerning the type and cost of sand prevention completions to install, e.g., cased hole and perforation, or conventional propped fracture completions, which produce a limited amount of sand.

5.1 Examples of Sand Production Prediction Systems and Methods

Figure 1:
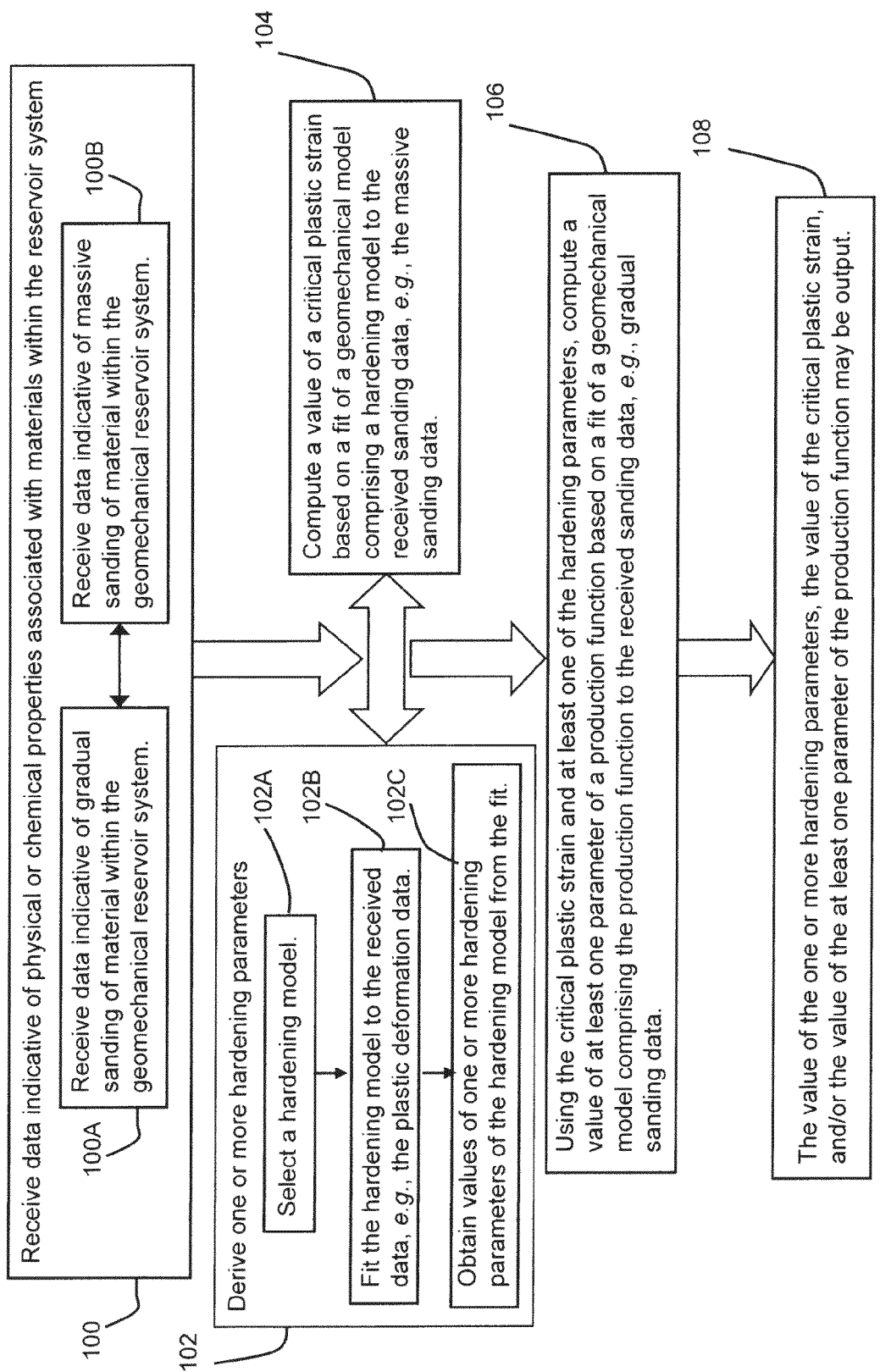
FIG. 1 is a flow chart of a method for use in predicting sand production from a geomechanical reservoir system.

The flow chart of FIG. 1 shows steps in an example system and method for use in predicting sand production from a geomechanical reservoir system.

Step 100.

In step 100, data indicative of physical or chemical properties of material within the geomechanical reservoir system are received. For example, data indicative of physical or chemical properties of materials in the geomechanical reservoir system during one or more stages of sanding of material may be received. In the example of FIG. 1, data indicative of gradual sanding of material in the geomechanical reservoir system are received in step 100A. Gradual sanding refers to a gradual temporal evolution of sanding of material in the reservoir. In step 100B, data indicative of massive sanding of material in the geomechanical reservoir system are received. Massive sanding refers to an sharp increase in sand production. Such data include but are not limited to a rate of sanding (in units of volume of sanding over time). Other examples of such data include, but are not limited to, type of formation material, porosity of formation material, permeability of formation material, types of fluid in the reservoir, pore pressure, temperature, and viscosity of a fluid in the wellbore, temperature of the production zone, fluid flow pressure in the wellbore, drag force of fluid flow in the wellbore, and type of fluid flow in the wellbore. Other examples of such data include, but are not limited to, the depth of the well, the oil gravity, the oil viscosity, the net thickness of the rock type, the current reservoir pressure, the minimum oil content, the oil saturation, the permeability and porosity of the rock, the temperature of the system, the transmissibility of the rock formation, the water salinity, existing fracture system, gas cap, dip angle, well spacing, receptivity, hydrocarbon (HC) composition, minimum miscibility pressure, pressure ratio, gas saturation, bubble point pressure, critical gas saturation, gas ratio, and vertical sweep factor.

The received data may be indicative of plastic deformation of material in the geomechanical reservoir system. That is, the data can be one or more values of parameters which provide a measure of the plastic deformation of formation materials. Data indicative of elastic behavior of materials in the reservoir system also may be received. Examples of such data are, but are not limited to, Young's modulus, yield strength, a stress-strain curve for the material, an ultimate strength, strain hardening behavior, necking behavior, point of fracture. In an example, data indicative of the onset of plastic deformation (that is, the point of transition from elastic to plastic behavior) can be received. For example, yield strength can be used to pinpoint an elastic limit of a material, beyond which additional stress on the material can cause permanent (plastic) deformation to occur.

Determination of a yield criterion of a material also can be used to determine an onset of plastic deformation of the material. A yield criterion (which can be displayed as a yield surface) can be used to indicate a limit of material elasticity (and an onset of plastic deformation) under different combinations of stresses. Examples of yield criteria which can be as applied to isotropic materials, i.e., materials which have uniform properties in all directions, are criterion based on a maximum principal stress, a maximum principal strain, a maximum shear stress, a total strain energy, and a distortion energy. For a yield criterion based on a maximum principal stress, yield can be considered to occur when the largest principal stress applied to the material exceeds the uniaxial tensile yield strength. With a maximum principal strain criterion, yield can be considered to occur when the maximum principal strain of the material reaches the strain corresponding to the yield point during a simple tensile test. For a maximum shear stress yield criterion (Tresca yield criterion), yield can be considered to occur when the shear stress applied to the material exceeds the shear yield strength. In a total strain energy yield criterion, it can be assumed that the stored energy associated with elastic deformation at the point of yield is independent of the specific stress tensor, so that yield occurs when the strain energy per unit volume is greater than the strain energy at the elastic limit in simple tension. With the distortion energy yield criterion (Von Mises yield criterion), yield can be considered to occur when the shape distortion of the material exceeds the yield point for a tensile test. Other examples of yield criteria applied to isotropic materials are the Mohr-Coulomb yield criterion, the Drucker-Prager yield criterion, and the Bresler-Pister yield criterion. Examples of yield criteria which can be as applied to anisotropic materials, i.e., materials whose plastic yield behavior shows directional dependency, include but are not limited to, Hill's quadratic yield criterion, generalized Hill yield criterion, and the Hosford yield criterion.

Figure 4:
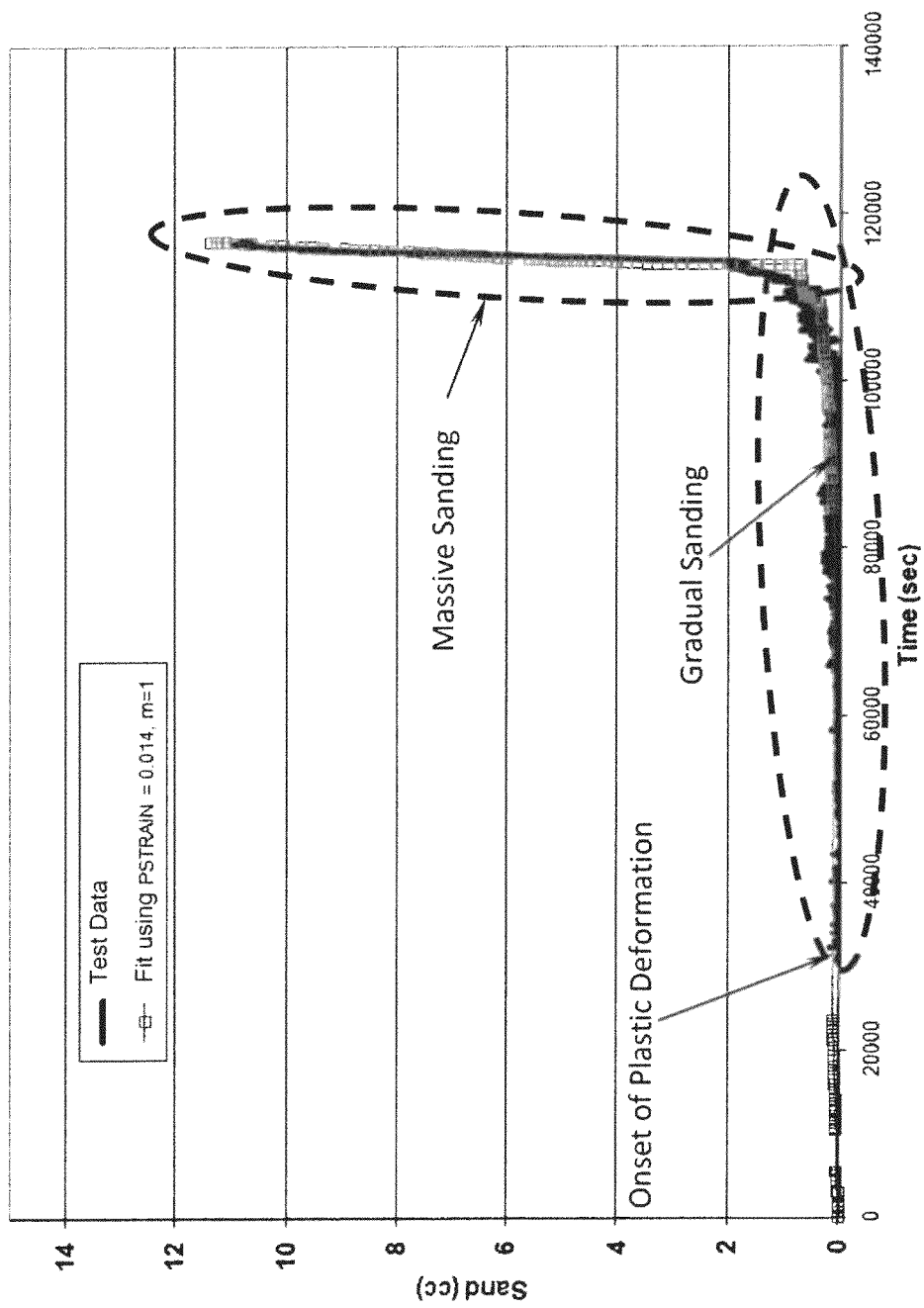
FIG. 4 shows the results of a hollow cylinder test, plotted as sand production (in cubic centimeters (cc)) versus time (seconds) and a fit to the results using material constants of critical strain value=0.014, and the exponent (m)=1. The hollow cylinder sanding test data was fit for both the massive sanding and the gradual sanding portions of the curve.

Data indicative of elastic behavior, plastic deformation behavior, gradual sanding, or massive sanding, of a material in the reservoir system can be obtained from tests such as, but not limited to, a triaxial compression test, a triaxial extension test, a uniaxial strain test, an oedometer test, and a hydrostatic compression test. FIG. 2A shows the direction and relationship of the stress components ($\sigma_x$, $\sigma_y$, $\sigma_z=\sigma_x$) which can be applied to a cylinder of material 200 in a triaxial test. FIG. 2B shows the stress component ($\sigma_y$) which can be applied in the y-direction to a cylinder of material 202 in an oedometer test; the material can be confined in a confining ring 204 during the compression loading such that no stress is applied in the x,z-directions. Either or both of these tests can be used to provide data indicative of elastic behavior, plastic deformation behavior, gradual sanding, and/or massive sanding, of a material in the reservoir system. The data can be obtained from tests performed on the material involving different loading paths for the material. Data also can be obtained from a hollow cylinder test, in which a flow test and different combinations of axial, spherical, or torsional stress are applied to a hollow cylindrical sample of material. FIG. 3 shows a schematic of a hollow cylinder test setup. FIG. 4 shows data obtained from a hollow cylinder test performed on a material, and also shows the point of onset of plastic deformation, the region of gradual sanding, and the region of massive sanding in the data. Data also can be obtained from a perforation test, in which a flow test is performed on a cylindrical sample of a material after one end of it has been perforated (i.e., subjected to a shaped explosive charge). Flow tests can be performed with oil, gas, brine water, or any combination these fluids. FIG. 5A shows a schematic of a perforation test setup, and FIG. 5B shows samples of materials which have been subjected to a perforation test. FIG. 6 shows data obtained from a hollow cylinder test performed on a material, and also shows the point of onset of plastic deformation, the region of gradual sanding, and the region of massive sanding in the data.

Data can be obtained from tests performed on one or more core samples taken from a site of an actual well, or the site of a proposed well. For example, data can be obtained from tests performed on a core sample of material can be taken from a wellbore. Such core samples can be taken from different parts of the reservoir representative of the formation where sanding may occur. In another example, data can be obtained from tests performed on a synthetic sample which is created to have similar physical and chemical properties to the actual formation materials from a well, such as from the regions of the well formation where sanding may occur.

Step 102.

Values of one or more hardening parameters are derived based on a fit of at least one hardening model to the received data. Hardening models can be used to model the plastic deformation behavior of material within the geomechanical reservoir system. Hardening models are discussed in Section 5.5.2.4 below. Examples of hardening models include the Drucker-Prager model with shear hardening or cap hardening, the modified Drucker-Prager model with tabular hardening, the modified Bigoni-Piccolroaz model, and the Matsuoka-Nakai model. Additional examples of hardening models include, but are not limited to, the modified Cam-Clay model, the DiMaggio and Sandler generalized cap model, the Lade model, the Iwan/Mroz multi-surface model, and the Fossum and Fredrich continuous surface cap plasticity model.

Examples of hardening parameters which may be derived in connection with the modified Drucker-Prager model are, but are not limited to, $\alpha$ (a multiplier of a first invariant of total stress), a Drucker-Prager exponent, a yield constant ($\Gamma$), an effective plastic strain $\epsilon^p$, and a deviation (K). Examples of hardening parameters which may be derived in connection with the modified Bigoni-Piccolroaz model are, but are not limited to, deviation ($\gamma$), beta ($\beta$), $\alpha$, and a yield constant ($\Gamma$).

Step 102 can involve several steps, as illustrated in FIG. 1. In step 102A, a hardening model is selected. In a next step, the selected hardening model is fit to the received data. For example, as illustrated in step 102B, the selected hardening model can be fit to received data indicative of the plastic deformation behavior of the material in the reservoir (discussed above in connection with step 100). In step 102C, the values of one or more parameters of the hardening model fit to the data are obtained.

The fit of the hardening model to the received plastic deformation data can be performed using any applicable data fitting method. For example, the fit can be performed using a regression method, such as a linear regression and a nonlinear regression. Regression packages which perform a regression fit to data are known in the art. The regression can be performed with limited dependent variables, can be a Bayesian linear regression, a quantile regression, or a nonparametric regression. The fit can be performed using a statistical method. Examples of packages which can be used for performing a fit of the hardening model to the received plastic deformation data include, but are not limited to, SAS® (SAS Institute Inc., Cary, N.C.), MATLAB® (The MathWorks, Inc., Natick, Mass.), R (accessible via the World Wide Web at the website of the R Project for Statistical Computing), and Dap (accessible via the World Wide Web at the website of the GNU Operating System).

Step 104.

In step 104, a value of a critical plastic strain is computed based on a fit of a geomechanical model comprising a hardening model to the received sanding data. In an example, the sanding data may be the received data indicative of gradual sanding data or the received data indicative of massive sanding data, or a combination of the two. The critical plastic strain can be a critical value of the plastic strain of the material which indicates a point when the material fails, i.e., rubblizes to form sand and generate a cavity. In an example, the critical plastic strain is a critical value of an effective plastic strain of the material.

An applicable geomechanical model can model the stresses, strains, and/or displacements of isotropic materials, transversely isotropic materials, linear elastic materials, porous materials, solid materials, or any combination thereof. In an example, the geomechanical model can model plastic deformation behavior of materials. Examples of geomechanical models are discussed in Section 5.5.2 below (which includes a discussion of hardening models).

The fit of the geomechanical model comprising the hardening model to the sanding data can be performed using any applicable data fitting method. For example, the fit can be performed using a regression method, such as a linear regression and a nonlinear regression. In another example, the fit can be performed by solving a system of partial differential equations, where the system of partial differential equations comprises the geomechanical model comprising the hardening model. The system of partial differential equations also may comprise a reservoir flow model (discussed in Section 5.5.1 below). The system of partial differential equations can be coupled through a fully-expanded Jacobian, as discussed in Section 5.7 below. The solving of the system of partial differential equations can include solving simultaneously in a single time step the fully-expanded Jacobian based on the received data (see Section 5.7 below), such as the sanding data. The system of partial differential equations also may comprise a thermal model (discussed in Section 5.5.3 below). A procedure which can be used for solving the system of partial differential equations is discussed below in Section 5.7.

The fit of the geomechanical model comprising the hardening model to the sanding data can be performed as part of a broader computation of a system of equations which model the geomechanical reservoir system, and which can be used to compute the stresses, strains, and/or displacements that arise when fluids are injected into or produced from a reservoir as well as when stresses are applied to the boundaries of a reservoir. In some computations, a reservoir system model, comprising a geomechanical model (comprising the hardening model), a thermal model, and a reservoir flow model, is capable of solving systems that include porous flow, heat flow, and geomechanics.

In an example, the fit of the geomechanical model comprising a hardening model to the received massive sanding data can be obtained by solving a system of partial differential equations that model the geomechanical reservoir system, where the system of partial differential equations comprises a reservoir flow model and the geomechanical model comprising the hardening model, where the system of partial differential equations is coupled through a fully-expanded Jacobian, and where solving the system of partial differential equations includes solving simultaneously in a single time step the fully-expanded Jacobian based on the received massive sanding data. The system of partial differential equations also may comprise a thermal model.

Although step 102 was discussed prior to step 104, it should be noted that either step could have been performed first. As illustrated in FIG. 1, either of steps 102 and 104 may be performed at that stage of the flow chart. Steps 102 and 104 also may be performed iteratively, where a result from performance of one step can be used in the other step. For example, if step 102 is performed first, then the value of one or more parameters from the fit in step 102 is used in step 104 to compute the critical plastic strain. If step 104 is performed first, then the critical plastic strain computed in step 104 is used in the fit in step 102 to derive values of one or more hardening parameters. Furthermore, steps 102 and 104 may be performed repeatedly and iteratively to arrive at better fits to the data. As a non-limiting example, if the hardening model is a modified Bigoni-Piccolroaz model, then an initial value of one or more of the deviation ($\gamma$), beta ($\beta$), $\alpha$, or yield constant ($\Gamma$) can be derived in step 100 and used in step 104 to compute, for example, a value of a critical plastic strain which fits to data indicative of massive sanding. The computed value of the critical plastic strain may be used in a second iteration of computation in step 100 of a parameter of the hardening model. The second iteration of Step 100 could provide a better fit to the received data. The result from the second iteration of step 100 may be provided to step 104 for a second iteration of computation of the critical plastic strain to improve the fit to the massive sanding data. The iterations may cease once the fits in steps 100 and 104 have converged to a best match to the data.

Step 106.

A value of at least one parameter of a production function is computed based on a fit of a geomechanical model comprising the production function to the received gradual sanding data, and using the value of the critical plastic strain (discussed in step 104) and a value of at least one of the hardening parameters (discussed in step 102).

The production function models the amount of sand production from a material prior to reaching the critical plastic strain. Production functions are discussed in Section 5.5.2.5 below. The production function can be any function $f(x)$ whose values vary from $f(x)=0$ when $x=0$, to $f(x)=1$ when $x=1$. The sand production function also can be any function $f(x)$ whose values can be scaled to fall within a range from $f(x)=0$ when $x=0$ and $f(x)=1$ when $x=1$. In another example, the sand production function also can be any function $f(x)$ whose values can be transformed to fall within the range from $f(x)=0$ when $x=0$ and $f(x)=1$ when $x=1$, by application of a suitable transform, such as but not limited to, a wavelet transform and a Lagrange transform. The term x can be any function g( ) of the critical plastic strain (i.e., $x=g(\epsilon_{lim}^P)$). The function $f(x)$ may be any monotonic function of x, including but not limited to, a fraction function, a power function, a sine function, a cosine function, a logarithmic function, an exponential function, a sigmoid function, or any combination thereof. In some examples, x can be a function of both the critical plastic strain ($\epsilon_{lim}^P$) and the plastic strain invariant ($\epsilon^P$) of a material, such as but not limited to a ratio $x=\epsilon^P/\epsilon_{lim}^P$. In an example, the production function can be given by $f(x)=(\epsilon^P/\epsilon_{lim}^P)^m$, where m is an exponent.

The parameter for which a value is computed in step 106 may be any parameter which can be used to characterize the production function. For example, if the production function is a power function, the parameter can be at least one exponent of the power function. In a certain example where the production function is given by $f(x)=(\epsilon^P/\epsilon_{lim}^P)^m$, the parameter can be the exponent m. In the foregoing example, the at least one parameter of the production function for which a value is a computed in step 106 is an exponent. In other examples, the parameter can be a multiplier of a term of the production function.

The production function can be used to predict the amount of sand production from a material prior to failure, i.e., during gradual sanding prior to reaching the critical plastic strain.

For example, FIG. 4 shows the results of a fit of the production function $(\epsilon^P/\epsilon_{lim}^P)^m$ to the data received from a hollow cylinder test. The data was fit for both the massive sanding and the gradual sanding portions of the curve using material constants of critical strain value $(\epsilon_{lim}^P)=0.014$, and the exponent $(m)=1$. In another example, FIG. 6 shows the results of different fits of the production function $(\epsilon^P/\epsilon_{lim}^P)^m$ to the data received from a perforation test using different values of the exponent (m).

The geomechanical model comprising the production function can be fit to the sanding data using any applicable data fitting method. For example, the fit can be performed using a regression method, such as a linear regression and a nonlinear regression. In another example, the fit can be performed by solving a system of partial differential equations, where the system of partial differential equations comprises the geomechanical model comprising the production function. The system of partial differential equations also may comprise a reservoir flow model. The system of partial differential equations can be coupled through a fully-expanded Jacobian and the solving of the system of partial differential equations can include solving simultaneously in a single time step the fully-expanded Jacobian based on the received data, such as the sanding data. The system of partial differential equations also may comprise a thermal model.

In an example, the fit of the geomechanical model comprising the production function to the received gradual sanding data can be obtained by solving a system of partial differential equations that model the geomechanical reservoir system, where the system of partial differential equations comprises a reservoir flow model and the geomechanical model comprising the production function, where the system of partial differential equations is coupled through a fully-expanded Jacobian, and where solving the system of partial differential equations includes solving simultaneously in a single time step the fully-expanded Jacobian based on the received gradual sanding data.

The fit of the geomechanical model comprising the production function to the sanding data can be performed as part of a broader computation of a system of equations which model the geomechanical reservoir system, and which can be used to compute the stresses, strains, and/or displacements that arise when fluids are injected into or produced from a reservoir as well as when stresses are applied to the boundaries of a reservoir. In some computations, a reservoir system model, comprising a geomechanical model (comprising the production function), a thermal model, and a reservoir flow model, is capable of solving systems that include porous flow, heat flow, and geomechanics.

In step 108, information which can be used to predict sand production from the geomechanical reservoir system may be output. Such information can be, but is not limited to, at least one value of the one or more hardening parameters, the value of the critical plastic strain, and/or the value of at least one parameter of the production function. The information can be output to a user, or to various components, such as to a user interface device, a computer readable storage medium, a monitor, a user-accessible local computer, or a user-accessible computer that is part of a network. For example, the output can be visually displayed to a user using a monitor or user interface device such as a handheld graphic user interface (GUI) including a personal digital assistant (PDA).

5.1.1 Other Sand Production Prediction Systems and Methods

Other examples systems and methods for use in predicting sand production from a geomechanical reservoir system includes a step of applying a sand production criterion to a geomechanical model which comprises one or more hardening models. The system and method comprises the steps of receiving data indicative of physical or chemical properties associated with materials within the geomechanical reservoir system, and generating sand production predictions by solving a system of partial differential equations that model the geomechanical reservoir system. In addition to the geomechanical model, the system of partial differential equations may comprise a reservoir flow model and/or a thermal model of the geomechanical reservoir system.

One or more sand production criteria may be applied to the geomechanical model. The sand production criteria can be determined as when a critical value is reached for: (1) the total strain invariant, or (2) the plastic strain invariant, or (3) the maximum effective stress. When the critical value of the sand production criterion is reached, the material fails, i.e., rubblizes to form sand and generate a cavity. The sand production criteria are discussed in Section 5.5.2.5 below.

In an example, the system of partial differential equations can be coupled through a fully-expanded Jacobian, where the solving of the system of partial differential equations, such as by using a computer system, includes solving simultaneously in a single time step the fully-expanded Jacobian based on the received data. The generated sand production predictions may be output to a user, a user interface device, a monitor, a computer readable storage medium, a local computer, or a computer that is part of a network. For example, the generated sand production predictions can be visually displayed to a user using a monitor or user interface device such as a hand-held graphic user interface (GUI) including a personal digital assistant (PDA).

5.2 Systems and Methods for Operating a Geomechanical Reservoir System

Systems and methods for use in controlling sand production from a geomechanical reservoir system during operation also are disclosed. The method operating the geomechanical reservoir system in accordance with a result of the implementation of any of the sand production prediction systems and methods disclosed herein. The flow chart of FIG. 7 shows steps in an example system and method for use in operating a geomechanical reservoir system based on a result of a sand production prediction.

In step 700, data indicative of physical or chemical properties associated with materials within the reservoir system are received. The data received in step 700 can include any of the data described in step 100 above.

In step 702, a value of at least one operating parameter is computed based on a fit of a geomechanical model comprising a production function to the received data, where the production function predicts sand production from the geomechanical reservoir system, and where the at least one value of the operating parameter indicates a condition for sand production from the geomechanical reservoir system. In an example, the computed value of the operating parameter indicates a condition for stabilized sand production from the geomechanical reservoir system.

The prediction of sand production from a reservoir from any of the systems or methods disclosed herein may be used to compute or derive a value of at least one operating parameter for operating a reservoir to achieve the desired amount of sand production or the desired sand production behavior. Examples of operating parameters include but are not limited to, the drawdown pressure, production rate, minimum bottomhole pressure, temperature of the production zone, fluid flow pressure in the wellbore, confining stress, and pressure differential. The results of implementation of the sand production predictions may be used to compute the value of one or more operating parameters which cause a substantially stabilized cavity to develop and maintain in the reservoir. A cavity in a reservoir can be substantially stabilized if, over time, the cavity does not grow substantially larger, or grows larger to a negligible extent. For example, values of one or more operating parameters may be derived based on results of the sand production predictions which indicate an operating condition for the reservoir whereby a limited amount of sand is produced from the reservoir and a cavity in the reservoir created by that limited amount of sanding is substantially stabilized. The sand production from a reservoir may be kept to a minimum by controlling production variables such as, but not limited to, drawdown, minimum bottomhole pressure, and production rate.

In step 704, the geomechanical reservoir system is operated in accordance with the value of the at least one operating parameter. That is, the geomechanical reservoir system can be operated at the computed value for the at least one operating parameter, such as a value of drawdown pressure, production rate, minimum bottomhole pressure, temperature of the production zone, fluid flow pressure in the wellbore, confining stress, pressure differential, or any combination of these parameters.

The results from the implementation of any of the sand production prediction systems and methods can be used to determine the type of completion techniques which may be installed in a reservoir to achieve the desired amount of sand production throughout the life of a well. For example, the designs of the barrier system to be used around the borehole of the reservoir (such as but not limited to sand screen technology or gravel packs) may be selected based on these results. The predictions of sand production also could influence the well completion strategy, such as open-hole, cased hole, and perforated cased hole, use of screen liners, or frac-and-pack (hydraulic fracturing followed by injection of a proppant into the fracture). In addition, the sand production predictions can be used to make a decision as to the point in the lifetime of a well at which to use techniques and to install equipments to mitigate sand production.

5.3 Examples of Modeling Methods

FIGS. 8 and 9 depict examples of systems for use in predicting sand production from a geomechanical reservoir system during oil production. Applicable modeling system includes one or more models which describe various physical aspects of a geomechanical reservoir system. FIG. 8 and FIG. 9 depict modeling systems which include a reservoir fluid flow model and a geomechanical model. The reservoir fluid flow model describes, e.g., porous flow, production and injection. The geomechanical reservoir model describes, e.g., stresses, strains, and displacement that arise when fluids are injected into or produced from a reservoir and when stresses are applied to the boundaries of a reservoir. The system of FIG. 9 also includes a thermal model. The thermal model described heat flow. A system of non-linear partial differential equations can be used to interrelate the various aspects of these models.

After receiving data indicative of physical or chemical properties of material within the geomechanical reservoir system (such as but not limited to plastic deformation, gradual sanding or massive sanding), a solver generates predictions (e.g., sand production predictions) by applying the steps of the method in Section 5.1 above, and at pertinent points, by solving the system of partial differential equations. In the solver of FIGS. 8 and 9, the system of partial differential equations can be coupled through a fully-expanded Jacobian. The solving of the system of partial differential equations includes solving simultaneously in a single time step the fully-expanded Jacobian based upon the received data.

As depicted in FIGS. 8 and 9, the sand production prediction steps (steps 100 to 106 discussed above) can be performed iteratively with the solution of the non-linear system of partial differential equations. That is, at the steps of the sand production prediction which including performing a fit, for example, each of steps 102, 104 and 106, the computation can be performed by solving simultaneously in a single time step a fully-expanded Jacobian of the equations representing the geomechanical reservoir system which are pertinent to the particular step. The generated sand production predictions can be output to various components, such as output to a user interface device, a computer readable storage medium, a monitor, a user-accessible local computer, or a user-accessible computer that is part of a network.

The non-linear system of partial differential equations comprise equations that correspond to what models are to be used in analyzing the geomechanical reservoir system in the given step of the sand production prediction. For example, FIG. 8 provides an example where the non-linear system of partial differential equations includes equations corresponding to a reservoir flow model and a geomechanical model of the geomechanical reservoir system. Depending on the step of the sand production prediction being performed, the geomechanical model may include one or more hardening models, a sand production model (comprising the production function), or both. As another illustration, FIG. 9 provides an example where the non-linear system of partial differential equations includes equations corresponding to a reservoir flow model, a geomechanical model, and a thermal model of the geomechanical reservoir system. Examples of equations that correspond to each of the different models of the geomechanical reservoir system are provided in Section 5.5.

Coupling of the various aspects of the models can be implemented such as through variables in a fully-expanded Jacobian. For example, a fully-expanded Jacobian can act to couple fluid flow in the reservoir to the geomechanical model by one or more of the following variables: effective stress, a porosity and one or more displacements associated with the geomechanical model. A variable in the fully-expanded Jacobian that couples the geomechanical model to the fluid flow can be porosity and permeability that is associated with the reservoir flow model. A variable in the fully-expanded Jacobian that couples the thermal model to the geomechanical model can be a thermal stress associated with the thermal model. A variable in the fully-expanded Jacobian that couples the thermal model to the reservoir flow model can be fluid viscosity, conduction and convection in the reservoir associated with the thermal model. The fully-expanded Jacobian may include terms related to a rate of change (i.e., a time derivative), a spatial derivative, or partial spatial derivative, of a coupling variable, where the derivatives can be of any order, for example, a first-order derivative, a second-order derivative, a third-order derivative, etc. First-, second-, third- and/or higher-order derivatives (whether time derivatives or spatial derivatives) of the coupling variables can be included in the fully-expanded systems of equations. Examples of variables that may couple the different models are provided in Section 5.6.

The nonlinear system of equations of the fully-expanded Jacobian can be solved through numerical approaches, such as the approach discussed in greater detail in Section 5.7, wherein the nonlinear system of equations is solved, e.g., using a full Newton-Raphson expansion of all solution variables, which enhances solution stability and allows second order convergence rates for the nonlinear iterations. Examples of apparatus and computer-program implementations of the different methods disclosed herein are discussed in Section 5.8.

In another aspect, a system and method can include the steps of receiving data indicative of physical or chemical properties associated with material within the geomechanical reservoir system, defining a grid comprising a plurality of grid cells, and generating sand production predictions by solving a system of partial differential equations that model the geomechanical reservoir system. In addition to the geomechanical model, the system of partial differential equations may comprise a reservoir flow model and/or a thermal model of the geomechanical reservoir system.

One or more sand production criteria may be applied to the geomechanical model. The sand production criteria can be determined as when a critical value is reached for: (1) the total strain invariant, or (2) the plastic strain invariant, or (3) the maximum effective stress. The sand production criteria are discussed in Section 5.5.2.5.

In computations which use criterion (2), i.e., computations involving computation of the critical value of the plastic strain invariant (the critical plastic strain), steps 100-106 may be implemented, and at least one parameter of a production function may be computed. The production function can be used to predict the amount of sand production from a grid cell prior to reaching the critical plastic strain value.

In an example, the system of partial differential equations can be coupled through a fully-expanded Jacobian, where the solving of the system of partial differential equations, such as by using a computer system, includes solving simultaneously in a single time step the fully-expanded Jacobian based on the received data. The reservoir model, thermal model and the geomechanical model may be computed on three-dimensional grid cells or two-dimensional grid cells. Three and two dimensional grid cells which may be used in the simulation methods herein are described in Section 5.4.

The generated sand production predictions may be output to a user, a user interface device, a monitor, a computer readable storage medium, a local computer, or a computer that is part of a network.

Solving the nonlinear system of equations implicitly, e.g., using a full Newton-Raphson expansion of solution variables, can enhance numerical stability (e.g., when dealing with cavity generation, or with any simulation that involves very small grid blocks). Using a fully expanded Jacobian from an implicitly coupled system of equations provides more stability for the solution process.

5.4 Simulation Method

FIG. 10A illustrates an example of a three-dimensional (3D) grid which can be used for the computations of the geomechanical model, and the reservoir model and/or the thermal model. For example, one or more of the multi-point flux (such as for reservoir and porous flow) model, the geomechanical model (such as for computing stress, displacement, and/or cavity generation (rubblizing)), and the thermal model, may be computed on the 3D grid. The computation of the geomechanical model, and the reservoir model and/or the thermal model can use a parallel processing approach to couple the grids. The dimensions of the grid cells can be on the order of feet, inches, or fractions of an inch. In another example, the dimensions of the grid cells can be on the order of meters, centimeters, millimeters, microns, or fractions of a micron.

The 3D grid may be structured or unstructured hexahedral grids comprising hexahedral elements. A hexahedral grid cell has eight corners, twelve edges (or sides), and six faces. The hexahedral grid cells may each include at least eight nodes (one at each corner), or more and up to twenty-seven (27) nodes (i.e., a node at the center of each face, the center of each side, the center of each edge, and in the center of the cell). Different hexahedral cells may include different numbers of nodes. In an example, the 3D grid may include structured or unstructured tetrahedral grid elements. In another example, the 3D grid may include other morphologies of elements which span the range between tetrahedral and hexahedral grid elements, either structured or unstructured. The 3D grid may include any combination of the aforementioned grid elements.

A two-dimensional (2D) grid also can be used for the computations of the geomechanical model, and the reservoir model and/or the thermal model. For example, a 2D grid can be used for axisymmetric computations. FIG. 10B illustrates an example of a two-dimensional (2D) grid which can be used for the computations of the reservoir model, thermal model and the geomechanical model.

The 2D grid may be structured or unstructured quadrilaterals grids comprising quadrilateral elements. Each quadrilateral grid cell has four corners and four edges. The quadrilateral grid cells each include at least four nodes (one at each corner) and up to five nodes (i.e., a node at the center).

In certain examples, computations can be performed on both a 2D grid and a 3D grid. For example, depending on the topography of the reservoir, certain of the computations can be performed on a 2D grid, while other computations can be performed on a 3D grid. In these computations, the nodes of the 2-D grid can be configured to coincide with the nodes on one of the outer boundaries of the 3D grid and certain computations, such as fracture widths and 3D displacements, can be coupled at common node points. The input data format for the 2D grid can be similar to that for the 3D grid.

For certain computations, parameters such as fluid flow, displacements, cavity generation, and tractions, can be monitored across the elements of the grid cells.

5.5 Models

Examples of the differential equations that correspond to each of the different models of the geomechanical reservoir system are provided below. The differential equations for the models included in a computation can be combined to produce an implicit, fully-coupled formulation. A consistent set of units can be used for all variables in equations included in a computation.

5.5.1 Reservoir Model

The system of equations for porous flow include conservation of mass $$\frac{\partial}{\partial t}(\rho \phi) = -\nabla \cdot (\rho \vec{U}) + q_w, \quad (1)$$

where $\phi$ is porosity and $\rho$ is fluid density which may be a function of pressure. The model allows wells to be completed in the reservoir elements and the $q_w$ in the equation above accounts for injection into the reservoir elements.

The velocity $\vec{U}$ is the Darcy velocity relative to the porous material and can be defined by $$\vec{U} = -\frac{K}{\mu}(\nabla p - \rho g \nabla h), \quad (2)$$

where K is a tensor permeability, $\mu$ is the viscosity which may be function of pressure, p is fluid pressure, and $\rho g \nabla h$ is a gravitational term.

The geomechanical variables included in the fluid flow equations highlight the coupling between the flow and deformation models (the definitions of some geomechanical terms are described in Section 5.5.2 below).

Temperature-dependent water properties may be entered in different ways for computations involving temperature changes. The water properties may be entered as functions of both pressure (P) and temperature (T) for the fully coupled computations. For iteratively coupled computations, the water properties can be entered as functions of pressure and then modification factors can be used for the temperature effects. The treatment for temperature dependent properties is explained in more detail in Section 5.5.3.

The thermal behavior of the fluids also can be modeled by modifying the fluid properties using modification factors (described in Section 5.5.3.3 below).

5.5.1.1 Multiphase Porous Flow

The reservoir model allows for several phase behavior models ranging from single phase to black-oil to fugacity-based compositions. Darcy flow may be modeled for aqueous phases, nonaqueous liquid phases, and nonaqueous vapor phases and nc components. Any phase behavior models may be used with the porous flow models disclosed herein. The fluid flow equations may be presented in terms of a general compositional formulation. Partial differential equations representing component mass balances for multiphase flow are:

$$\frac{\partial}{\partial t}(\phi N_{ic}) = -\sum_\alpha \nabla x_{ic}^\alpha \rho_\alpha \vec{U}_\alpha + q_{ic}, \quad (3)$$

where $N_{ic}$ is the concentration of component ic per unit pore volume, given by $$N_{ic} = \sum_\alpha x_{ic}^\alpha \rho_\alpha S_\alpha,$$

$x_{ic}^\alpha$ is the mole fraction of component ic in phase $\alpha$, $\rho_\alpha$ is the molar density of phase, and $q_{ic}$ is the molar flow rate of component ic per unit reservoir volume. The velocity of phase $\alpha$ is given by $$U_\alpha = -\frac{K k_{r\alpha}}{\mu_\alpha} \cdot (\nabla P_\alpha - \gamma_\alpha \nabla D), \quad (4)$$

Phase pressures can be defined by $$P_\alpha = P + P_{c\alpha}, \quad (5)$$

where $P_{c\alpha}$ is the capillary pressure and P is the reference pressure. The reference pressure is used for PVT calculations, well calculations, and geomechanical calculations. The reference pressure can be the nonaqueous phase pressure for two-phase models, and the nonaqueous liquid phase pressure for three-phase models.

The porosity can be defined as $$\phi = \phi_o[1 + c_r(P - P_o)] \quad (6)$$

for porous flow models where $\phi_o$, $c_r$, and the initial pressure $P_o$ are functions of location.

For computations that include the geomechanical model, the porosity relative to the initial undeformed bulk volume is given by Equation 15, where it is seen that $c_r$ can be related to the Biot constant for porosity.

5.5.1.2 Non-Darcy Flow

In certain examples, non-Darcy flow may be modeled using the Forschheimer equation to modify the relationship between the pressure gradient and the fluid velocity. In other example, non-Darcy flow can be modeled by specifying a general relationship between fluid velocity and pressure gradient.

The Forschheimer equation for the non-Darcy velocity (which would replace Equation 2 above), for systems that involve 3-D, multiphase flow in anisotropic media, can be given by:

$$-\frac{k_{r\alpha}}{\mu_\alpha} K \vec{\nabla} p_\alpha = \left(1 + \beta_K \rho_\alpha \frac{k_{r\alpha}}{\mu_\alpha} \|\vec{v}_\alpha\|_2\right) \vec{v}_\alpha, \quad (7)$$

where $\mu_\alpha$ is the viscosity of phase $\alpha$, K is the permeability tensor $k_{r\alpha}$ is the relative permeability of phase $\alpha$, $v_\alpha$ is the Darcy velocity of phase $\alpha$, the expression $\| \ldots \|_2$ is the $L_2$-norm defined by $\|\vec{u}\|_2 = \sqrt{u_x^2 + u_y^2 + u_z^2}$, and the parameter $\beta_k$ is a non-Darcy coefficient. Parameter $\beta_k$ may vary throughout the reservoir, therefore, a value for $\beta_k$ may be entered for each grid block. The non-Darcy coefficient $\beta_k$ is related to the inverse of the transition constant, i.e. $\beta_k = 1/\Gamma$. See Barree et al., "Beyond Beta Factors, A Complete Model for Darcy, Forchheimer, and Trans-Forschheimer Flow in Porous Media," SPE 89325, SPE annual Technical Conference and Exhibition, Houston, Tex., Sep. 26-29, 2004. The Reynolds number for phase is given by the equation $$N_{re}^\alpha = \beta_k \rho_\alpha \frac{k_{r\alpha}}{\mu_\alpha} \|\vec{v}_\alpha\|_2. \quad (8)$$

The units of the terms in Equation 8 should be chosen such that the result is dimensionless. After combining Equations 7 and 8, the Forschheimer equation becomes $$\vec{v}_\alpha = -\frac{k_{r\alpha}}{\mu_\alpha}(1 + N_{re}^\alpha)^{-1} K \vec{\nabla} p_\alpha, \quad (9)$$

where non-Darcy flow is expressed as a phase-dependent, permeability modification function that varies with the Reynolds number for that phase. This is different from the standard permeability modification function, because this non-Darcy formulation has separate values for each phase.

In some cases, the Forschheimer equation does not provide an adequate approximation for non-Darcy flow. Modification functions of the following form can be used to approximate non-Darcy flow:

$$\vec{v}_\alpha = -\frac{k_{r\alpha}}{\mu_\alpha} f_\alpha(N_{re}^\alpha) K \vec{\nabla} p_\alpha, \quad (9A)$$

Modification functions can be constructed which satisfy the constraints $f_\alpha(N_{re}^\alpha) \leq 1.0$ and $f_\alpha(0) = 1.0$. For the standard Forschheimer equation, the following function can be specified:

$$f_\alpha(N_{re}^\alpha) = (1 + N_{re}^\alpha)^{-1}, \quad (9B)$$

For an extended Forschheimer equation, the following functions can be specified:

$$f_\alpha(N_{re}^\alpha) = K_{ratio} + \frac{1 - K_{ratio}}{1 + N_{re}^\alpha}, \quad (9C)$$

Equation 3 in J. L. Miskimins, et al., "Non-Darcy Flow in Hydraulic Fractures: Does It Really Matter?" SPE paper 96389, SPE annual Technical Conference and Exhibition, Dallas, Tex., Oct. 9-12, 2005, is another form of a non-Darcy formulation which is applicable to the methods disclosed in this application.

5.5.1.3 Computation in the Reservoir Model

Computation of the reservoir model can be on the 3D grid (which can be the grid used for the geomechanical model). The 3D reservoir grid can include porous flow calculations. The fluid velocity terms can be computed for flow between reservoir cells as well as for flow between reservoir cells and cavity cells (cells where sanding has occurred). A primary variable for the porous flow equations can be the fluid pressure or the fluid composition, which can be evaluated at the center of each hexahedral element (cell-based). In certain computations, a multi-point flux algorithm can be used for the unstructured reservoir flow computations so the resulting computational stencil can be 27-point for general hexahedral elements of a 3D grid when eight elements share a common corner.

5.5.2 Geomechanical Model 5.5.2.1 Poroelastic Materials

A linear relationship (small strain) can be used for the strain-displacement relations. The coupled flow/displacement model relating stress, strain, temperature, and pore pressures can be based upon a Biot poroelastic theory. The equilibrium equation can be based upon total stresses and assumes quasi-static equilibrium.

The poroelastic equations can be formulated in terms of total stresses, bulk strains, temperatures, and pore pressures. The total stress can be defined by the average tractions that one would observe on a planar section of the reservoir where the planar section includes loads carried by the solid and pore pressures from the fluid. The bulk strains can be the strains that one would observe from a strain gauge if it were attached to the deforming porous material.

The system of equations for the linear poroelastic displacements include the strain-displacement equation $$\varepsilon_{ij} = \frac{1}{2}(u_{i,j} + u_{j,i}), \quad (10)$$

where the commas imply differentiation, $u_i$ is the displacement in the i-direction $\epsilon_{ij}$ is the bulk strain of the porous material, and expansion corresponds to positive strains. The total stresses satisfy the equilibrium equations $$\sigma_{ij,j} + f_i = 0 \quad (11)$$

where the stress tensor is symmetric, and the gravity term $f_i$ is a function of the solid density, fluid densities, and porosity. Traction or displacement boundary conditions can be specified in all three directions at all six boundaries of the three-dimensional grid on which the model is computed.

When differences in temperature are not taken into account, the constitutive equations relating total stresses, bulk strains, and pore pressure are $$\sigma_{ij} = \sigma_{ij}^o + \frac{E}{1+v}\left(\varepsilon_{ij} + \frac{v}{1-2v}\varepsilon_{kk}\delta_{ij}\right) - \alpha(p - p_o)\delta_{ij}, \quad (12)$$

where tension is positive, the repeated index kk implies summation, $\sigma_{ij}^o$ is the initial in-situ stress, $p_o$ is the initial pressure, E is the elastic modulus, v is Poisson's ratio, $\alpha$ is Biot's constant in stress/strain equations, $\delta_{ij}$ is 1 when i=j and 0 when i≠j. It can be assumed that the strains are zero when $\sigma_{ij} = \sigma_{ij}^o$.

In the examples where differences in temperature are taken into account, the constitutive equations are:

$$\sigma_{ij} = \sigma_{ij}^o + \frac{E}{1+v}\left(\varepsilon_{ij} + \frac{v}{1-2v}\varepsilon_{kk}\delta_{ij}\right) - \alpha(p - p_o)\delta_{ij} - \alpha_T K(T - T_o)\delta_{ij}, \quad (13)$$

where $\alpha_T$ is the thermal volumetric expansion coefficient for stress/strain equations, and K is the elastic bulk modulus. The pressure $p_o$ is the initial pore pressure and $T_o$ is the initial temperature.

If the stress and pressure terms are combined to form $\sigma_{ij}^e = \sigma_{ij} + \alpha p \delta_{ij}$, then the equation becomes a standard thermal linear elastic constitutive equation where the stresses have been replaced by the effective stresses $\sigma_{ij}^e$. If the initial in-situ stresses and initial pore pressure are zero, the equation then takes the standard form $$\sigma_{ij}^e = \frac{E}{1+v}\left(\varepsilon_{ij} + \frac{v}{1-2v}\varepsilon_{kk}\delta_{ij}\right) - \alpha_T K(T - T_o)\delta_{ij}, \quad (14)$$

The relationship between the porosity (relative to the undeformed bulk volume) and the strains and fluid pressure (when differences in temperature are not taken into account) is given by:

$$\phi = \phi_o + \alpha\varepsilon_{ii} + \frac{1}{M}(p - p_o), \quad (15)$$

where Equation 15 assumes that the initial strains are zero, $\phi_o$ is the initial porosity, and $M^{-1}$ is Biot's constant for pore pressure in porosity equations.

When differences in temperature and deposition fraction are taken into account, the porosity relative to the undeformed bulk volume is defined as:

$$\phi = \phi_o + \alpha(\varepsilon_v - \varepsilon_v^e) + \frac{1}{M}(P - P_o) - \alpha_V(T - T_o) - \sigma, \quad (16)$$

where, $\alpha$ and $M^{-1}$ are Biot constants, P is the phase pressure (for multiphase flow), $\alpha_V$ is the thermal volumetric expansion coefficient for porosity, and $\sigma$ is the deposition fraction (the volume fraction of solid waste deposited per bulk volume, for example, of a grid element in a computation). Solid waste can be deposited within pores as waste moves through the reservoir, and there can be reductions in porosity and permeability as the waste deposition builds up in pore spaces. The porosity in a computation grid element can be a function of fluid pressure, temperature, and deformations, while the amount of porosity reduction due to deposition of solids can be set equal to $\sigma$.

For an isotropic material, the six poroelastic material parameters: E, v, $\alpha$, and $M^{-1}$, $\alpha_T$, and $\alpha_V$, are determined before applying the geomechanical equations to the modeling of a geomechanical reservoir system.

In certain examples, the reservoir permeabilities may be expressed as an initial directional permeability ($K_{abs}$) multiplied by a permeability multiplier $f$ for the permeability at every point and for every time step: $K=K_{abs}\times f$, where $f$ is as a function of one or more other parameters, such as the fluid pressure, total stresses, bulk volumetric strain, pore pressure, initial reference pressure, principal stresses, effective plastic strain, current porosity, initial porosity, and deposition fraction.

In the constitutive equations for a transversely isotropic material, strains can be expressed in terms of stresses. In certain computations, effective stresses may be used for the calculations, and the initial in-situ stresses can be nonzero. In other computations, the equations may be simplified by using total stresses and using an assumption that the initial in-situ stresses can be zero. The constitutive equations relating stresses and strains for a transversely isotropic material can be expressed as:

$$\varepsilon_{xx} = \frac{1}{E_h}\sigma_{xx} - \frac{v_h}{E_h}\sigma_{yy} - \frac{v_v}{E_v}\sigma_{zz} \quad (17)$$

$$\varepsilon_{yy} = \frac{1}{E_h}\sigma_{yy} - \frac{v_h}{E_h}\sigma_{xx} - \frac{v_v}{E_v}\sigma_{zz} \quad (18)$$

$$\varepsilon_{zz} = \frac{1}{E_v}\sigma_{zz} - \frac{v_v}{E_v}\sigma_{xx} - \frac{v_v}{E_v}\sigma_{yy} \quad (19)$$

$$\gamma_{xy} = \frac{2(1+v_h)}{E_h}\sigma_{xy} \quad (20)$$

$$\gamma_{xz} = \frac{1}{G_v}\sigma_{xz} \quad (21)$$

$$\gamma_{yz} = \frac{1}{G_v}\sigma_{yz} \quad (22)$$

Equations 17-22 assume that the axis of symmetry is the z-direction and that the vertical direction is the z-direction. Five elastic constants in Equations 17-22 can be supplied to the model before a computation involving transversely isotropic solids is performed. It can be assumed that Biot's constants are isotropic and that the thermal expansion coefficients are isotropic when performing poroelastic computations, so two Biot constants and two thermal expansion coefficients may be supplied in addition to the five transversely isotropic constants when analyzing a transversely isotropic porous material. For a poroelastic computation including the thermal model with transversely isotropic elastic constants, the stresses in Equations 17-22 can be effective stresses and the strains in Equations 17-22 can be effective strains defined as:

$$\varepsilon_{ij}^e = \varepsilon_{ij} - \frac{1}{3}\alpha_T(T - T_o)\delta_{ij} \quad (23)$$

where $\epsilon_{ij}$ is the true strain.

5.5.2.2 Poroplastic Materials

A poroplastic material exhibits nonlinear behavior, in that it may undergo permanent (i.e., plastic) volumetric strains, and hence, porosity changes. Large fluid pressures can cause the poroplastic material to yield. As a result, geomechanical computations for a poroplastic material may predict large sudden changes in fluid porosities. These large sudden changes in porosity can cause significant stability problems and also produce negative fluid pressures. The negative pressures normally arise when the fluid compressibility is low, the permeability is low, and the porosity expansion is sudden and large. The equations for a poroelastic material discussed in Section 5.5.2.1 above are applicable to poroplastic materials also. However, the porosity can be modified to account for the changes in porosity that may be predicted for poroplastic materials.

In certain examples, an equation can be used to damp sudden porosity changes in order to improve the numerical stability of the computations and to reduce the frequency of encountering negative pressures. In these computations, the porosity in the reservoir model can be defined as a fluid porosity ($\phi_{fluid}$), and can be treated as different from the porosity in the geomechanical model ($\phi_{geomech}$). The relationship between fluid porosities and geomechanical porosities would be governed by the following damping equation during the computations:

$$\tau \frac{\partial \varphi_{fluid}}{\partial t} = \varphi_{geomech} - \varphi_{fluid} \tag{24}$$

The fluid porosity ($\phi_{fluid}$) can be computed using Equation 24 and used in the fluid flow equations, while the geomechanical porosity ($\phi_{geomech}$) can be computed in the geomechanical model, and $\tau$ is a prescribed time constant. After a step change in ($\phi_{geomech}$), the relative difference between $\phi_{fluid}$ and $\phi_{geomech}$ can be less than 1% after a time period of $5\tau$. The value of $\tau$ can be chosen so that the computations are stable and can be chosen to be as short a time interval as possible, for example, by setting $\tau$ to a value that is shorter than the time frame of a time step in the computation or the total time of the computation. By way of example, if a computation is expected to last several days, then $\tau$ can be on the order of minute; if a computation is expected to last a few minutes, then $\tau$ can be on the order of milliseconds. The value of $\tau$ can be set to about one minute for computations on many poroplastic materials. In other examples, the value of $\tau$ can be set to zero (which removes all damping). The value of $\tau$ to use for a given computation will be apparent to one skilled in the art.

5.5.2.3 Plastic Flow

Plastic flow, also called yielding, denotes a permanent deformation of a material. Once yielding is initiated in a material, plastic flow may or may not persist. A yield condition is a mathematical representation which marks the transition from elastic to plastic deformation. An assumption in the plastic flow equations is that a single yield condition and a single plastic potential can be used to describe the reservoir material, and that a single hardening parameter can be used to represent the movement of the yield surface. It can be further assumed that the stress and strain rates can be expressed as:

$$\dot{\sigma}_{ij} = E_{ijkl}(\dot{\epsilon}_{kl} - \dot{\epsilon}_{kl}^p) \tag{25}$$

where tensor $E_{ijkl}$ denotes the linear elastic properties of the reservoir material:

$$E_{ijkl} = \lambda \delta_{ij}\delta_{kl} + \mu(\delta_{ik}\delta_{jl} + \delta_{il}\delta_{jk}) \tag{26}$$

where $\lambda$ and $\mu$ are Lame constants. Eq. 26 can be used for an isotropic elastic material. In certain computations, the plastic model may be restricted to isotropic elastic properties. In other computations, Eqs. 25 and 26 may include other terms which model plastic properties of a material.

An assumption can be made that there exists a plastic potential G which may be equal to the yield criterion in some cases, but which may differ from the yield condition for non-associated flow. Further, it can be assumed that the plastic strain rates are given by:

$$\dot{\varepsilon}_{ij}^p = \lambda \frac{\partial G}{\partial \sigma_{ij}} \tag{27}$$

where the value of the scalar $\dot{\lambda} \geq 0$, which is not related to the Lame constant, is related to certain constraints which may be placed on the properties of the material, i.e., the yield condition. The plastic potential G can be used to determine the directions of the plastic strain rates while the scalar can be used to determine their magnitudes.

An effective plastic strain ($\epsilon^p$) can be defined as:

$$\epsilon_p = \int \dot{\epsilon}^p dt = \int \sqrt{\dot{\epsilon}_{ij}^p \dot{\epsilon}_{ij}^p} dt \tag{28}$$

and the relationship between the rate of change of the effective plastic strain and the $\dot{\lambda}$ parameter is:

$$\dot{\varepsilon}^p = \lambda \sqrt{\frac{\partial G}{\partial \sigma_{ij}} \frac{\partial G}{\partial \sigma_{ij}}} \tag{29}$$

If a unit tensor $n_{ij}$ is defined as:

$$n_{ij} = \frac{\dfrac{\partial G}{\partial \sigma_{ij}}}{\sqrt{\dfrac{\partial G}{\partial \sigma_{kl}} \dfrac{\partial G}{\partial \sigma_{kl}}}} \tag{30}$$

the plastic strain rate tensor may be written as $$\dot{\epsilon}_{ij}^p = \dot{\epsilon}^p n_{ij} \tag{31}$$

It can be assumed that a simplified form of the yield condition can be written in terms of the stresses ($\sigma_{ij}$) and a hardening parameter ($\kappa$) as:

$$F(\sigma_{ij}, \kappa) \leq 0 \tag{32}$$

where F is negative in the elastic state and zero in the plastic state, and $\kappa$ is a function of the plastic strains (strain-hardening). During plastic deformation, the yield condition satisfies the relation:

$$\frac{\partial F}{\partial \sigma_{ij}} \dot{\sigma}_{ij} + \frac{\partial F}{\partial \kappa} \frac{\partial \kappa}{\partial \varepsilon_{ij}^p} \dot{\varepsilon}_{ij}^p = 0 \tag{33}$$

Equation 33 may be combined with Equations 25, 26 and 27 to arrive at the expression:

$$\dot{\sigma}_{ij} = \left\{ E_{ijkl} - \frac{E_{ijpq} \dfrac{\partial G}{\partial \sigma_{pq}} \dfrac{\partial F}{\partial \sigma_{mn}} E_{mnkl}}{\dfrac{\partial F}{\partial \sigma_{rs}} E_{rsab} \dfrac{\partial G}{\partial \sigma_{ab}} - \dfrac{\partial F}{\partial \kappa} \dfrac{\partial \kappa}{\partial \varepsilon_{ab}^p} \dfrac{\partial G}{\partial \sigma_{ab}}} \right\} \dot{\varepsilon}_{kl} \tag{34}$$

The constitutive equation relates the stress rates to the strain rates where the coefficients depend on the elastic properties, the current stresses, the current plastic strains, and a hardening parameter. For an associative-type flow computation, it can be assumed that F=G, which makes the constitutive equation symmetric. If the nonlinear flow equations are solved using an implicitly-coupled computation, the Jacobian for the system of equations may be slightly non-symmetric, even when the constitutive equations are symmetric.

5.5.2.4 Hardening Models

An examination of the requirements for subsequent plastic deformation and the stress-strain relationship of the material can provide an indication of whether the plastic flow may or may not persist. A material can be ideally plastic or subject to strain-hardening. An ideally plastic material (such as but not limited to structural steel) exhibits a yield condition which remains unaltered by plastic deformation. However, many materials are altered by inelastic deformation (termed strain-hardening) and the yield condition can be modified as the materials' resistance to yielding increases.

The geomechanical model includes hardening models which can be used to model the plastic deformation of material within the geomechanical reservoir system. Examples of hardening models include the Drucker-Prager model with shear hardening or cap hardening, the modified Drucker-Prager model with tabular hardening, the modified Bigoni-Piccolroaz model, and the Matsuoka-Nakai model.

Drucker-Prager with Shear Hardening

The yield condition for the Drucker-Prager equation with shear hardening and positive tensile stress can be expressed as:

$$F = \sqrt{J_2} + \alpha I_1 - k(\epsilon^p)^m - \Gamma = 0 \quad (35)$$

where all scalar parameters are nonnegative constants, $\alpha$ is a constant, m is an exponent, and $\Gamma$ is the yield constant. Values for the parameters $\alpha$, k, m, and $\Gamma$ correspond to the input parameters may be entered to perform a computation. The constant $\alpha$ may take on values between 0.0 and $1/\sqrt{3}$. If the value of $\alpha$ is zero, then the Drucker-Prager model becomes a Von Mises model of plasticity. The parameter $\alpha$ is related to the friction angle that is used for a Mohr-Coulomb model. The effective plastic strain $\epsilon^p$ is a hardening parameter which may be computed and reported, for example, to a user.

After hardening, i.e., an increase in $\epsilon^p$, the yield surface may be considered to move from an original surface position to a final surface position, as shown in FIG. 11A. In this computation, the first invariant of stress $I_1$ (the first invariant of total stress) is negative in compression ($I_1 = \sigma_{kk}$, summation over k).

The plastic flow equation for the Drucker-Prager model can be represented:

$$\dot{\varepsilon}_{ij}^p = \dot{\lambda}\left\{\alpha\delta_{ij} + \frac{S_{ij}}{2\sqrt{J_2}}\right\} \quad (36)$$

where $\dot{\epsilon}^p = \dot{\lambda}\sqrt{3\alpha^2 + \frac{1}{2}}$ and $\alpha$ in Equation 35 is the same $\alpha$ used in the yield equation if associated flow is assumed.

Drucker-Prager with Cap Hardening

A Drucker-Prager models with cap hardening can have two yield surfaces. One yield surface is the non-hardening Drucker-Prager failure surface (perfectly plastic) given by:

$$F_s = \sqrt{J_2} + \alpha I_1 - \Gamma = 0 \quad (37)$$

where all scalar parameters are nonnegative constants and tensile stresses are positive, $\alpha$ is a parameter and $\Gamma$ is the yield constant. The second yield surface is an elliptical hardening cap of the form:

$$F_c = J_2 - \frac{1}{R^2}[(X-L)^2 - (I_1-L)^2] = 0 \quad (38)$$

The variable $X \leq R\Gamma$ is a function of the plastic volumetric strain (compaction is negative) and is the value of the first invariant of stress $I_1$ at which the elliptical cap intersects the axis of $I_1$. The variable $L \leq 0$ is also a function of the plastic volumetric strain and is the value of $I_1$ at which the elliptical cap intersects the Drucker-Prager surface $F_s$. The elliptical cap is vertical at the intersection with the $I_1$ axis and horizontal at the intersection with the Drucker-Prager failure surface. The following equations can be used to relate X to the effective plastic volumetric strain and the constraint enforcing zero slope for the cap at the Drucker-Prager yield surface:

$$X = X_o + \frac{1}{D}\ln\left(1 + \frac{\bar{\varepsilon}_v^p}{W}\right) \quad (39)$$

or $$X = X_o - H(-\bar{\varepsilon}_v^p)$$

and $$\frac{X-L}{R} = \alpha L - \Gamma \quad (40)$$

Two cap hardening models can be derived from Equations 39 and 40. The first cap hardening model uses the logarithm in Equation 39 for hardening at the cap. The second cap hardening model uses the tabular function H( ) of Equation 39, where H( ) is strictly monotonically increasing and H(0)=0. The effective plastic volumetric strain, $\bar{\epsilon}_v^p$, and the variables L and X are all zero or negative in Equations 39 and 40. The initial value of $\bar{\epsilon}_v^p$ can be nonzero for a computation when the initial magnitude of X exceeds the magnitude of $X_o$.

Movement of the yield surface is shown in FIG. 11B, where the solid line is the original surface and the dashed line is the location of the surface after hardening, and $L_1$ and $L_2$ are the values of L for the initial and subsequent yield surfaces.

Using the plastic equations, it can be shown that the plastic volumetric strain rate can be expressed in terms of the $\dot{\lambda}$ elastic parameter from the equation $\dot{\epsilon}_{ij}^p = \dot{\lambda}\partial F_c/\partial\sigma_{ij}$ in the form $$\dot{\varepsilon}_v^p = \frac{6}{R^2}(I_1 - L)\dot{\lambda} \quad (41)$$

where $I_1 \leq L \leq 0$ whenever plastic deformation occurs on the cap, and $\dot{\epsilon}_v^p \leq 0$ and $\dot{\lambda} \geq 0$. Hardening parameters which may be computed and reported, for example, to a user, are L, $\dot{\epsilon}_v^p$, and $\dot{\lambda}$. The plastic flow equation on the shear surface can be the same as described previously for the standard Drucker-Prager model, while flow on the cap can be given by:

$$\dot{\varepsilon}_{ij}^p = \dot{\lambda}\left\{\frac{2}{R^2}(I_1 - L)\delta_{ij} + S_{ij}\right\} \quad (42)$$

Modified Drucker-Prager with Tabular Hardening

The yield condition for the modified Drucker-Prager equation with shear hardening and positive tensile stress is $$F = \frac{1}{2}\sqrt{J_2}\left[1 + \frac{1}{K} - \left(1 - \frac{1}{K}\right)\cos(3\theta)\right] + \alpha I_1 - H(\varepsilon^p) - \Gamma = 0 \quad (43)$$

where $\alpha$ is a constant, K is the deviation, $\Gamma$ is the yield constant, and $\theta$ is $\pi/3$ for a uniaxial compression test and can be defined by $$\theta = \frac{1}{3}\cos^{-1}\left(\frac{3\sqrt{3}}{2}\frac{J_3}{J_2^{3/2}}\right) \quad (44)$$

H( ) is a tabular function of the effective plastic strain, $I_1$ is the first stress invariant, and $J_2$ and $J_3$ are the second and third invariants of the total stress deviator:

$$J_2 = \frac{1}{2} S_{ij} S_{ij} \qquad (45)$$

$$J_3 = \frac{1}{3} S_{ij} S_{jk} S_{ki} \qquad (46)$$

$$S_{ij} = \sigma_{ij} - \frac{1}{3} \sigma_{kk} \delta_{ij} \qquad (47)$$

where $S_{ij}$ is the deviatoric stress (minus the mean stress), $\delta_{ij}$ is the kronecker delta (which is 1 when i=j and 0 otherwise), $J_2$ is summed over i and j, and $J_3$ is summed over i, j, and k. The modified Drucker-Prager model reduces to the Drucker-Prager model if the material parameter K is set to 1.0 and if the table values of H( ) satisfy $H(\epsilon^p)=k(\epsilon^p)^m$. The value of parameter K may range from 0.78 to 1.0. The hardening parameter of effective plastic strain $\epsilon^p$ may be reported, for example, to a user. The constants $\alpha$, K, and $\Gamma$ may be entered.

The effect of the parameter K is illustrated in FIGS. 12A-D, which show plots of the modified Drucker-Prager yield surface in the octahedral (deviatoric) plane for four values of K in the octahedral plane (and for a constant $I_1$). In the four plots of FIGS. 12E-H, it can be assumed that compression is positive, and all have been normalized to cross 1.0 on the positive vertical axis. The standard Drucker-Prager has K=1.0 and is circular in the plane. The modified Drucker-Prager surface is no longer convex for values of K less than 0.78. Certain computations may be restricted so that values of K are greater than or equal to 0.78.

The plastic flow equation for the Modified Drucker-Prager equation is $$\dot{\varepsilon}_{ij}^p = \lambda \left\{ \alpha_f \delta_{ij} + \frac{S_{ij}}{4\sqrt{J_2}} \left[ 1 + \frac{1}{K} - \left(1 - \frac{1}{K}\right) \cos(3\theta) \right] + \frac{3\sqrt{3}}{4} \left(1 - \frac{1}{K}\right) T_{ij} \right\} \qquad (48)$$

where $T_{ij}$ is defined by $$T_{ij} = \frac{2}{3} \delta_{ij} - \frac{S_{ik} S_{kj}}{J_2} + \frac{\cos(3\theta)}{\sqrt{3 J_2}} S_{ij} \qquad (49)$$

and $\alpha_f$ in the flow equation is the same used in the yield equation associated flow is assumed. If it is assumed that $T_{ii}=0$ and $S_{ii}=0$, setting $\alpha_f$ equal to zero in Equation 49 results in the plastic volumetric strains being zero for a computation.

Modified Bigoni-Piccolroaz with Tabular Hardening

The modified Bigoni-Piccolroaz model (MBP) is a modification of the yield criteria in D. Bigoni et al. (2004) "Yield criteria for quasi-brittle frictional materials," *Intl. J. of Structures* 41:2855-2878. The yield equation for the MBP model with positive tensile stress can be expressed as:

$$F = A \cos(\varphi) \sqrt{J_2} + \alpha I_1 - H(\varepsilon^p) - \Gamma = 0 \qquad (50)$$

$$A^{-1} = \cos\left\{ \frac{1}{3} \cos^{-1}(-\gamma) - \beta \frac{\pi}{6} \right\} \qquad (51)$$

$$\varphi = \frac{1}{3} \cos^{-1} \{\gamma \cos(3\theta)\} - \beta \frac{\pi}{6} \qquad (52)$$

where $\alpha$ is a constant, $\Gamma$ is the yield constant, $\gamma$ is the deviation, and where $0 \leq \alpha \leq 1/\sqrt{3}$, $0 \leq \beta \leq 1$, $\Gamma \geq 0$, and $0 \leq \gamma \leq 1$ are material constants and H( ) is a tabular function of the effective plastic strain. Parameters $J_2$ and $J_3$ are invariants of the stress deviator, and $I_1$ is the first stress invariant. The constant A can be chosen such that $A \cos(\varphi)$ is 1.0 for a uniaxial compression test. The MBP model uses strain-hardening to model plastic hardening and an assumption can be made that the yield surface expands uniformly (no rotation) as it hardens. The constants $\alpha$, $\beta$, $\Gamma$, and $\gamma$, which can be input parameters, control the shape of the yield surface in principal stress space. The angle of the yield cone in principal stress space is controlled by $\alpha$, while the location of the tip of the cone on the $I_1$ axis is given by $\Gamma/\alpha$ before hardening. The shape of the yield surface in the octahedral plane (for constant $I_1$) can be controlled by the parameters $\beta$ and $\gamma$. Several common yield surfaces can be reproduced for specific choices of the MBP parameters. Common yield surfaces that are special cases of the MBP yield surface are von Mises, Drucker-Prager, Mohr-Coulomb, Lade, Tresca, and Matsuoka-Nakai.

Parameters $\beta$ and $\gamma$ can be modified to determine the shape of the yield surface in the octahedral plane. The yield surfaces which result for different values of $\beta$ and $\gamma$ are shown in FIGS. 12E-H. In the plots of FIGS. 12E-H, it can be assumed that compression is positive, and all plots have been normalized to cross 1.0 on the positive vertical axis. The MBP model yield equation does not exhibit the loss of convexity which can occur for the modified Drucker-Prager model yield equation. For example, for the case where $\beta=0.0$ and $\gamma=1.0$, the MBP model yield equation generates a triangle in the octahedral plane (as compared to the non-convex surfaces for the modified Drucker-Prager model yield equation when K=0.60).

The plastic flow equation for the MBP model is $$\dot{\varepsilon}_{ij}^p = \lambda \left\{ \alpha_f \delta_{ij} + \frac{A \cos(\varphi) S_{ij}}{2\sqrt{J_2}} - \frac{A \gamma \sqrt{3} \sin(\varphi)}{2 \sin\left(3\varphi + \beta \frac{\pi}{2}\right)} T_{ij} \right\} \qquad (52)$$

and $\alpha_f$ in the flow equation is the same $\alpha$ used in the yield equation assuming associated flow. If $\alpha_f$ is set equal to zero in Equation 52, the plastic volumetric strains is zero for the computations.

5.5.2.5 Sand Production Model

One or more parameters from a hardening model for computations of the plastic deformation may be used for computation of the sand production model. In computations using the sand production model, at least one sand production criterion can be applied to one or more grid cells. It may be assumed that a computation grid cell fails when a critical value is reached for:

(1) the total strain invariant, or
(2) the plastic strain invariant, or
(3) the maximum effective stress at the center of a grid cell. With each of these sand production criteria, failure of a grid cell represents sanding of reservoir material (resulting in a cavity).

For criterion (1), the total strain invariant can be expressed as:

$$\epsilon = \sqrt{\epsilon_{ij} \epsilon_{ij}} \qquad (53)$$

For criterion (2), the plastic strain invariant can be expressed as:

$$\epsilon^p = \sqrt{\epsilon_{ij}^p \epsilon_{ij}^p} \qquad (54)$$

In certain computations, the plastic strain invariant criterion may not be applied if the hardening model is the Drucker-Prager cap hardening model.

For criterion (3), the maximum effective stress, the maximum principal effective stress can be computed and its value can be compared to the input value (where tensile stresses are assumed positive).

Criterion (2), the plastic strain invariant can be used to account for transient sand production from a cell prior to the total failure of that cell. If the critical plastic strain for total cell failure is $\epsilon_{lim}^P$, then the fraction of sand produced from a cell prior to total cell collapse can be represented by a production function. The production function can be a function $f(x)$, where $f(x)=0$ when $x=0$, and $f(x)=1$ when $x=1$, and where x is a function of the critical plastic strain ($x=g(\epsilon_{lim}^P)$). The function $f(x)$ may be any monotonic function of x, including but not limited to, a fraction function, a power function, a sine function, a cosine function, a logarithmic function, an exponential function, a sigmoid function, or any combination thereof. In some examples, x can be a function of both the critical plastic strain ($\epsilon_{lim}^P$) and the plastic strain invariant ($\epsilon^p$), such as but not limited to a ratio $\epsilon^p/\epsilon_{lim}^P$. In an example, the production function can be given by:

$$\left(\frac{\varepsilon^p}{\varepsilon_{lim}^p}\right)^m \quad (55)$$

where m is an exponent.

5.5.2.6 Computation in the Geomechanical Model

Computation of the geomechanical model can be on the 3D grid (which can be the grid used for the reservoir model). For example, a standard finite element method may be used for the geomechanical equations where stresses are integrated at the eight Gaussian points interior to each element, and fluid pressures are integrated at the center of each element. The discretization produces a 27-point stencil for the displacements when eight elements share a common corner, and there are three displacements at each node. In certain computations, the displacements are the primary variables for the geomechanical equations where the displacements are evaluated at the corners (node-based) of the hexahedral elements.

5.5.3 Thermal Model

The thermal model calculates temperature changes that occur when hot or cold fluids are injected into or produced from a reservoir and also calculates conduction from a wellbore that may be circulating hot/cold fluids but is not actually injecting or producing fluids. The temperature calculations may include porous flow and geomechanics but may be configured to not include steam injection. Injected water can be assumed to be in a liquid phase.

The thermal model calculates temperature changes that arise due to conduction and convection in the reservoir, hot or cold fluid injection/production at wells, conduction at wells, and thermal and mechanical interactions between the fluids and solid. These mechanisms can be combined in a single energy equation that is solved along with the porous flow equations and solid deformation equations. The energy equation can be formulated in terms of a Lagrangian-approach for the porous solid and all fluid movement can be relative to the movement of the porous solid.

With this type of formulation, the mass of the porous solid can be constant when evaluating the energy balance for an element of the reservoir while the mass of fluid changes as fluids flow into and out of the porous solid.

5.5.3.1 Combined Accumulation Term

The combined expressions for energy change in the fluid and solid (when the geomechanical system is included in the computation) can be given by:

$$\dot{u}_T = \frac{\partial}{\partial t}\left(\varphi\sum_\alpha \rho_\alpha S_\alpha h_\alpha\right) + C_r\dot{T} + \alpha_T K T_o \dot{\varepsilon}_{ii} - (\alpha_V T_o + \varphi_o)\dot{p} + \sigma_{ij}\dot{\varepsilon}_{ij} \quad (56)$$

where $\phi$ is the porosity with respect to the undeformed bulk volume, $\alpha$ is the phase, $\rho_\alpha$ is the density of phase, $S_\alpha$ is the saturation of phase $\alpha$, $h_\alpha$ is the specific enthalpy of phase $\alpha$, $\alpha_T$ is the volumetric expansion coefficient in stress/strain equations, K is the permeability, $\alpha_v$ is volumetric expansion coefficient in the porosity equation, and $T_0$ is the fluid temperature. Conduction and convection terms can affect the combined accumulation term. In Equation 56, the approximation can be made that the phase pressures are the same, the term $\phi\dot{p}$ can be approximated by $\phi_o\dot{p}$, and the term $C_r$ can be $C_r \equiv C_v + \alpha_v^2 M T_o$. The heat capacity $C_v$ is the heat capacity for a porous solid measured at constant pore volume and constant bulk volume. It can be shown that the heat capacity $C_r$ as defined above is the heat capacity at constant fluid pressure and constant bulk volume. Equation 56 is the general formula for the total rate of change of internal energy in an element and is used for the accumulation term when terms including the fluid temperature $T_0$ are considered in the computation and the computation includes both thermal and geomechanical models.

Equation 56 takes on simpler forms if the fluid temperature $T_0$ is considered in the computation.

For computations that include thermal and geomechanical models and terms including the fluid temperature $T_0$ and $\phi_o\dot{p}$ are not considered in the computation, the simplified expression is $$\dot{u}_T = \frac{\partial}{\partial t}\left(\varphi\sum_\alpha \rho_\alpha S_\alpha h_\alpha\right) + C_r\dot{T} + \sigma_{ij}\dot{\varepsilon}_{ij} \quad (57)$$

For computations that include the thermal model, but do not include the geomechanical model, the accumulation term is:

$$\dot{u}_T = \frac{\partial}{\partial t}\left[\varphi\left(\sum_\alpha \rho_\alpha S_\alpha h_\alpha - p\right)\right] + C_r\dot{T} \quad (58)$$

while for computations that include the thermal model, but do not include the geomechanical model, and the fluid internal energy is approximated by the fluid enthalpy, the expression is:

$$\dot{u}_T = \frac{\partial}{\partial t}\left(\varphi\sum_\alpha \rho_\alpha S_\alpha h_\alpha\right) + C_r\dot{T} \quad (59)$$

5.5.3.2 Energy Equation

The choice of the accumulation term above determines the equations that are included in the final energy conservation equation. The energy equation can be expressed as $$\frac{\partial}{\partial t}\left(\varphi\sum_\alpha \rho_\alpha S_\alpha h_\alpha\right) + C_r\dot{T} = \quad (60)$$

-continued $$\nabla \cdot (K_T \nabla T) - \nabla \cdot \left( \sum_\alpha \rho_\alpha h_\alpha \vec{v}_\alpha \right) + \sum_\alpha \rho_\alpha h_\alpha q_\alpha \delta(\vec{x})$$

where a constant temperature boundary condition can be applied at injection wells. Since Equation 60 does not contain any mechanical terms, other than transport, the temperatures in grid blocks should not be affected by the expansion or compression of a fluid phase or solid when the enthalpies are only functions of temperature. However, Equation 60 does still account for heat of vaporization from a liquid to vapor because the latent heat can be included in the difference between the enthalpy of a component in a liquid phase and its corresponding enthalpy in the vapor phase.

If a simulation includes geomechanical calculations and terms including the fluid temperature $T_0$ are considered in the computation, then the general energy equation can be given by:

$$\frac{\partial}{\partial t}\left( \varphi \sum_\alpha \rho_\alpha S_\alpha h_\alpha \right) + C_r \dot{T} + \alpha_T K T_o \dot{\varepsilon}_{ii} - (\alpha_V T_o + \varphi_o)\dot{p} = \qquad (61)$$

$$\nabla \cdot (K_T \nabla T) - \nabla \cdot \left( \sum_\alpha \rho_\alpha h_\alpha \vec{v}_\alpha \right) + \sum_\alpha \rho_\alpha h_\alpha q_\alpha \delta(\vec{x})$$

The $\sigma_{ij}\dot{\varepsilon}_{ij}$ term is present on both sides of the energy equation; i.e., in the accumulation term and also as work done on the bulk solid, and consequently $\sigma_{ij}\dot{\varepsilon}_{ij}$ is not included in Equation 61.

5.5.3.3 Modifications to Fluid Densities and Viscosities

There are several options for computing temperature-dependent densities and viscosities for fluids, and the methods available for computing densities and viscosities vary depending on the phase behavior model and the numerical technique that is being used. In certain examples, the fluid properties can be computed directly as functions of temperature and pressure. In certain other examples, the fluid properties can be computed as a function of the current cell pressures and initial cell temperatures (isothermal flash) and modification functions can be used to correct for the differences between the initial cell temperatures and the current cell temperatures.

Fluid properties may be computed directly as a function of temperature and pressure for implicit single phase runs, implicit two-phase runs, and implicit compositional runs. These computations involving the geomechanical model can be iteratively coupled or fully coupled.

The viscosities and densities that are calculated in the black-oil, K-value, and compositional PVT packages may be modified to account for changes in fluid properties due to temperature changes. The initial reservoir temperature and current fluid pressure during a computation may be used to calculate the fluid properties in each of the PVT packages (isothermal flash) and then these properties are modified by multiplying by user-supplied modification factors, i.e., $\mu(p, T) = \mu(p, T_o)\bar{\mu}(T)$ where $\bar{\mu}(T)$ can be entered as a table and $\mu(p, T_o)$ can be calculated in the PVT package.

For many thermal-geomechanical studies, interest can be primarily focused on how temperature affects fluid viscosities and thermal stresses. For these types of applications, either the modification factors or direct calculation of fluid properties may be used, and the results can be very similar using both techniques. However, for applications where temperature has a strong effect on densities and/or phase separation, then the direct calculation of fluid properties can be used as functions of temperature and pressure.

5.6 Interrelationship of the Various Models

A system and method can couple the interactions between the different geomechanical reservoir system models, e.g., between porous flow, geomechanical displacements and stresses, sand production and cavity formation. For example, the geomechanical solution can influence the porous flow computations through the porosity and permeability terms. As another example, the fluid solution in the reservoir can affect the geomechanical calculations through its role in the effective stresses. In yet another example, the fluid solution can affect the geomechanical calculations involving the sand production model through normal traction that occurs at the face of the cavity and can affect the flow in the reservoir.

5.7 Implementation of the Sand Production Prediction

5.7.1 Computations Including the Sand Production Model

FIG. 13 illustrates several considerations in an example computation of the sand production prediction in a time step of a computation where a cavity has been generated between the reservoir overburden (rock overlying the area of interest in the well) and the underburden (rock underlying the area of interest in the well). At the end of each time step, a check can be made for failed grid cells, and a cell can be removed immediately from the deformation computations (for example, a computation involving a geomechanical model) once it is identified as being a failed cell. A failed cell is a cell for which a sand production criterion is reached (see Section 5.5.2.5 supra), which can be used to indicate the point where the material fails, i.e., rubblizes to form sand and generate a cavity. Once a cell fails and becomes part of the cavity, it can be excluded from the stiffness matrix for computing the displacements. As indicated in FIG. 13, unfailed reservoir cells ahead of the interface between an existing cavity and unfailed cells can be checked for failure in each time step. As also illustrated in FIG. 13, the traction condition at the interface between an existing cavity and unfailed cells can be taken to be equal to the fluid pressure in the cavity cells at interface. The standard porous flow models and geomechanical models can be applied to unfailed, intact grid cells.

The volume of sand in the failed cell can be then added to the reported sand production volume for the nearest production well. In some computations, the sand volume of a cell can be the initial bulk volume of that cell. The failed cell can be retained in the fluid flow calculations to allow flow between the wall of the generated cavity and the well, and the porosity of the cell can be kept constant. In some computations, the permeabilities can be increased in the cavity to minimize the pressure drop between the well and the wall of the cavity (for fluid flow). Once a cell is removed from the deformation calculations, its properties no longer affect the deformations, except that the failed cells immediately adjacent to the cavity can exert a compressive load on the unfailed porous solid (i.e., an unfailed cell) and this compressive load at the wall of the cavity can be directly related to the fluid pressures in the failed cells adjacent to the wall of the cavity.

Cavity generation calculations can be physically and/or numerically unstable. To avoid physical instabilities, some hardening can be added to the end of a curve that is nearly elastic-perfectly plastic, and a time frame can be set for the growth of an unstable cavity (i.e., the growth rate for the cavity can be directly related to the time scale set, such as, as a non-limiting example, one minute. In order to minimize numerical instabilities, several parameters of the models may be set to certain values. For example, the time constant $\tau$ from Equation 24 (which relates changes in fluid porosities to changes in geomechanical porosities) can be set to a non-zero value to minimize instabilities, since a value of zero removes all damping. A higher value of time constant τ may enhance numerical stability. As another example, the permeability assigned to grid cells that fail (indicating sanding) can be set to a value which minimizes numerical instability. As a non-limiting example, the permeability can be set to a value on the order of about 1000 Darcies. Lower or higher values may be set for the permeability to enhance numerical stability.

5.7.2 Solution of the System of Partial Differential Equations

The Jacobian for the full system of equations for the models included in the computation can be fully expanded and all equations can be solved simultaneously in the linear solver. The various mechanisms can be coupled using either one-way, explicitly, iteratively, or fully coupled techniques. The most stable coupling technique can be used for sand production predictions.

The equations discussed in the previous sections can be implemented in a single program and the program computes an implicit solution for all the equations, i.e., a backward-Euler technique can be used to approximate the temporal derivatives and all primary variables and coefficients in the equations can be evaluated at the end of the time step. Non-limiting examples of primary variables are the fluid pressures in the reservoir, the displacements in the reservoir and at the boundary of the reservoir (if unconstrained), the fluid pressures in a fracture (or fluid volumes in the fracture if partially saturated), the well pressure, and at least one parameter of the production function. The system of equations can be solved using a Newton-Raphson technique where the fully-expanded Jacobian is generated for the entire system of equations and incremental corrections are found using a linear solver that includes all the solution variables.

Cavity generation can be simulated by computing flow to a failed cell and computing the effective stresses and displacements that arise in the adjoining reservoir. Sand production criteria are then combined with the stress and displacement states and traction condition at the cavity interface to decide if the cavity has progressed. The cavity may progress across multiple grid cells during a single timestep. Each timestep can begin with the cavity configuration, geomechanical state, fluid state (if applicable), and thermal state (if applicable) from the previous timestep. The computation then iterates to a converged solution for the conservation of mass and stress equilibrium equations assuming the cavity does not propagate. Once a new converged solution is obtained, the sand production criteria can be checked to see if the critical value of the sand production criterion has been reached in any cells. These cells can be treated as described in Section 5.7.1. This sequence of iterations may be continued on the equations and checking sand production criteria for a number of times, or until no further progression of the cavity is seen for a timestep before moving on to the next timestep.

5.8 Examples of Apparatus and Computer-Program Implementations

The methods disclosed herein can be implemented using an apparatus, e.g., a computer system, such as the computer system described in this section, according to the following programs and methods. Such a computer system can also store and manipulate the data indicative of physical properties associated with a geomechanical reservoir system, the fully-expanded Jacobian for the full system of equations for the models included in the computation, the solution to the fully-expanded Jacobian, the generated fracturing predictions, or measurements that can be used by a computer system implemented with the analytical methods described herein. The systems and methods may be implemented on various types of computer architectures, such as for example on a single general purpose computer, or a parallel processing computer system, or a workstation, or on a networked system (e.g., a client-server configuration such as shown in FIG. 14).

As shown in FIG. 14, the modeling computer system to implement one or more methods and systems disclosed herein can be linked to a network link which can be, e.g., part of a local area network ("LAN") to other, local computer systems and/or part of a wide area network ("WAN"), such as the Internet, that is connected to other, remote computer systems.

The modeling system comprises any methods of the described herein. For example, a software component can include programs that cause one or more processors to implement steps of accepting a plurality of parameters indicative of physical properties associated with the geomechanical reservoir system, and/or the generated fracturing predictions and storing the parameters indicative of physical properties associated with the geomechanical reservoir system, and/or the generated fracturing predictions in the memory. For example, the system can accept commands for receiving parameters indicative of physical properties associated with the geomechanical reservoir system, and/or parameters of a generated fracturing prediction, that are manually entered by a user (e.g., by means of the user interface). The programs can cause the system to retrieve parameters indicative of physical properties associated with the geomechanical reservoir system, and/or parameters of a generated fracturing prediction, from a data store (e.g., a database). Such a data store can be stored on a mass storage (e.g., a hard drive) or other computer readable medium and loaded into the memory of the computer, or the data store can be accessed by the computer system by means of the network.

6. RESULTS 6.1 Sand Production Prediction Tests

Sanding tests were performed on brine and kerosene saturated core samples. The sand production prediction was applied to the results of the sanding tests. Temperature effects were not considered. An assumption was made that single phase simulations could be used to simulate the reservoir system.

6.2 Data Collection

The geometry of the grid, information on material behavior, boundary conditions and permeability function are discussed below.

6.2.1 Geometry/Grid

The samples tested were approximately 100 mm long and had a circular diameter of about 100 mm. The central hole was roughly 20 mm in diameter. The exact dimensions of both the brine and the kerosene test samples are given in Table 1. FIGS. 15A and 15B show the core samples used for the brine test, including the dimensions of the sample. During the test, end-platens were used to apply the axial load. A hollow cylinder test was applied (such as illustrated in FIG. 3).

An axisymmetric grid of cell was set up for the computations, based on the dimensions given in Table 1. The rubber sleeve was not represented in the computation grid cells. However the simulation model was setup to include the two platens, whose the radial dimensions match those of the sample and whose axial dimension was 20 mm.

TABLE 1

Sample dimensions.

| Test | Length (mm) | Diameter (mm) | Interior hole diameter (mm) |
|---|---|---|---|
| Brine | 102.72 | 99.77 | 19.56 |
| Kerosene | 105.25 | 99.95 | 19.47 |

6.2.2 Material behavior

Physical constants of the materials were determined using data from a triaxial test. The measured material response and that computed using the models are in close agreement for both the brine saturated cores (shown in FIG. 16) and the kerosene saturated cores (shown in FIG. 17). The physical constants used for modeling the brine saturated sample are given in Table 2.

TABLE 2

Physical properties for the brine saturated sample.

| Variable | Value |
|---|---|
| Porosity | 0.296 |
| Poisson's ratio | 0.03 |
| Young's modulus | 218823 psi |
| Rock density | 2.65 g/cc |
| Yield constant Γ | 43.2 |
| Alpha | 0.36581616 |

6.2.3 Boundary Conditions

The simulations were performed by solving the fully coupled geomechanical and fluid flow models, hence both fluid flow and geomechanical boundary conditions needed to be set (shown in FIG. 18). For the geomechanical boundary conditions, constant stress was assigned to the top, outer and inner surface (boundary) of the hollow cylinder (shown by arrows in panel (A) of FIG. 18). The geomechanical model was displacement constrained at the bottom to keep the numerical model from moving and rotating (i.e., the entire surface is constrained not to move in the z direction). To simulate test fluid flow conditions (see panel (B) of FIG. 18), a pressure drop is applied over the hollow cylinder, where the pressure on the outside of the cylinder is greater than the pressure on the inside of the cylinder. No fluid flow boundary conditions were applied at the top and the bottom of the cylinder. The porosity of the spacers was set to zero, which effectively made the permeability of the spacers equal to zero as well.

The pressure on the inside of the hollow cylinder as well as the stresses on the inside surface of the hollow cylinder were kept equal to 0 psi. The simulation used absolute pressure values, therefore a zero value of pressure was set to be 14.7 psi to account for atmospheric pressure. Both the stresses on the outside and the pressures on the outside of the cylinder were varied dependent on the flow and stress regime applied in the test performed on the brine saturated sample. FIG. 19 shows the measured and discretized (simulated) confining stress, flow rate and flowing pressure vs. time for the brine saturated sample.

6.2.4 Permeability Function

Using the test measurements, the permeability for a radial isotropic homogeneous geometry was computed. Darcy's law for radial flow for the core sample geometry can be expressed as:

$$k = \frac{Q\mu \ln\left(\frac{r_e}{r_i}\right)}{2\pi h \Delta P} \quad (62)$$

where k is the permeability, Q is the flow rate, μ is the viscosity, $r_i$ is the inner radius, $r_e$ is the outer radius, h is the height and ΔP is the pressure drop. The permeability was determined using the dimensions of the core samples and Equation 62. The permeability distribution resulting from this calculation showed that the permeability was not constant as a function of flow rate (as shown in FIG. 20). Specifically as the flow rate increased, the permeability decreased (observed to be affected by the quality of the pressure measurements). An average permeability was determined by fitting a power-law curve to a plot of the computed permeability as a function of confining stress (FIG. 21). This power-law function was used to compute the pressure to achieve the flow rate. In other words, the pressures were altered such that, given the power-law fit derived permeability function, the desired flow rate was obtained.

Generally, the permeability is a function of cell properties and not of the boundary conditions, such as the confining stress. The assumption made was that the mean stress can be used as a proxy for the confining stress, where the mean stress was calculated using:

$$\sigma_{mean} = \frac{1}{3}(\sigma_1 + \sigma_2 + \sigma_3) \quad (62)$$

where $\sigma_{mean}$ is the mean stress and $\sigma_1$ through $\sigma_3$ are the principal stresses. This assumption caused the computed flow rate and the measured flow rate not to be identical. The flow rate measured in the tests was compared to the flow rate predicted by the numerical simulation. A correction factor was applied to the outer boundary pressures to make the flow rates match. The calculated pressures were multiplied by 1.035 to obtain the flow rate match (shown in FIG. 22), which meant that only a 3.5% correction factor was used. This flow rate match was obtained for a sample without sand production. Flow rates varied depending on the volume of sand produced, as discussed in Section 6.3 infra.

6.3 Analysis

The computed sand match and its sensitivity to certain parameters are discussed below. Also discussed is a question of whether a sustainable, stable cavity can be created.

6.3.1 Sand Production Model Computation

The following inputs for the sand production model were computed:
1. value of a critical plastic strain—the critical value of effective plastic strain that causes the rock to fail.
2. exponent—exponent of the production function used for computing the amount of sand production from a cell prior to reaching the critical plastic strain value.
3. parameters of hardening model—the triaxial test data was matched (fit) using a version of the modified Bigoni-Piccolroaz (MBP) hardening model.

To fit the MBP hardening model to the triaxial test data, besides using the parameters given in Table 2, the MBP model can be made to allow a user to define the shape of the yield surface in the octrahedral plane (constant $I_1$) (see FIGS. 23A and 23B). The shape of the yield surface in the octahedral plane is defined by two parameters for the MBP hardening model: deviation (γ) and beta (β). Both the deviation and beta are constants having a value between 0 and 1.0. Setting beta to 0 and the deviation to 0 in the MBP model produces a yield surface in the octahedral plane of the Drucker-Prager material model (shown in FIG. 23A). Setting beta to 0 and the deviation to 0.95 in the MBP model produces a yield surface in the octahedral plane of the Lade-Type material model (shown in FIG. 23B).

Yielding occurs when a sample reaches the yield surface. Hence, linear elastic behavior governs at the interior areas of the shapes shown in FIGS. 22A and 22B. From FIGS. 22A and 22B, it was seen that the likelihood of a stress path hitting the yield surface in the deviatoric plane for the Lade-Type model is higher than that for the Drucker-Prager type model. It was expected that more yielding would occur with higher deviation values when applying the two material models to general stress states. It was noted that the yield surfaces in FIGS. 23A and 23B produced the same results when applied to triaxial compression tests.

6.3.1.1 Definition of Grid Cells

Computations were performed on 2D axisymmetric grids. The grid cell size for representing the sample was varied to investigate grid size dependencies on the model results. The cell size of the sample was 1.284 mm in the vertical direction and was varied from 0.05 mm to 0.01 mm to 0.005 mm in the horizontal direction. Measurements were accurate to the order of 0.1 cc, hence small cell sizes were used in the model to capture this level of precision. The cell size in the spacers was 2 mm in the vertical direction. This resulted in models with 80300, 401100 and 802100 cells respectively. Runtimes were observed to progressively increase from around 2 hours to ~14 hours to approximately 30 hours. FIG. 24 shows the progression of the model results as a function of cell size. No noticeable change was observed in the predicted sand production volume from the grid with a horizontal cell size of 0.01 mm to 0.05 mm. The reduce runtimes below 14 hours, an additional grid cell model was created which had the same vertical cell dimensions as given before, however only the first 7 mm of the sample was gridded with a cell size of 0.01 mm. Beyond the initial 7 mm, the cell size was increased to 0.11035 mm. This graduated grid cell model had 100,000 cells and ran in approximately 3~4 hours. The computation with this grid cell model was compared with the results from other grid cell models, and it was seen that the results for this graduated grid cells model overlapped with the finer grid cell models, indicating that the results are independent of the cell size (FIG. 24). This graduated grid configuration was used for all subsequent runs.

6.3.1.2 Fit to the Production Function

The production function used for the fit was $f=(\epsilon^p/\epsilon_{lim}^p)^m$, and the simulations were performed by solving the system of partial differential equations of the coupled geomechanical model (including the production function) and the fluid flow model. The best fit was obtained for a deviation of 0.5, a beta value of 0, an exponent (m) value of 2, and a critical strain limit of 0.017 (see FIG. 25). The data was fit for both the massive sanding and the gradual sanding portions of the curve. The onset of plastic deformation is indicated in FIG. 25. The water rate match is displayed in FIG. 26. Close matches of both the sanding volume and water rate were observed. A slight mismatch in the water rate is observed at later times, due to the large permeability values assigned to cells that have sanded. The test results indicated that the permeability increase slightly overestimated the water flow rate in the numerical model. Furthermore, it was observed that the critical strain value of 0.017 indicated that sanding occurred far beyond the initial yielding of the sample (FIG. 27), indicating that, when the initial yield point is taken as the onset of sanding, the sanding tendencies of a sample might be significantly overestimated.

To obtain the fit to the produced sand volume, first the deviation was varied, where the exponent (m) was kept constant at a value of 1. For each value of deviation, the critical strain value was chosen to resemble the yield value at massive sanding. To obtain this value, the fit was performed using a geomechanical model which contained the hardening model but not the sand production model. Multiple values of deviation, critical strain and exponent were used to investigate the uniqueness of the solution.

First the deviation value was varied from 0.92 to 0.5. As stated before, the critical plastic strain value was determined for each deviation by performing the fit using a geomechanical model which contained the hardening model but not the sand production model. The yield value at the onset of massive sanding was used as the initial value of the critical plastic strain. Adjustments to the value of the critical plastic strain were sometimes made to obtain the best possible match given the value of the deviation. A maximum value of deviation of 0.92 was used. This value was determined from the Matsuoka-Nakai material model (a version of the MBP model). As shown in FIG. 28, a deviation of 0.5 gave the closest match, hence this value was used in all subsequent simulations.

Variation of the exponent (m) showed that the exponent value only influenced the amount of sand produced, but it did not change the point at which massive sanding occurred. Larger values of the exponent reduced the overall volume of sand produced (FIG. 29). Varying the value of the critical plastic strain showed that this constant governed the onset of massive sanding, where larger values of the exponent resulted in sanding at later times (i.e., at larger confining stresses) (see FIG. 30). Reducing the value of the critical plastic strain resulted in sanding occurring at lesser confining stresses.

FIG. 31 shows the evolution of the shape of the material failure from sanding after the hollow cylinder test was performed. Each panel in FIG. 31 is a horizontal slice taken at different depths in the core sample. From FIG. 31, it was observed that sanding was most massive at the center core slice of the sample (i.e., the cavity is deepest in the center of the core) and less towards the ends of the core sample. This shape was also observed in the numerical simulation runs. FIG. 32 shows the simulated evolution of the shape of the material failure over time computed for the numerical simulation (each slice in FIG. 31 is taken vertically). Although initially failure was located at the rock-spacer interface, the cavity progressed such that the deepest cavity occurred at the center of the core (see FIG. 32), i.e., the cavity became deeper towards the center of the simulated core, which matches what was observed in the hollow cylinder test results.

6.3.2 Cavity Growth

As can be seen from FIG. 32, at 116675 seconds, sand was still being produced. To determine if the sand production would stabilize, the loading at 116675 sec (i.e., a confining stress of 46 MPa and a pressure differential of 0.1643398 MPa) was held constant for an additional 116675 seconds. However, the simulation was set to terminate if more than 50% of the sample was produced a sand. FIG. 33A shows the sand production (cc) vs. time (s), and FIG. 33B shows the cavity size for the numerical simulation, where the confining stress is constant at 46 MPa and the pressure differential is constant at 0.1643398 MPa from 116675 seconds onwards. A continuous 0.01 mm sized grid was used. In FIG. B the grey area indicates the location of the cavity and dark area indicates intact rock (or spacer). At 126618.836995 seconds, 50% of the sample was produced as sand and the simulation terminated (see FIGS. 33A and 33B). In the volume calculation, the volume of the spacers was counted also. As shown in FIG. 33B, the cavity was very deep in the center and penetrated almost the complete simulated rock sample. From this, it was concluded that a confining stress of 46 MPa and a pressure differential of 0.1643398 MPa resulted in unstable sanding.

To determine if a stable cavity could be developed and sustained, the loading was changed. The material constants used were identical to those in FIG. 25, i.e., deviation=0.5, beta=0, critical plastic strain value=0.017 and the exponent (m)=2. A similar loading procedure as outlined in connection with FIG. 32 was used. Specifically, the loading reached at 113230 sec, i.e., a confining stress of 44 MPa and a pressure differential of 1.255317 MPa, was held constant for an additional 120120 seconds (max simulation time 233350 s). This simulation showed that a maximum of 10.2966 cc of sand was produced, and that the cavity stabilized (FIG. 34). This observation indicated that conditions existed under which sand production could be expected to some extent, but which should not lead to catastrophic failure (due to massive sanding).

6.4 Summary

The results showed that both the onset of sanding and the massive sanding of the hollow cylinder sanding test could be fit uniquely using a geomechanical model including a production function. The parameters used to fit the data are deviation, beta, critical strain, and the exponent. For the Landana brine test, it was found that the following parameter values resulted in the best match:

Deviation=0.5
Beta=0
Critical strain value=0.017
Exponent=2

The results also indicated that conditions existed under which some amount of sand production could be expected, but which should not lead to catastrophic failure (due to massive sanding). The workflow for the fitting procedure in Section 6.3.1 was as follows:

1) Based on the total sand volume and the precision with which the sand volume was measured, an appropriate grid size was chosen. For this study, where a total amount of approximately 6 cc of sand was produced, a cell size of 0.01 mm was used to obtain the desired precision.
2) Multiple models with varying deviation values were created using the material constants obtained from fits to the data from the triaxial test. In the computations to fit the test data, the geomechanical model did not include the sand production model.
3) Using the results from step 2, the yield value at massive sanding was recorded. This yield value was set equal to the critical plastic strain limit, and the value of the exponent was kept equal to 1. In this step, a number of runs could be made with a range of values of critical plastic strain around the obtained value.
4) Using the results from step 3, the simulation which fit the onset of massive sanding was used to vary the value of the exponent, where an increase in the exponent value was observed to reduce the amount of sand produced. The simulation which most closely fit the data from the tests was chosen to be representative.

7. REFERENCES CITED

All references cited herein are incorporated herein by reference in their entirety and for all purposes to the same extent as if each individual publication or patent or patent application was specifically and individually indicated to be incorporated by reference in its entirety herein for all purposes. Discussion or citation of a reference herein will not be construed as an admission that such reference is prior art to the present invention.

8. MODIFICATIONS

Many modifications and variations of this invention can be made without departing from its spirit and scope, as will be apparent to those skilled in the art. The specific examples described herein are offered by way of example only, and the invention is to be limited only by the terms of the appended claims, along with the full scope of equivalents to which such claims are entitled.

As an illustration of the wide scope of the systems and methods described herein, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

What is claimed is:

1. A method for use in predicting sand production from a geomechanical reservoir system, comprising:
   receiving data indicative of plastic deformation and sanding of material within the geomechanical reservoir system;
   computing, on a computer system, a value of one or more hardening parameters based on a first fit of a hardening model to the received plastic deformation data; wherein said hardening model models plastic deformation behavior of said material within the geomechanical reservoir system;

computing a value of a critical plastic strain based on a second fit of the geomechanical model comprising said hardening model to the received sanding data;

computing a value of at least one parameter of a production function based on a third fit of the geomechanical model comprising said production function to the received sanding data and using a value of at least one value of said hardening parameters and said value of said critical plastic strain; wherein said production function predicts sand production from said geomechanical reservoir system; and outputting to a user interface device, a monitor, a computer readable storage medium, a local computer, or a computer that is part of a network, at least one value of said one or more hardening parameters, said value of said critical plastic strain, or said value of at least one parameter of said production function.

2. The method of claim 1, wherein said production function is a function $f(x)$, wherein $f(x)=0$ when $x=0$, and $f(x)=1$ when $x=1$; and wherein x is a function of the critical plastic strain.

3. The method of claim 1, wherein said value of at least one parameter of said production function is a value of an exponent of said production function.

4. The method of claim 3, wherein said sand production function is given by the expression:

$$f(x) = \left(\frac{\varepsilon^p}{\varepsilon_{lim}^p}\right)^m$$

wherein $x=\epsilon^p/\epsilon_{lim}^p$, wherein $\epsilon^p$ is a plastic strain invariant, wherein $\epsilon_{lim}^p$ is said critical plastic strain; and wherein m is said value of said exponent.

5. The method of claim 1, wherein said hardening model is a modified Bigoni-Piccolroaz model.

6. The method of claim 1, wherein said plastic deformation data is obtained from a triaxial test.

7. The method of claim 1, wherein said sanding data is obtained from a hollow cylinder test.

8. The method of claim 1, wherein said first fit of said hardening model to the received plastic deformation data is obtained by a regression.

9. The method of claim 1, wherein:

said second fit of said geomechanical model comprising said hardening model to the received sanding data is obtained by solving a system of partial differential equations that model the geomechanical reservoir system;

the system of partial differential equations comprises a reservoir flow model and said geomechanical model comprising said hardening model; wherein the system of partial differential equations is coupled through a fully-expanded Jacobian; and the solving of the system of partial differential equations includes solving simultaneously in a single time step the fully-expanded Jacobian based upon the received sanding data.

10. The method of claim 1, wherein:

said third fit of said geomechanical model comprising said production function to the received sanding data is obtained by solving a system of partial differential equations that model the geomechanical reservoir system;

the system of partial differential equations comprises a reservoir flow model and said geomechanical model comprising said hardening model; wherein the system of partial differential equations is coupled through a fully-expanded Jacobian; and the solving of the system of partial differential equations includes solving simultaneously in a single time step the fully-expanded Jacobian based upon the received sanding data.

11. The method of claim 1, wherein the outputted at least one value of said one or more hardening parameters, said value of said critical plastic strain, or said value of at least one parameter of said production function is visually displayed on the user interface device or the monitor.

12. A method for sand production from a geomechanical reservoir system, comprising operating said geomechanical reservoir system in accordance with a result of the method of claim 1.

13. A method for use in predicting sand production from a geomechanical reservoir system, comprising:

receiving data indicative of physical or chemical properties associated with material within the geomechanical reservoir system;

generating sand production predictions for sanding on a computer system by solving a system of partial differential equations that model the geomechanical reservoir system, the system of partial differential equations comprises a reservoir flow model and a geomechanical model of the geomechanical reservoir system that are coupled through a fully-expanded Jacobian, a sand production criterion is applied to said geomechanical model and the geomechanical model comprises a hardening model, the solving of the system of partial differential equations includes solving in a single time step the fully-expanded Jacobian based upon the received data, including using a value of at least one value of one or more hardening parameters and a value of a critical plastic strain; and outputting the generated sand production predictions to a user interface device, a monitor, a computer readable storage medium, a local computer, or a computer that is part of a network.

14. The method of claim 13, wherein the solving in a single time step the fully-expanded Jacobian based upon the received data is performed simultaneously.

15. The method of claim 13, wherein the sand production criterion is a critical value of a total strain, a critical value of a plastic strain invariant, or a maximum effective stress.

16. The method of claim 13, wherein the reservoir model and the geomechanical model are computed on a grid comprising a plurality of grid cells.

17. The method of claim 13, wherein the outputted generated sand production predictions are visually displayed on the user interface device or the monitor.

18. A method for operating a geomechanical reservoir system to control sand production from the geomechanical reservoir system, comprising:

computing, on a computer, a value of at least one operating parameter based on a fit of a geomechanical model comprising a production function that predicts sand production from the geomechanical reservoir system to data indicative of physical or chemical properties associated with materials within the reservoir system, including using a value of at least one value of one or more hardening parameters and a value of a critical plastic strain, the at least one value of the operating parameter indicating a condition for stabilized sand production from the geomechanical reservoir system; and operating said geomechanical reservoir system in accordance with the value of the at least one operating parameter.

19. The method of claim 18, wherein the data indicative of physical or chemical properties includes plastic deformation and sanding of material within the geomechanical reservoir system.

20. A non-transitory processor readable medium containing computer readable software instructions used for operating a geomechanical reservoir system to control sand production from the geomechanical reservoir system, the software instructions comprising:

receiving data indicative of plastic deformation and sanding of material within the geomechanical reservoir system;

computing a value of one or more hardening parameters based on a first fit of a hardening model to the received plastic deformation data; wherein said hardening model models plastic deformation behavior of said material within the geomechanical reservoir system;

computing a value of a critical plastic strain based on a second fit of the geomechanical model comprising said hardening model to the received sanding data; and computing a value of at least one parameter of a production function based on a third fit of the geomechanical model comprising said production function to the received sanding data and using a value of at least one value of said hardening parameters and said value of said critical plastic strain; wherein said production function predicts sand production from said geomechanical reservoir system.

* * * * *